(12) United States Patent
Nakamura et al.

(10) Patent No.: US 7,248,318 B2
(45) Date of Patent: Jul. 24, 2007

(54) LIQUID CRYSTAL DISPLAY DEVICE AND METHOD OF PRODUCING THE SAME

(75) Inventors: Kimiaki Nakamura, Kawasaki (JP); Hideo Chida, Kawasaki (JP); Shingo Kataoka, Kawasaki (JP); Hidefumi Yoshida, Kawasaki (JP); Yoshio Koike, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 405 days.

(21) Appl. No.: 10/449,654

(22) Filed: May 30, 2003

(65) Prior Publication Data

US 2003/0231272 A1 Dec. 18, 2003

(30) Foreign Application Priority Data

May 31, 2002 (JP) ............................. 2002-160062
Jul. 26, 2002 (JP) ............................. 2002-218495
Dec. 5, 2002 (JP) ............................. 2002-353879

(51) Int. Cl.
*G02F 1/1337* (2006.01)

(52) U.S. Cl. ...................................... 349/124
(58) Field of Classification Search ................ 349/124
See application file for complete search history.

(56) References Cited

U.S. PATENT DOCUMENTS 6,667,788 B1 * 12/2003 Maruyama et al. ......... 349/115

FOREIGN PATENT DOCUMENTS

| JP | 53-120546 | 10/1978 | | |
|----|-----------|---------|---|---|
| JP | 54-158248 | 12/1979 | | |
| JP | 63-014123 | 1/1988 | | |
| JP | 63-038917 | 2/1988 | | |
| JP | 64-4720 | 1/1989 | | |
| JP | 02-137819 | 5/1990 | | |
| JP | 4-180019 | 6/1992 | | |
| JP | 5-173138 | 7/1993 | | |
| JP | 5-341273 | 12/1993 | | |
| JP | 7-49484 | 2/1995 | | |
| JP | 7-239465 | 9/1995 | | |
| JP | 7-261161 | 10/1995 | | |
| JP | 8-5994 | 1/1996 | | |
| JP | 8-110515 | 4/1996 | | |
| JP | 8-146397 | 6/1996 | | |
| JP | 9-146096 | 6/1997 | | |
| JP | 9-5747 | * | 9/1997 | ................. 349/124 |
| JP | 10-123521 | 5/1998 | | |
| JP | 11-95221 | 4/1999 | | |
| JP | 11-133429 | 5/1999 | | |
| JP | 11-249105 | 9/1999 | | |
| JP | 2000-19526 | 1/2000 | | |
| JP | 2000-81621 | 3/2000 | | |
| JP | 2000-321562 | 11/2000 | | |
| JP | 2001-108994 | 4/2001 | | |

* cited by examiner

*Primary Examiner*—James A. Dudek
(74) *Attorney, Agent, or Firm*—Greer, Burns & Crain, Ltd.

(57) ABSTRACT

A liquid crystal display device, in which a liquid crystal layer is supported by a liquid crystal substrate, in which an orientation-controlling layer is formed on a surface of the liquid crystal substrate to regulate an orientation of liquid crystal molecules in the liquid crystal layer in the predetermined direction, and the orientation-controlling layer is formed by an incorporated additive added to the liquid crystal.

56 Claims, 20 Drawing Sheets

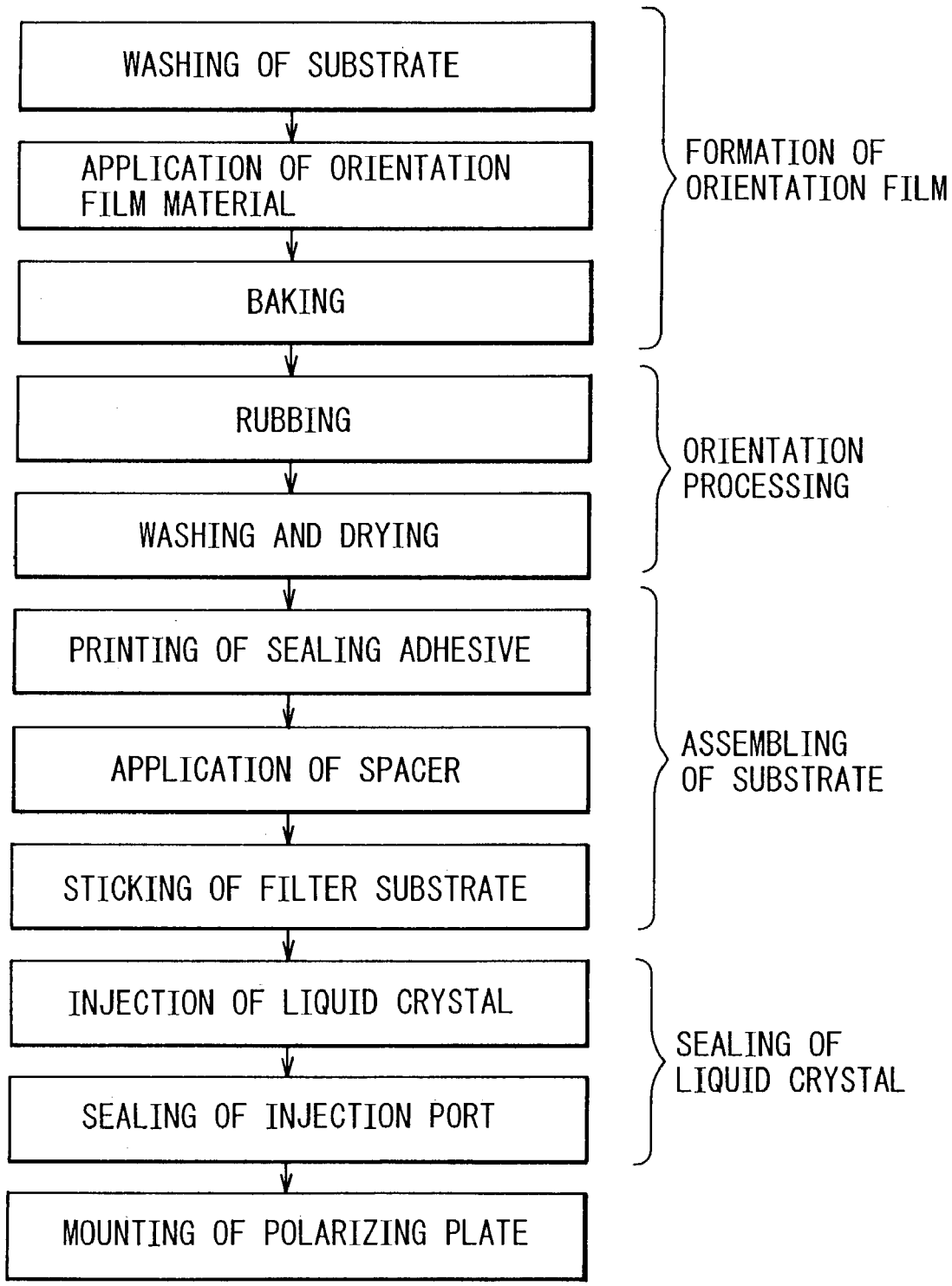

LIQUID CRYSTAL DISPLAY DEVICE AND METHOD OF PRODUCING THE SAME

BACKGROUND OF THE INVENTION

1. Field of the Invention

The present invention relates to a liquid crystal display device and, more specifically, to a liquid crystal display device which improves the orientation of liquid crystal molecules on a substrate, thus ensuring a high display quality, and to a method of producing the same. The present invention also relates to a liquid crystal display device capable of being operated at high speed such as for field-sequential driving directed to a moving picture display, and to a method of producing the same.

2. Description of the Related Art

Liquid crystal display devices are widely used in personal computers, liquid crystal TVs, car navigation systems, digital cameras, video cameras and cellular phones. In notebook PCs and liquid crystal TVs, further, it has been strongly desired to widen the visual angle, i.e., to improve visual angle characteristics and to improve the image fineness to meet an increase in the screen sizes. Liquid crystal display devices, in general, have a structure in which liquid crystals are sealed between a pair of insulating substrates, such as glass substrates, in such a manner that the liquid crystal molecules thereof are oriented in a predetermined direction, and an orientation film is formed on the respective substrates on the side of the liquid crystals. As a material of an orientation film, there is usually used a polyimide or a polyamic acid (see, for example, Japanese Unexamined Patent Publication (Kokai) No. 64-4720). The liquid crystal molecules are highly oriented by subjecting the orientation film formed on the insulating substrate to an orientation processing for setting a pretilt angle which is a contact angle between the liquid crystal molecules and the insulating substrate. Further, there have been suggested many liquid crystal devices to improve the viewing angle characteristics and screen fineness. For example, there has been proposed a split orientation panel structure in which a plurality of liquid crystal molecules having different orientation directions are included.

Conventional liquid crystal display devices are usually produced through a step of forming an oriented film, a step of orientation processing, a step of assembling substrates and a step of sealing liquid crystals as schematically illustrated in a flowchart of FIG. 1. These production steps will be further described. First, a material for an orientation film is applied onto the insulating element or CF substrate that has been washed and is baked to form an orientation film. Then, rubbing is conducted for setting a pretilt angle by rubbing the surface of the orientation film with a buffing cloth. Dust and dirt as well as static electricity formed by rubbing are removed by washing and drying to thereby effect the orientation processing. After the orientation processing has been completed, a sealing material (usually an adhesive) is printed onto the element substrate and, then, a spacer material is applied or distributed (hereinafter, also referred to as "sprinkled") to obtain a gap relative to the filter substrate. Next, the element substrate and the filter substrate are stuck together to assemble a liquid crystal substrate. Then, a liquid crystal is injected through an injection port of the insulating substrate obtained as described above, and the injection port is sealed. One or two polarizing plates are mounted on the filter substrate to complete a liquid crystal panel having a liquid crystal sealed between a pair of substrates having the orientation films. After a series of these steps are completed, a predetermined circuit is assembled around a liquid crystal panel to thereby complete a product such as a notebook personal computer.

Among the above series of production steps, a rubbing method of rubbing the surface of the orientation film with a buffing cloth is employed in the step of orientation processing for setting a pretilt angle which is a contact angle between the liquid crystal molecules and the insulating substrate. Therefore, the physical contact and friction generate dirt and dust, cause damage to the orientation films, contaminate the surface of the liquid crystal layer due to static electricity, cause thin-film transistors (TFTs) formed on the insulating substrate to be electrostatically broken down and cause a drop in the production yield. In order to solve these problems, however, after-treatments such as washing and drying must be conducted inevitably resulting in an increase in the number of the processing steps. Further, since only one or two liquid crystal panels are formed on a piece of insulating substrate accompanying an increase in the screen size, the production yield assumes only two values of 0% and 100% or assumes only three values of 0%, 50% and 100% depending upon the presence of defect. As a high degree of image fineness is demanded, further, the number of display elements formed on one liquid crystal panel becomes, for example, 640×480 dots. In the case of a three-color display, the dots could amount to 920,000 elements and a drop in the yield due to the occurrence of defects could become a serious problem.

In order to solve this problem, there has been proposed an optical orientation method of setting a pretilt angle in the orientation film by utilizing light without relying upon the rubbing method which sets the pretilt angle by physical contact with the surface of the orientation film (see, for example, Japanese Unexamined Patent Publication (Kokai) No. 9-5747). As described above, the pretilt angle represents the contact angle between the insulating substrate and the liquid crystal molecules. Accordingly, the direction in which the pretilt angle is set is usually called a tilting direction.

An example of the optical orientation method will be described with reference to FIGS. 2A to 2C.

Referring to FIG. 2A, a material of the orientation film such as polyimide or polyamic acid is applied onto an insulating substrate 51 such as a glass substrate and is baked to form an orientation film 52. Then, the insulating substrate 51 is vertically irradiated with ultraviolet rays 54$a$ polarized in a vertical direction to effect pre-exposure which is for adjusting the physical properties of the orientation film material. Next, as shown in FIG. 2B, the insulating substrate 51 is irradiated, at a predetermined angle $\alpha°$, with ultraviolet rays 54$b$ of which the direction of polarization is changed by 90 degrees, whereby a pretilt angle a inclined in the direction of irradiation of ultraviolet rays is set in the orientation film 52, and liquid crystal molecules 56 are oriented in the same direction and at the same angle as the pretilt angle as shown in FIG. 2C. According to the above orientation processing based on the optical orientation method, no step is required for effecting the rubbing, washing and drying, solving the above-mentioned problem.

This optical orientation method, however, still involves a problem. For example, if it is attempted to realize a split orientation panel structure which may make it possible to improve the visual angle characteristics of the liquid crystal pane and the image fineness of the screen by applying the above optical orientation method, a plurality of pretilt angles must be set in the regions of the orientation film depending upon the orientation directions of the liquid crystal molecules by the irradiation with ultraviolet rays polarized in different directions of irradiation. In order to set a plurality of pretilt angles on the same orientation film, it becomes necessary to prepare a plural kinds of optical masks for transmitting and shutting off the polarized ultraviolet rays and to irradiate polarized ultraviolet rays having different angles of irradiation a plural number of times by using the optical masks, requiring a very long time for the orientation processing.

When the orientation film is formed on the substrate, further, not only must the number of production steps be increased but also large dedicated production equipment must be installed such as a printer for printing the orientation film material and a baking apparatus for the orientation film, inevitably resulting in an expansion of the production side and a great increase in the cost of production.

Further, in order to decrease the number of production steps and to increase the yield, there has also been proposed, in Japanese Unexamined Patent Publication (Kokai) No. 11-95221, a method of producing liquid crystal display elements by sealing a liquid crystal composition containing an orientation assistant of a photo curable high-molecular resin in a liquid crystal cell between the glass substrates, leaving the liquid crystal composition to stand, and causing the orientation assistant to be adsorbed by the surface of the substrate by utilizing the surface energy of the glass substrate thereby to form an orientation film.

Turning again to the structure of the conventional liquid crystal display devices, there has been suggested a liquid crystal display (LCD) using an active matrix, and as such a LCD, there has been widely used a liquid crystal display device of a TN mode in which a liquid crystal material having a positive dielectric anisotropy is horizontally oriented to the surface of the substrate in a dark state and is twisted by 90 degrees relative to the opposing substrate.

The liquid crystal display device of the TN mode has a problem of poor visual angle characteristics, and study has been extensively conducted in an attempt to improve the visual angle characteristics. As an alternative system, there has been developed an MVA (multi-domain vertical alignment) system according to which a liquid crystal material having a negative dielectric anisotropy is vertically oriented, and the direction of tilting the liquid crystal molecules is controlled in a plurality of directions when a voltage is applied by utilizing protuberances and slits formed on the substrate surfaces without rubbing the orientation film, succeeding in greatly improving the visual angle characteristics.

However, in order to vertically orient (horizontally orient) the liquid crystal material, it is essential to form an orientation film by using a polyimide or the like, not only in the liquid crystal display devices of the TN mode but also in the MVA system. Formation of the orientation film requires a printing step, a baking step, a washing step and the like, which are the major factors of preventing a reduction-in the production steps and a reduction in the cost.

In addition, as a liquid crystal display device using an active matrix, there has been widely used a liquid crystal display device employing a nematic liquid crystal. In recent years, it has been required to provide a liquid crystal display device such as for a field sequential drive type adapted to a moving picture display. This liquid crystal display device requires high-speed switching of liquid crystal molecules. Therefore, it has been urged to provide a liquid crystal display device having a higher response speed.

In the liquid crystal display device using a nematic liquid crystal, decreasing the cell thickness and increasing the pretilt angle are effective in increasing the response speed of the liquid crystal. Pretilting the liquid crystals is usually realized by rubbing an organic orientation film such as those of polyimide or polyamic acid with a cloth. However, it is difficult to obtain a uniform and large pretilt angle by rubbing. In general, a pretilt angle of about 6 to 7 degrees is an upper limit. Besides, the rubbing produces dust and dirt creating such a problem that elements are destroyed due to static electricity. It is therefore desired particularly for the active substrate that the orientation treatment is carried out by a method other than rubbing.

Further, a large pretilt angle can be effectively obtained by using an organic orientation film containing an alkyl group in large amounts and by increasing the density of the alkyl groups on the surface of the orientation film. When it is attempted to obtain a large pretilt angle by the above method, however, there arises a problem in that the shading becomes conspicuous due to dispersion in the pretilt angle on a plane, and stripes become conspicuous due to rubbing.

As an orientation method other than rubbing, there have been proposed a method of providing bank structures on the surface of the orientation film and an optical orientation method which has been described above with reference to FIGS. 2A to 2C. According to the method of providing bank structures on the surface of the orientation film, first striped banks are formed on the orientation film on one substrate, and second striped banks are formed on the orientation film on the other substrate in parallel with the first striped banks but being deviated from the first striped banks. The orientation of the whole liquid crystal molecules is controlled by utilizing the fact that the liquid crystal molecules between the first striped banks and the second striped banks have a property of being oriented vertically to these striped banks.

However, the method of providing the bank structures is applied to the liquid crystal display device of the vertical orientation type but is not applied to the liquid crystal display device of the TN type. Further, according to the optical orientation method, the orientation film of polyimide or polyamic acid is irradiated with ultraviolet rays to impart anisotropy to the surface of the orientation film thereby to orient the liquid crystal molecules. With the optical orientation method, however, the force for limiting the orientation is weak, and it is difficult to realize a large pretilt angle. With the optical orientation method, the pretilt angle is, for example, about 1 degree.

Moreover, as for the technology for controlling the orientation of the liquid crystal display device, Japanese Unexamined Patent Publication (Kokai) No. 5-173138 teaches dividing the orientation, and Japanese Unexamined Patent Publication (Kokai) No. 9-146096 discloses a liquid crystal display device in which the orientation film comprises striped vertical orientation regions and striped horizontal orientation regions that are alternately arranged, and is rubbed in the directions perpendicular to the vertical orientation regions and to the horizontal orientation regions.

SUMMARY OF THE INVENTION

As described above, the conventional liquid crystal display devices still include problems to be solved. The present invention is directed to solve these problems.

First, the present invention has an object of providing a liquid crystal display device for realizing high quality display characteristics by controlling the orientation, such as vertical orientation or horizontal orientation, of liquid crystal molecules without separately providing an orientation film, while accomplishing a reduction in the steps of production, in the cost of production and in the materials, and of providing a method of producing the same.

Second, the present invention has an object of providing a liquid crystal display device featuring an excellent response speed without rubbing a substrate provided with an active matrix structure.

In addition to these objects, the present invention has an object to solve many problems in the conventional liquid crystal display devices in which the orientation film must be formed on each of the pair of substrates constituting the liquid crystal display device, and the surfaces thereof must be subjected to the rubbing processing or to the optical orientation processing, involving many problems with respect to the steps of production, cost of production and managing the steps. That is:

It is therefore an object of the present invention to provide a liquid crystal display device which does not require a step of forming orientation films on the substrates on the sides of liquid crystals.

It is further an object of the present invention to provide a liquid crystal display device which is simply constituted and is simply produced at a reduced cost.

It is further an object of the present invention to provide a method of producing a liquid crystal display device of high performance simply while maintaining a good yield.

The above and other objects of the present invention will be easily understood from the following detailed description of the present invention.

The first aspect of the present invention resides in a liquid crystal display device in which a liquid crystal layer is supported by a liquid crystal substrate, characterized in that an orientation-controlling layer is formed on a surface of the liquid crystal substrate to regulate an orientation of liquid crystal molecules in the liquid crystal layer in the predetermined direction, and the orientation-controlling layer is formed by an incorporated additive added to the liquid crystal.

In this connection, the present invention also resides in a method of producing a liquid crystal display device in which a liquid crystal layer is supported by liquid crystal substrates, characterized by injecting, between liquid crystal substrates, a liquid crystal having added thereto an additive having a property of controlling the orientation of the liquid crystal molecules in the predetermined direction, thereby to form the liquid crystal layer on the surface layer of the liquid crystal substrates, the liquid crystal layer having orientation-controlling layers consisting of said additive.

In the second aspect thereof, the present invention resides in a liquid crystal display device comprising a pair of opposing substrates, an orientation control layer formed on the pair of substrates, a liquid crystal layer arranged between the pair of substrates, and an electrode for applying an electric field to the liquid crystal layer, wherein the orientation control layer formed on at least one of the substrates comprises a plurality of first elongated orientation regions for orienting the liquid crystal molecules nearly vertically to the substrate surfaces and a plurality of second elongated orientation regions for arranging the liquid crystal molecules nearly in parallel with the substrate surfaces, the first orientation regions and the second orientation regions being alternately arranged, and part of the liquid crystal located in the first orientation regions and part of the liquid crystal located in the second orientation regions being continuously oriented.

According to this constitution, part of the liquid crystal located in the first orientation regions and part of the liquid crystal located in the second orientation regions are continuously oriented being affected by each other, and there is realized a liquid crystal display device having a large pretilt angle and a high response speed.

In the third aspect thereof, the present invention resides in a liquid crystal display device having a panel structure comprising a pair of substrates arranged being opposed to each other and liquid crystal sealed between these substrates, wherein a resin layer is interposed in the interface between the liquid crystals and a liquid crystal panel-constituting element in contact with the liquid crystal, the resin layer being formed by curing a curable additive that comprises a monofunctional monomer and a polyfunctional monomer, and vertical orientation-expressing functional group of the monomer contained in the curable additive are derived from the surface of the resin layer.

In this connection, the present invention also resides in a method of producing a liquid crystal display device having a panel structure comprising a pair of substrates arranged being opposed to each other and liquid crystal sealed between these substrates, which method comprises the steps of:

pouring a mixture of the liquid crystal and a curable additive comprising a monofunctional monomer and a polyfunctional monomer into between the substrates; and applying energy for curing the curable additive to thereby selectively form a resin layer having a mesh structure in the interface between the liquid crystal and a liquid crystal panel-constituting element in contact with the liquid crystal and to derive from a surface of the resin layer vertical orientation-expressing functional groups of the monomer contained in the curable additive.

In the liquid crystal display device and the production method thereof according to the present invention, the curable additive is curable by the application of energy of various kinds, and is, preferably, a photo-curable, thermosetting or electron beam curable monomers, oligomers and others.

BRIEF DESCRIPTION OF THE DRAWINGS

FIG. 1 is a flowchart illustrating the steps of producing a conventional liquid crystal display panel;

DESCRIPTION OF THE PREFERRED EMBODIMENTS

Figure 2A:
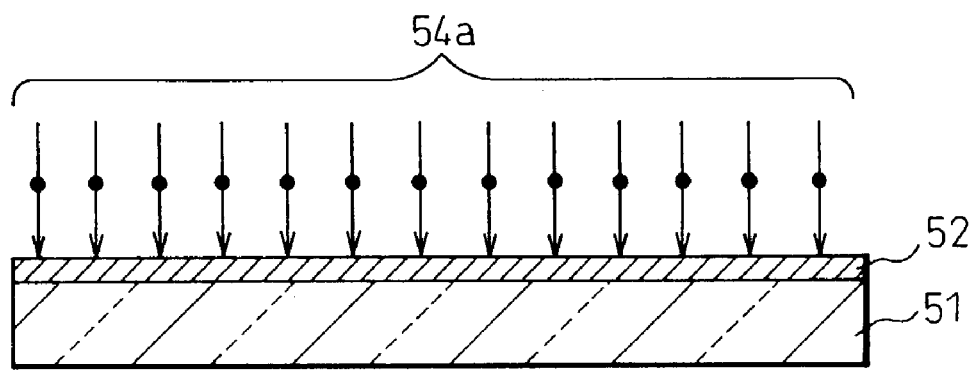
FIGS. 2A to 2C are sectional views schematically and successively illustrating a conventional method of optical orientation.
Figure 2B:
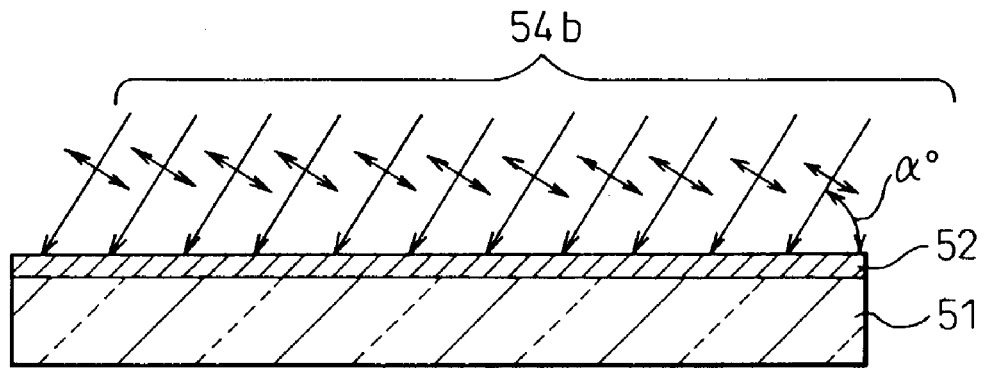
Figure 2C:
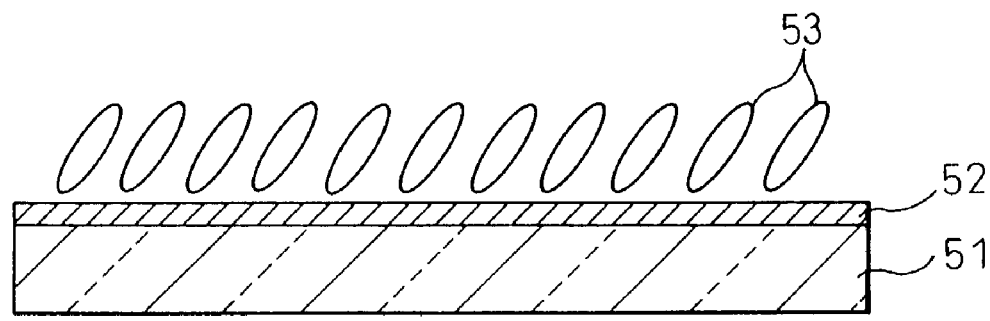

The liquid crystal display devices and the production methods according to each aspect of the present invention can be advantageously carried out in various embodiments within the scope of the present invention. Preferred embodiments of the present invention will now be described with reference to the accompanying drawings. It should, however, be noted that the present invention is in no way limited to the following embodiments only.

First Aspect of the Present Invention

In the first aspect of the present invention, the liquid crystal display device is a device in which a liquid crystal layer is supported by a liquid crystal substrate. The liquid crystal layer comprises an additive incorporated into the liquid crystal and has, formed on the surfaces thereof, an orientation-controlling layer for regulating the orientation of the liquid crystal molecules in the predetermined direction.

Preferably, the liquid crystal display device is a device in which a liquid crystal layer is supported by a liquid crystal substrate, the liquid crystal layer comprises a liquid crystal B to which is added an incorporated additive C having a property of controlling the orientation of liquid crystal molecules in the predetermined direction, and the following relationship:

$$(v_{AB} - v_{AC})/v_{BC} > -1$$

more preferably, $$(v_{AB} - v_{AC})/v_{BC} > 1$$

wherein $v_{AB}$ is the amount of change in the surface energy of the surface A when the surface A is wet with the liquid crystal B, $v_{AC}$ is the amount of change in the surface energy of the surface A when the surface A is wet with the additive C, and $v_{BC}$ is the amount of change in the surface energy of the liquid crystal B when the liquid crystal B come in contact with the additive C, are satisfied.

-Basic Gist of the Invention-

First, described below is the basic gist of the invention.

Based on obtaining a function comparable to that of a conventional orientation film without applying and forming the orientation film, the present inventors have attempted to incorporate, into a liquid crystal, an additive capable of controlling the orientation of the liquid crystal molecules in predetermined directions, and have arrived at forming a liquid crystal layer by using the above liquid crystal. Thus, it was made possible to automatically form an orientation-controlling layer having substantially the same function as that of the conventional orientation film on the surface of the liquid crystal layer nearly simultaneously with the formation of the liquid crystal layer without applying and forming an orientation film that was an essential requirement in the conventional liquid crystal display devices.

In order to inject the liquid crystal containing the incorporated additive to form an orientation-controlling layer on the surfaces of the liquid crystal layer, as described above, the additive must locally exist in the surface portion of the liquid crystal layer, the surface of the liquid crystal support members must be wet with the additive which must, hence, be adsorbed thereby. Then, in order to realize the above gist of the invention, the present inventors have analyzed relations between the surface of the liquid crystal substrates and the additive, between the surface of the liquid crystal substrates and the liquid crystal, and between the liquid crystal and the additive, and have contrived so-called qualitative conditional formulas among the above relations, as described below.

The inventors have found that the additive incorporated to the liquid crystal is adsorbed by the surface of the liquid crystal support member when a relationship:

$$(v_{AB} - v_{AC})/v_{BC} > -1 \quad (1)$$

wherein $v_{AB}$ is the amount of change in the surface energy of when a surface A of the liquid crystal support member is wet with a liquid crystal B, $v_{AC}$ is the amount of change in the surface energy of the surface A when the surface A is wet with an additive C, and $v_{BC}$ is the amount of change in the surface energy of the liquid crystal B when the liquid crystal B come in contact with the additive C, is satisfied.

Figure 3:
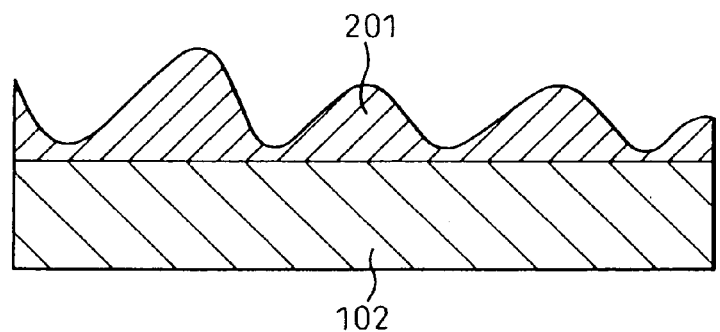
FIG. 3 is a view schematically illustrating a liquid crystal display device of the present invention in a state where a additive added to the liquid crystal is adsorbed by the surfaces of the liquid crystal support members.

A concrete example is illustrated in FIG. 3 where the liquid crystal substrate is a transparent electrode 102, and an additive 201 to be incorporated is adsorbed by the surface of the transparent electrode 102.

It was further found that when a relationship:

$$(v_{AB} - v_{AC})/v_{BC} > 1 \quad (2)$$

is satisfied, the additive is more suitably adsorbed by the surface of the liquid crystal substrates and diffuses.

When the additive comprises two or more kinds of materials, any attractive material may be selected to apply the above conditional formula.

Concrete properties desired for the additive include such a property that at least part of the additive exhibits a vertical orientation property and chemically bonds to the surface of the liquid crystal substrate, such a property that the additive is physically adsorbed by the surface of the liquid crystal substrate and chemically bonds to the surface, such a property that the additive is physically adsorbed by the surface of the liquid crystal substrate and chemically bonds between the additives, and such a property that the additive contains a monomer material and is physically adsorbed by the surface of the liquid crystal substrate and forms a polymer structure as an orientation-controlling layer.

-Concrete Description of Embodiments-

Described below are concrete embodiments based on the above basic gist of the invention.

The embodiments will now be described in detail giving a focus to forming the orientation-controlling layers and, particularly, at the time of forming the liquid crystal layer. In the embodiments, the surfaces of the liquid crystal support members, liquid crystals and the amount of change in the surface energy of the additive, all satisfy the above formula (1) or (2).

(First Embodiment)

Figure 4A:
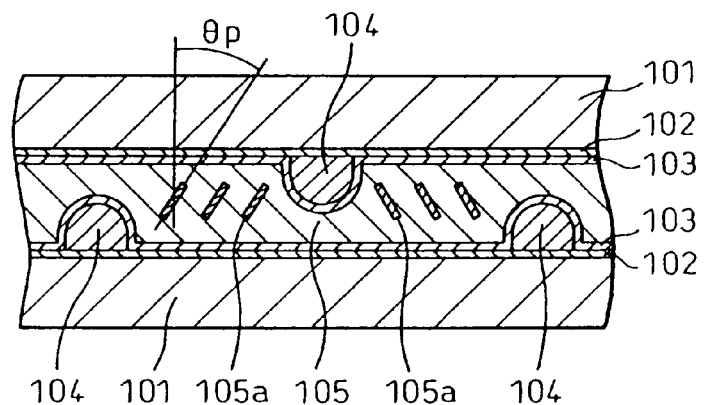
FIG. 4A is a sectional view schematically illustrating a conventional liquid crystal display device.
Figure 4B:
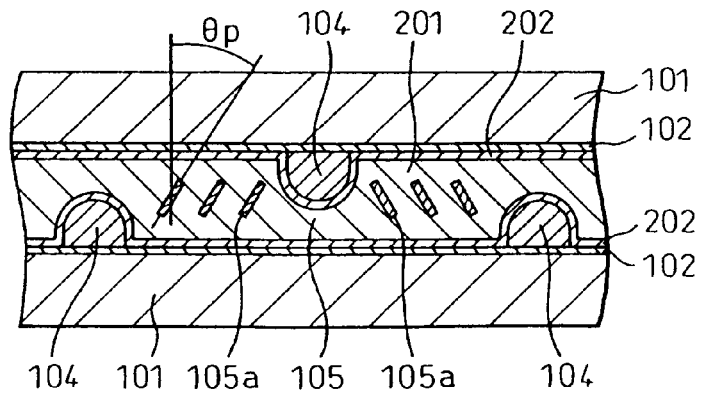
FIG. 4B is a sectional view schematically illustrating a liquid crystal display device according to the present invention.

FIGS. 4A and 4B are sectional views schematically illustrating a liquid crystal display device according to an embodiment in comparison with a conventional liquid crystal display device, wherein FIG. 4A illustrates the conventional device and FIG. 4B illustrates the embodiment of the present invention, and common reference numerals denote the same constituent members.

In the conventional liquid crystal display device, as shown in FIG. 4A, transparent electrode films 102 of ITO are formed on the surfaces of a pair of glass substrates 101. On the transparent electrode films 102 are further formed orientation structures for controlling the orientation, i.e., bank-like structures 104 having a height of 1.5 μm and a width of 10 μm. The gap among the banks is 25 μm.

As the orientation structures, there can be used slits or fine slits formed in the transparent electrode films 102 in addition to or instead of the bank structures 104 (see, Japanese Patent Application No. 2000-295266; S. Kataoka et al., Digest of SID01, p. 1066(2001); A. Tanaka et al., Digest of SID99, p. 206(1999); A. Takeda et al., Digest of SID98, p. 1077 (1998)).

Vertical orientation films 103 are formed on the bank-like structures 104. A liquid crystal layer 105 having a thickness of, for example, about 4 μm and comprising negative liquid crystal is held between the vertical orientation films 103, and the liquid crystal molecules 105a are tilted by the bank-like structures 104 in a direction of θp.

On the other hand, in the liquid crystal display device according to the embodiment of the present invention, as shown in FIG. 4B, the liquid crystal layer 105 is formed by using liquid crystal to which an additive 201 is added without forming the vertical orientation films 103. In this case, orientation-controlling layers 202 are formed on the surfaces of the liquid crystal layer 105 to efficiently realize a stable vertical orientation. In this case, bank-like structures 104 (or slits or fine slits) are provided as orientation structures in addition to the orientation-controlling layers 202 to regulate the orientation of liquid crystal molecules in the direction θp.

In this embodiment, the liquid crystal is those of the negative type, and the additive that is incorporated is, for example, a bifunctional acrylate monomer having a liquid crystal skeleton. To the liquid crystal is further added an ultraviolet ray polymerization initiator. When the additive 201 adheres onto the surfaces of the transparent electrode films 102 upon irradiating the liquid crystal with ultraviolet rays, a polymer structure is formed as orientation-controlling layers 202 on the surfaces of the liquid crystal layer 105. It is considered that the bifunctional acrylate monomer that is adhered partly bonds chemically to the glass substrates 101. The surfaces of the liquid crystal support member, in this embodiment, are the transparent electrode films 102 which, however, may be replaced by final protection films such as of SiN or glass substrates. In this case, further, the horizontal orientation can also be realized by varying the properties of the monomer. Further, upon its graft-polymerization with a monofunctional acrylate monomer having a vertical orientation group to form a brush-like polymer, it becomes possible to realize a stable and efficient orientation.

Figure 5A:
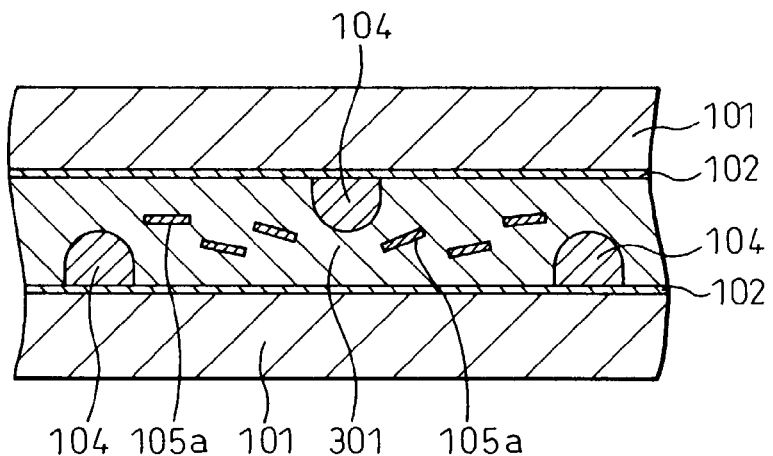
FIGS. 5A to 5C are sectional views schematically illustrating the steps of vertically orienting the liquid crystal to which the additive is added by the irradiation with ultraviolet rays.
Figure 5B:
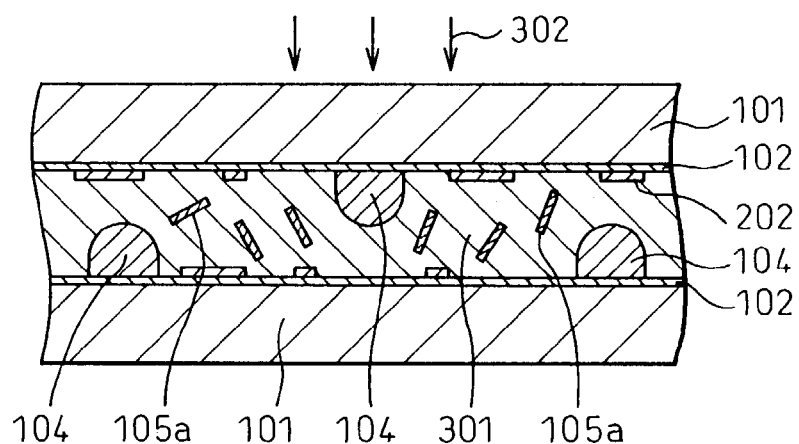
Figure 5C:
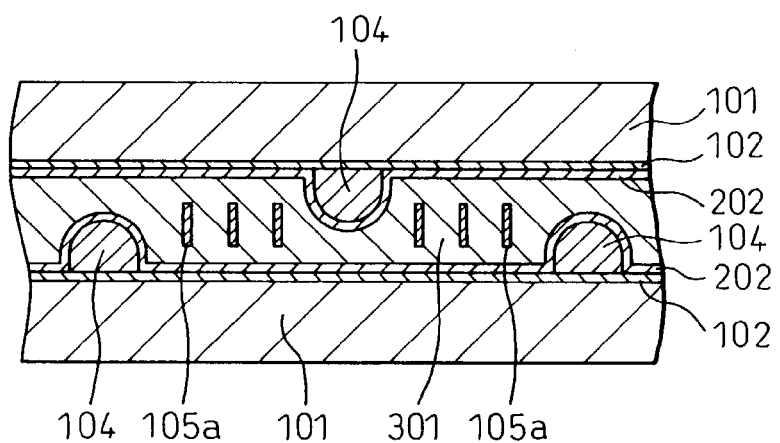

FIGS. 5A to 5C are sectional views schematically illustrating the steps of vertically orienting the liquid crystal, having added thereto the additive, upon irradiation with ultraviolet rays.

Upon irradiation with ultraviolet rays 302, the liquid crystal molecules 105a gradually approach the vertically oriented state starting from the initial state shown in FIG. 5A where the liquid crystal 301 having added thereto the additive are sealed, and a formation of the orientation-controlling layers 202 is started as shown in FIG. 5B. Then, the liquid crystal molecules 105a are vertically oriented, and the orientation-controlling layers 202 are nearly homogeneously formed as shown in FIG. 5C.

Here, the orientation of the liquid crystal molecules can be further stabilized by applying a predetermined voltage to the liquid crystal at the time of polymerizing the bifunctional acrylate monomer.

Further, the surfaces of the liquid crystal substrates may be previously modified by using an oxygen plasma or an excimer UV, so that the additive is more efficiently adsorbed. For examples, the surfaces of the liquid crystal substrates are treated in an oxygen plasma of 500 watts for one minute.

Further, the surfaces of the liquid crystal substrates may be previously modified with a hydrophilic agent such as an alkaline surfactant, so that the additive is more efficiently adsorbed. Representative surfactants include Alkonox and other substrate detergents.

(Second Embodiment)

In this embodiment, the additive to be incorporated is a mixture of a monomer of a bifunctional acryloyl group and a monomer of a monofunctional methacryloyl group having a straight-chain alkyl. To the liquid crystal is further added an ultraviolet-ray polymerization initiator.

Figure 6:
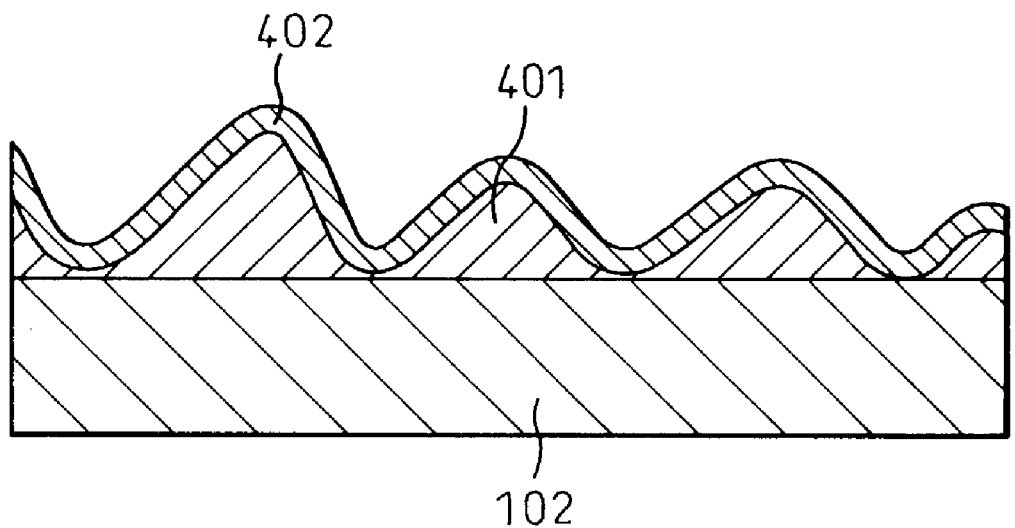
FIG. 6 is a view schematically illustrating a state where two kinds of orientation-controlling layers are formed on the surfaces of the glass substrates according to a second embodiment of the present invention.

Upon irradiating the liquid crystal with ultraviolet rays, as shown in FIG. 6, the acryloyl monomer, which is highly reactive, is, first, adsorbed by the glass substrate 101 to form a first orientation-controlling layer 401. Then, a second orientation-controlling layer 402 of a methacryloyl group having a low reactivity is formed on the first orientation-controlling layer 401. The liquid crystal molecules are vertically oriented due to the straight-chain alkyl formed on the surface.

(Third Embodiment)

In this embodiment, the liquid crystal is those of the negative type, and the additive to be incorporated is silicon halide having a straight-chain alkyl. In this case, the OH group present on the transparent electrically conducting film reacts with halogen. As silane chemically bonds to oxygen on the glass substrate, the straight-chain alkyl is formed on the surfaces of the liquid crystal substrates, and the liquid crystal molecules are vertically oriented.

(Fourth Embodiment)

In this embodiment, the additive is a sorbitan monooleate (product name, Reodol SP-O10) which is a non-ionic surfactant manufactured by Kao Co. SP-O10 is added in an amount of 2% by weight to the liquid crystal. The surfactant is physically adsorbed by the surfaces of the glass substrates and the liquid crystal molecules are vertically oriented. The SP-O10 is a non-ionic surfactant and exhibits good electric properties.

In the case of the physical adsorption, the orientation of the liquid crystal molecules becomes relatively unstable. By effecting the annealing near an NI (nematic isotropic) point, therefore, the orientation of liquid crystal is stabilized without being destroyed.

(Fifth Embodiment)

In this embodiment, SP-O10, a product name of Kao Co. obtained by adding an acryloyl group to a polar group such as sorbitan, is added in an amount of 2% by weight to the liquid crystal. Then, a photo polymerization initiator is added in an amount of about 1% by weight based on the whole amount. Upon the irradiation with ultraviolet rays, chemical bonding takes place among the acryloyl groups and between the acryloyl groups and the surfaces of the liquid crystal substrates. Upon irradiating the liquid crystal with ultraviolet rays while applying a voltage thereto, the monomer is polymerized in compliance with the orientation of the liquid crystal and the orientation is stabilized.

(Sixth Embodiment)

In this embodiment, a bifunctional acrylate monomer having a liquid crystal skeleton as an addition agent is added in amount of 0.3% by weight to the liquid crystal. The photo polymerization initiator is added in an amount of about 2% by weight with respect to the bifunctional acrylate monomer. SP-O10, a product name of Kao Co. is added in an amount of 2% by weight as an additive. Upon adding the additive, the liquid crystal is vertically oriented. Upon irradiating the liquid crystal with ultraviolet rays while applying a voltage thereto, the monomer is polymerized in compliance with the orientation of the liquid crystal and the orientation is stabilized.

(Seventh Embodiment)

In this embodiment, a monofunctional acrylate monomer having a liquid crystal skeleton and an acrylate monomer having three or more functional groups are mixed into the liquid crystal. Then, a photo polymerization initiator is added in an amount of about 1% by weight based on the whole amount. The orientation is stabilized due to the trifunctional acrylate monomer. Upon irradiating the liquid crystal with ultraviolet rays while applying a voltage thereto, the acrylate monomer is polymerized in compliance with the orientation of the liquid crystal.

(Eighth Embodiment)

In this embodiment, an alkyl is added to the liquid crystal as a side chain and an acid anhydride is added thereto as a main chain, and both of them are polymerized in the liquid crystal. This stably orients the liquid crystal molecules. Further, a polymer containing, as a side chain, an alkyl compatible with a liquid crystal and containing an acid anhydride as a main chain, is adsorbed by the surface of the liquid crystal substrates to more stably orient the liquid crystal molecules.

According to the embodiments of the invention described above, the control of orientation such as vertical orientation of the liquid crystal molecules or horizontal orientation of the liquid crystal molecules can be attained without separately providing an orientation film, making it possible to reduce the steps of production, cost of production and amount of the materials yet realizing high display characteristics.

Effects of the Invention:

As will be understood from the foregoing, according to the present invention, there is provided a liquid crystal display device in which the orientation is controlled such as vertically orienting the liquid crystal molecules or horizontally orienting the liquid crystal molecules without separately providing an orientation film, making it possible to reduce the steps of production, cost of production and amount of the materials yet realizing high display characteristics.

Second Aspect of the Present Invention

In the second aspect of the present invention, the liquid crystal display device comprises a pair of opposing substrates, an orientation control layer formed on the pair of substrates, a liquid crystal layer arranged between the pair of substrates, and an electrode for applying an electric field to the liquid crystal layer, wherein the orientation control layer formed on at least one of the substrates comprises a plurality of first elongated orientation regions for orienting the liquid crystal molecules nearly vertically to the substrate surfaces and a plurality of second elongated orientation regions for arranging the liquid crystal molecules nearly in parallel with the substrate surfaces, the first orientation regions and the second orientation regions being alternately arranged, and part of the liquid crystal located in the first orientation regions and part of the liquid crystal located in the second orientation regions being continuously oriented.

Figure 7:
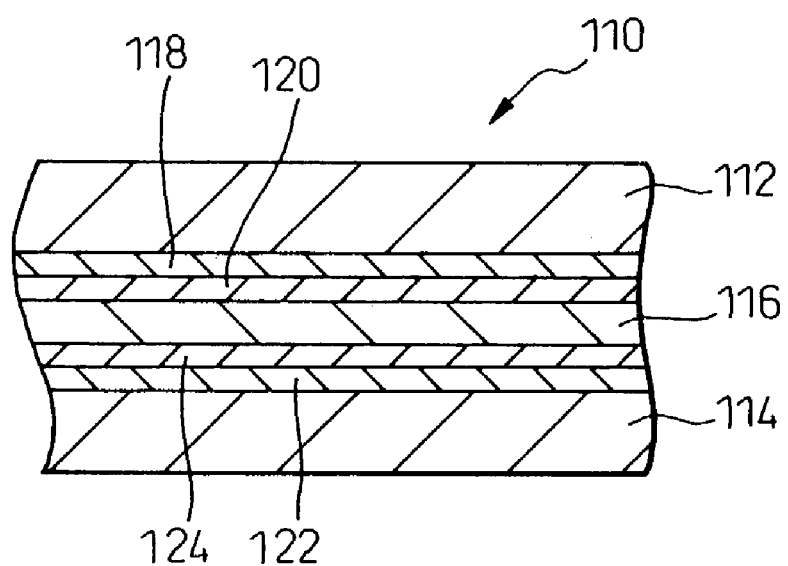
FIG. 7 is a sectional view schematically illustrating a liquid crystal display device according to the first embodiment of the present invention.

FIG. 7 is a cross-sectional view schematically illustrating the fundamental constitution of a liquid crystal display device of a first embodiment of the present invention. The liquid crystal display device 110 comprises a pair of opposing transparent glass substrates 112 and 114, and a liquid crystal layer 116 inserted between the pair of glass substrates 112 and 114. The first glass substrate 112 has a common electrode 118 and an orientation film (orientation control layer) 120. The second glass substrate 114 has a pixel electrode 122 and an orientation film (orientation control layer) 124. The second glass substrate 114 comprises an active matrix structure.

Figure 8:
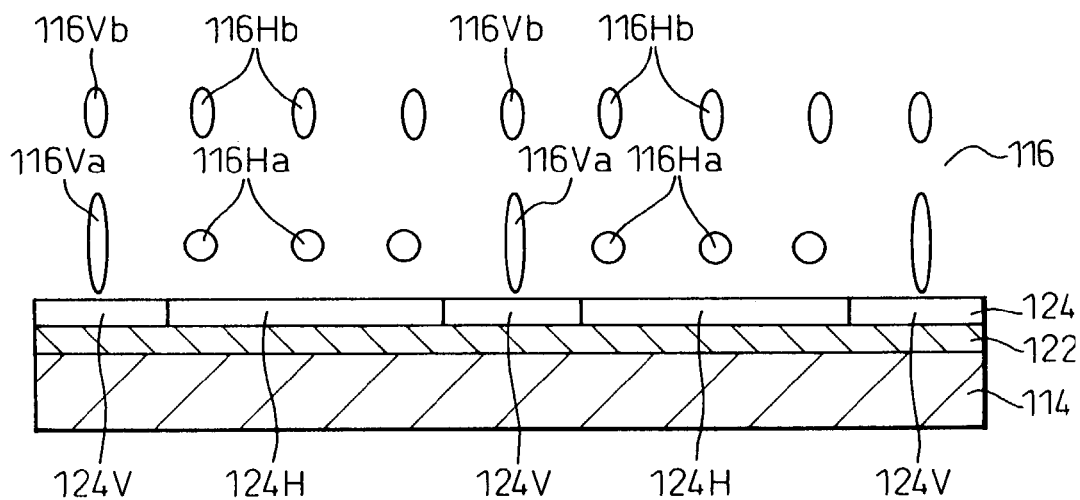
FIG. 8 is a sectional view schematically illustrating the operation of an orientation film on a second glass substrate in the liquid crystal display device of FIG. 7.
Figure 9:
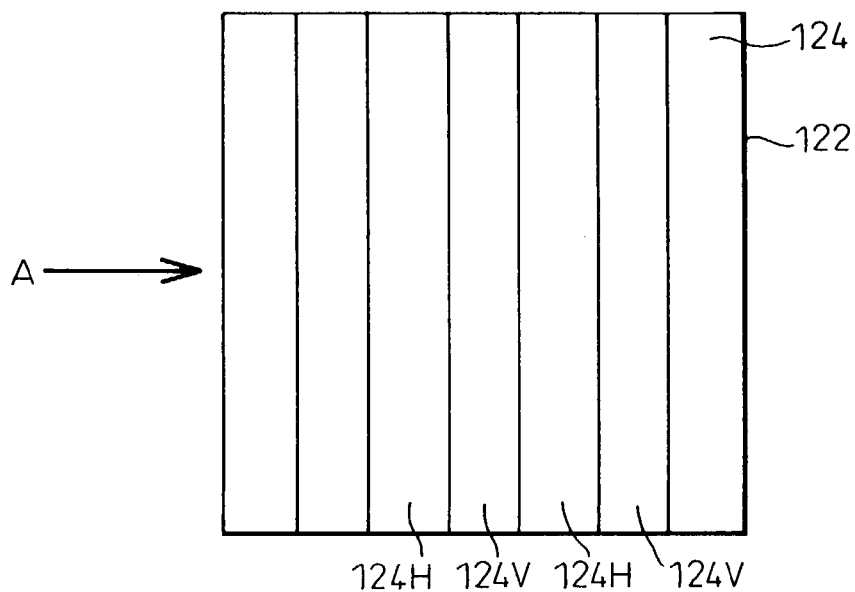
FIG. 9 is a plan view illustrating the orientation film on the pixel electrodes on the second glass substrate of FIG. 7.

FIG. 8 is a cross-sectional view schematically illustrating the operation of the orientation film 124 on the second glass substrate 114 of the liquid crystal display device of FIG. 7. FIG. 9 is a diagram schematically illustrating a portion of the orientation film 124 on the pixel electrode 122 on the second glass substrate 114 of FIG. 7. In FIG. 9, the orientation film 124, on a display pixel region, comprises a plurality of first elongated orientation regions 124V in which the liquid crystal molecules are oriented nearly vertically to the substrate surface and a plurality of second elongated orientation regions 124H in which the liquid crystal molecules are arranged nearly in parallel with the substrate surface. The first orientation regions 124V and the second orientation regions 124H each have a straight striped shape, and are alternately arranged in parallel with each other.

Figure 10:
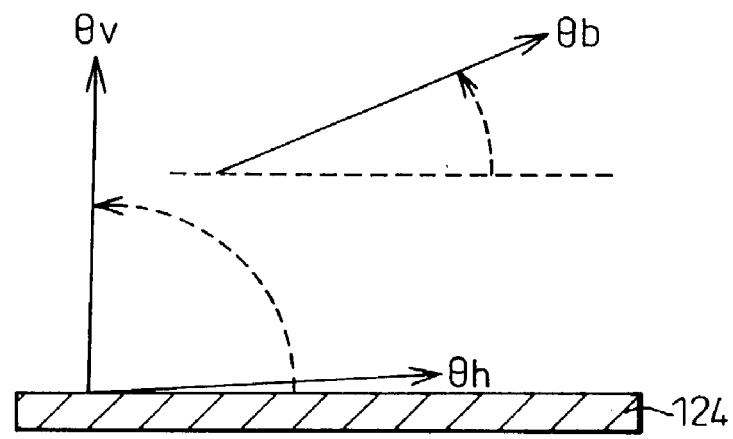
FIG. 10 is a diagram illustrating a pretilt angle of a liquid crystal as viewed from the direction of an arrow A in FIG. 9 in a state where the liquid crystal display device is completed.

FIG. 10 is a diagram illustrating a pretilt angle of the liquid crystal as viewed from a direction of an arrow A in FIG. 9 in a state where the liquid crystal display device 110 is completed. In FIG. 10, the pretilt angle of the liquid crystal molecules in the first orientation region 124V is denoted by $\theta_v$, and the pretilt angle of the liquid crystal molecules in the second orientation region 124H is denoted by $\theta_h$. $\theta_v$ is nearly vertical to the substrate surface and $\theta_h$ is nearly in parallel with the substrate surface. Further, the tilt angle in the bulk portion (main portion in the liquid crystal layer 116 between the orientation films 120 and 124 excluding the liquid crystal portions in contact with the orientation films 120 and 124) of the liquid crystal layer 116 is denoted by $\theta_b$. In the present invention, the liquid crystal in the bulk portion of the liquid crystal layer 116 are nearly uniformly oriented maintaining a relationship $\theta_h < \theta_b < \theta_v$.

In FIG. 8, in the liquid crystal located on the first orientation regions 124V of the orientation film 120, part 116Va of the liquid crystal in contact with the first orientation regions 124V are oriented nearly vertically to the substrate surface. In the liquid crystal located on the first orientation regions 124V of the orientation film 120, part 116Vb of the liquid crystal located in the bulk portion away from the first orientation regions 124V are oriented aslant with respect to the substrate surface. On the other hand, in the liquid crystal located on the second orientation regions 124H of the orientation film 120, part 116Ha of the liquid crystal in contact with the second orientation regions 124H are oriented nearly in parallel with the substrate surface. In this case, the liquid crystal is oriented in a direction in parallel with the lengthwise direction of the regions 124V and 124H. In the liquid crystal located on the second orientation regions 124H of the orientation film 120, part 116Hb of the liquid crystal located in the bulk portion away from the second orientation regions 124H are oriented aslant with respect to the substrate surface.

In the present invention, part 116Vb of the liquid crystal located in the bulk portion of the first orientation regions 124V and part 116Hb of the liquid crystal located in the bulk portion of the second orientation regions 124H, affect each other to average the orientation in the bulk portion of the liquid crystal layer 116, and parts 116Vb, 116Hb of the liquid crystal located on the first orientation regions 124V and the second orientation regions 124H are oriented continuously and nearly uniformly.

In this case, if either one side or both sides of the first orientation regions 124V and the second orientation regions 124H have a relatively large width, the part of the liquid crystal located at the centers of the regions are less affected by the portion of the liquid crystal located in the neighboring region. Accordingly, the orientation is not averaged in the bulk portion of the liquid crystal layer 116, and the liquid crystal is oriented vertically or horizontally in the whole region. Therefore, the widths of the first orientation regions 124V and of the second orientation regions 124H must be very narrow so that the parts of the liquid crystal located in the bulk portion are affected by each other. It is desired that the first orientation regions 124V and the second orientation regions 124H have widths of not larger than 10 μm and, desirably, not larger than 5 μm.

Thus, according to the present invention, the substrate provided with the active matrix structure realizes a large pretilt angle without the need of rubbing, and makes it possible to realize a liquid crystal display device having an excellent response speed. This, further, makes it possible to improve the yield of production process and the throughput. It is further made possible to provide a liquid crystal display device for field sequential drive which is adapted to be combined with a narrow gap.

In the above constitution, the first orientation regions 124V and the second orientation regions 124H may be made of separate orientation film materials. Alternatively, the first orientation regions 124V and the second orientation regions 124H may be made of a single orientation film material, and may be selectively treated. In this case, a compound having a straight-chain alkyl structure is used as a material for forming the orientation film 124, and the second orientation regions 124H may have an alkyl structure which is less dense than that of the first orientation regions 124V. In order to form regions having a less dense alkyl structure and regions having a dense alkyl structure, the alkyl may be repelled in the regions where it is to become less dense or the alkyl may be decreased through the after-treatment. Concretely, the following means can be employed.

(a) Structures are formed on the second orientation regions 124H and, then, a material of vertical orientation film is applied onto the whole surface of the second substrate 114 to form the orientation film 124. The structures are so selected that the material of the vertical orientation film little adheres to the structures, i.e., the structures repel the material of the vertical orientation film. The material of the vertical orientation film is applied in an increased amount on the regions where there is no structure and is applied in a decreased amount on the regions where there are the structures, thereby to specify the first orientation regions 124V and the second orientation regions 124H. Desirably, the structures are so formed as to possess a surface energy of not greater than 50 mN/m and to repel the material of the vertical orientation film. The structures are to repel part of the orientation film to make the alkyl less dense and to divide the orientation film into different regions. The height of the structures has no significant meaning and may be not larger than 1 µm. The surface of the orientation film becomes uneven due to the provision of the structures but becomes flat as the material of the orientation film flows (see, FIGS. 15A and 15B).

(b) After the orientation film 124 is formed, the second orientation regions 124H are irradiated with ultraviolet rays to cut the alkyl and to impart transverse orientation.

(c) Liquid crystals to which is added a compound having a straight-chain alkyl, are injected between the substrates so that the compound is adsorbed by the two substrates. The layers of the adsorbed compound work as orientation control layers exhibiting the action of vertical orientation and making it possible to omit a process for applying and forming the orientation film. In this case, from the standpoint of stability, it is desired that the compound having a straight-chain alkyl possesses a photo reaction group. After the liquid crystals containing the compound having the straight-chain alkyl are injected, the compound may be selectively adsorbed by either the first orientation regions 124V or the second orientation regions 124H (or in larger amounts by the regions of either side). In this case, too, the structures may be formed to form regions of dissimilar polarities on the substrates, or the selective irradiation with ultraviolet rays may be employed.

Figure 11:
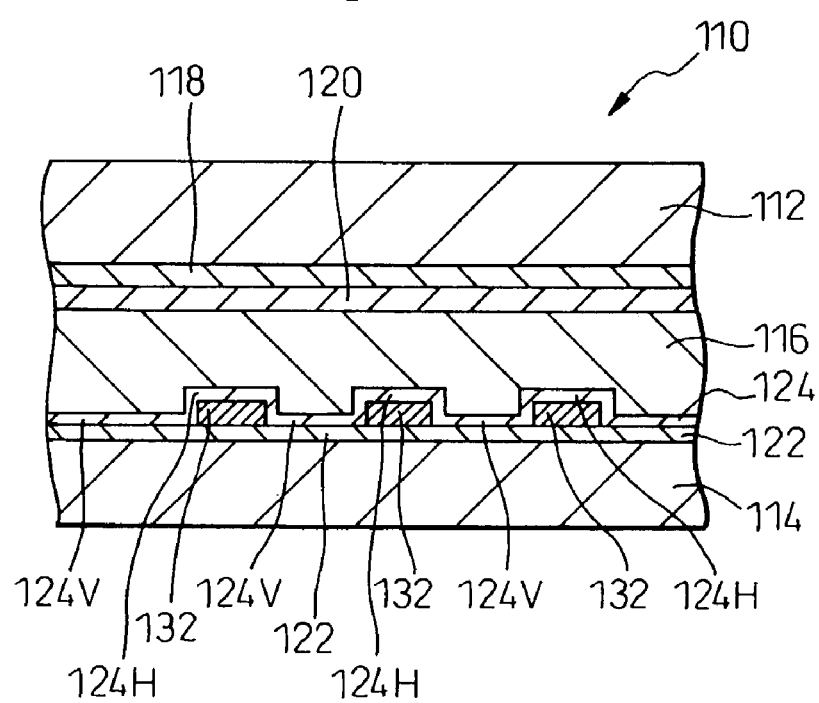
FIG. 11 is a sectional view schematically illustrating the liquid crystal display device according to a second embodiment of the present invention.

FIG. 11 is a cross-sectional view schematically illustrating the liquid crystal display device 110 according to the second embodiment of the present invention. In FIG. 8, the orientation of the liquid crystals was described by relying only upon a relationship to the orientation film 124 on the second glass substrate 114. This teaches that an orientation film 120 on the first glass substrate 112 can be constituted in a variety of ways. In FIG. 11, an orientation of the liquid crystal is illustrated based upon a relationship between the orientation film 120 on the first glass substrate 112 and an orientation film 124 on the second glass substrate 114.

The liquid crystal display device 110 shown in FIG. 11 has basically the same constitution as that of the liquid crystal display device 110 shown in FIG. 7. Namely, the liquid crystal display device 110 comprises a pair of opposing transparent glass substrates 112 and 114, and a liquid crystal layer 116 inserted between the pair of glass substrates 112 and 114. The first glass substrate 112 has a common electrode 118 and the orientation film (orientation control layer) 120. The second glass substrate 114 has a pixel electrode 122 and the orientation film (orientation control layer) 124. The second glass substrate 114 also comprises an active matrix structure.

In FIG. 11, structures 132 are arranged between the pixel electrode 122 and the orientation film 124. The structures 132 extend in a striped shape like the second orientation regions 124H in FIG. 9, and are covered with the orientation film 124. As described above, the structures 132 are so selected that the material of the vertical orientation film hardly adheres thereto, and works to repel the material of the vertical orientation film. Desirably, the structures 132 have a surface energy of not larger than 50 mN/m. Accordingly, the orientation film 124 comprises first orientation regions 124V each positioned in a gap between the two structures 132 and second orientation regions 124H positioned on the structures 132. The first orientation regions 124V and the second orientation regions 124H exhibit the same actions as those explained above with reference to FIGS. 7 to 10.

Figure 12:
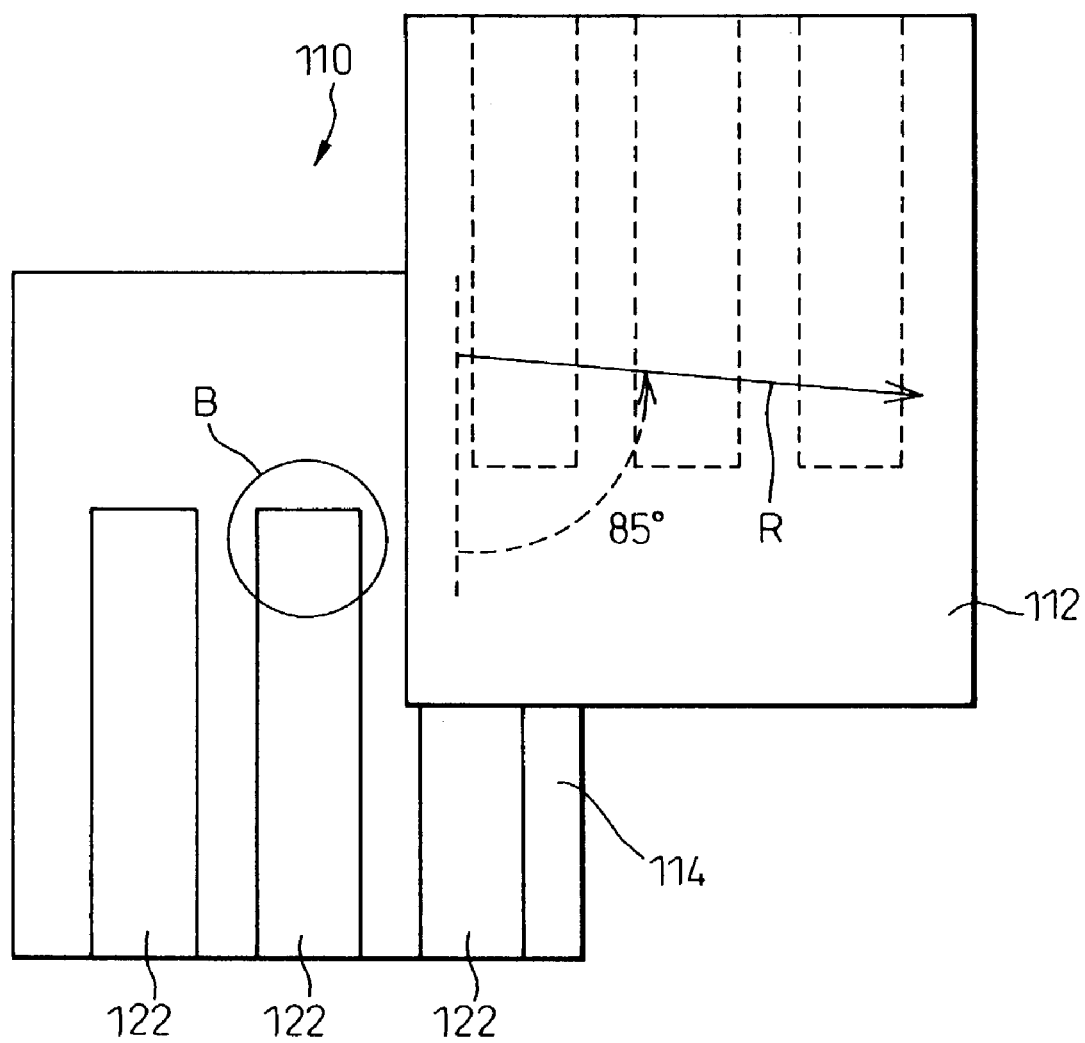
FIG. 12 is a diagram schematically illustrating first and second glass substrates according to the embodiment of FIG. 11.
Figure 13:
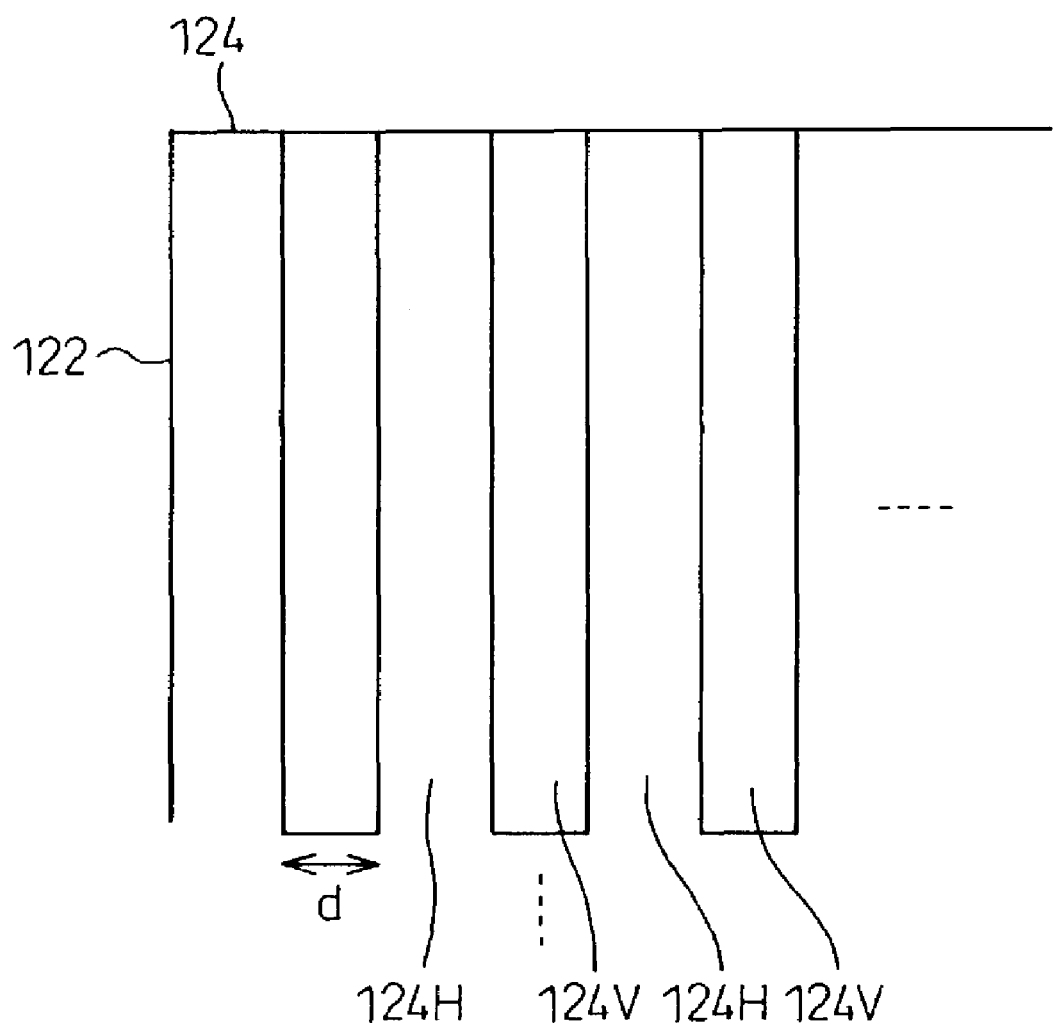
FIG. 13 is a diagram illustrating a portion B of FIG. 12 on an enlarged scale.

FIG. 12 is a diagram schematically illustrating the first and second glass substrates 112 and 114 of the embodiment illustrated in FIG. 11. FIG. 13 is a diagram illustrating a portion B of FIG. 12 on an enlarged scale. FIG. 12 illustrates the first glass substrate 112 and the second glass substrate 114. The second glass substrate 114 has pixel electrodes 122. Referring to FIG. 13, on each pixel electrode 122 are formed first orientation regions 124V and second orientation regions 124H. Namely, a plurality of elongated structures 132 are formed on each pixel electrode 122. The first orientation regions 124V work to orient the liquid crystal molecules nearly vertically to the substrate surface, and the second orientation regions 124H work to orient the liquid crystal molecules nearly in parallel with the substrate surface.

The orientation film 120 on the first glass substrate 112 is rubbed in a direction of an arrow R. The rubbing direction R is selected to be nearly 85 degrees with respect to the lengthwise direction of the structures 132 on the second glass substrate 114 (lengthwise direction of the first orientation regions 124V and of the second orientation regions 124H). Here, the rubbing direction can also be selected to be at right angles to the structures 132.

Figure 14:
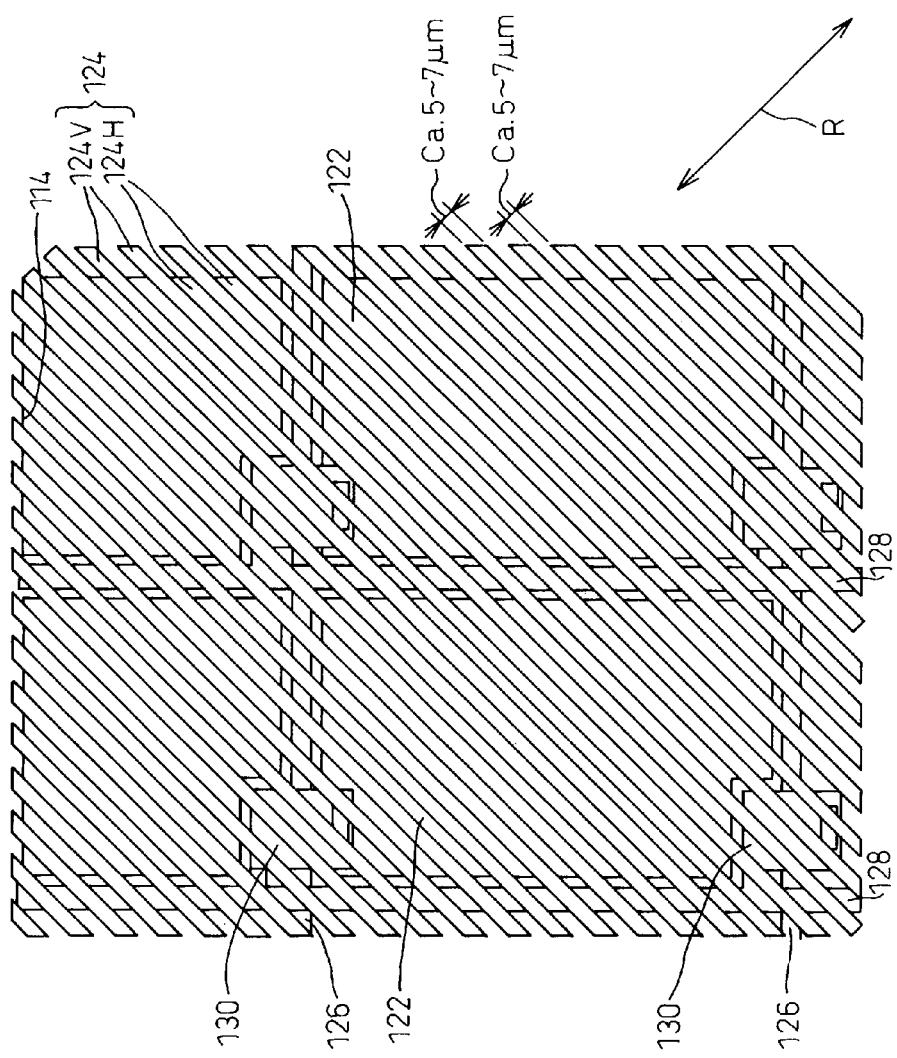
FIG. 14 is a plan view illustrating a modified example of the second glass substrate.

FIG. 14 is a plan view illustrating a modified example of the second glass substrate 114. In FIG. 14, the second glass substrate 114 includes pixel electrodes 122, gate bus lines 126, data bus lines 128 and TFTs 130. The orientation film 124 includes first orientation regions 124V and second orientation regions 124H. The first orientation regions 124V and the second orientation regions 124H are formed in the shape of straight stripes, and are alternately arranged in parallel with other. The first orientation regions 124V and the second orientation regions 124H are formed at an angle of nearly 45 degrees with respect to the gate bus lines 126 and the data bus lines 128. The pixel electrodes 122 have a width of about 50 µm, and the first orientation regions 124V and the second orientation regions 124H have a width of about 6 to 7 µm. The arrow R indicates the direction of rubbing the orientation film 120 on the first glass substrate 112. The first orientation regions 124V and the second orientation regions 124H are formed nearly at right angles with the rubbing direction R.

Next, described below is the method of producing the liquid crystal display device 110 of FIG. 11 and the operation thereof. Structures 132 of a width of 5 µm were formed on the pixel electrodes 122 of ITO on the second glass substrate 114 by using a Resist S1808 produced by Shipley Co. maintaining the same gap width. Here, the structures 132 possessed a height of 0.7 µm. A material of vertical orientation film JALS-2004 produced by JSR Co. was applied onto the second glass substrate 114 comprising the structures 132 to thereby form an orientation film 124.

A material of horizontal orientation film AL-3046 produced by JSR Co. was applied onto the first glass substrate 112 to form an orientation film 120. The orientation film 120 was rubbed in a direction indicated by the arrow R. In this case, the rubbing direction was selected to be 85 degrees with respect to the lengthwise direction of the structures 132 formed on the opposing substrate 114. The two glass substrates 112 and 114 were stuck together, and positive-type liquid crystal (positive dielectric anisotropy) was injected therein to fabricate a liquid crystal cell.

There were prepared four kinds of liquid crystal cell samples having the same structure but changing the width of the structures 132. The structures 132 possessed widths of 5 µm, 7.5 µm, 10 µm and 12.5 µm. The gap between the two structures 132 was the same as the width of the structures 132.

Orientation of these liquid crystal cells was observed to reveal that the orientation of the twisted nematic (TN) mode had been formed in the regions forming structures 132 (second orientation regions 124H) in the liquid crystal display devices 110 having structures 132 of widths of 5 µm and 7.5 µm. The orientation of the hybrid (HAN) mode had, on the other hand, been formed in the gaps (first orientation regions 124V) among the structures 132.

The liquid crystal display devices 110 with structures 132 of widths of 10 µm and 12.5 µm possessed an alternate arrangement of horizontal orientation in the regions forming structures 132 (second orientation regions 124H) and hybrid orientation in the gaps (first orientation regions 124V) among the structures 132.

The liquid crystal display device 110 with the structures 132 of a width of 5 µm was measured for its pretilt angle by using a pretilt measuring device based on the crystal rotation method, to find a pretilt angle of about 10 degrees. Further, the liquid crystal display device 110 with the structures of a width of 12.5 µm was measured for its pretilt angle in the horizontally oriented regions to find a pretilt angle of about 2 degrees.

Next, described below is a modified example of the liquid crystal display device 110 of FIG. 11. There was fabricated the liquid crystal display device 110 having the same constitution as that of the liquid crystal display device 110 of FIG. 11. In this modified example, the material of vertical orientation film possessed the same molecular structure as that of the material of vertical orientation film JALS-2004 produced by JSR Co., but the vertical orientation components had been decreased to a lower limit of vertically erecting the liquid crystals. Observation of orientation of the thus fabricated liquid crystal cells revealed that the orientation of the twisted nematic (TN) mode had been formed in the regions forming structures 132 (second orientation regions 124H) in the liquid crystal display devices 110 having structures 132 of widths of 5 µm, 7.5 µm and 10 µm. The orientation of the hybrid (HAN) mode had, on the other hand, been formed in the gaps (first orientation regions 124V) among the structures 132.

The liquid crystal display device 110 with structures 132 of a width 12.5 µm possessed an alternate arrangement of horizontal orientation in the regions forming structures 132 (second orientation regions 124H) and hybrid orientation in the gaps (first orientation regions 124V) among the structures 132.

Described below is a further modified example of the liquid crystal display device 110 of FIG. 11. There was fabricated the liquid crystal display device 110 having the same constitution as that of the liquid crystal display device 110 of FIG. 11. In this modified example, however, the second glass substrate 114 was subjected to plasma ashing treatment after the structures 132 have been formed to vary the surface tension of the structures 132. Then, the material of vertical orientation film was applied thereon.

Figure 15A:
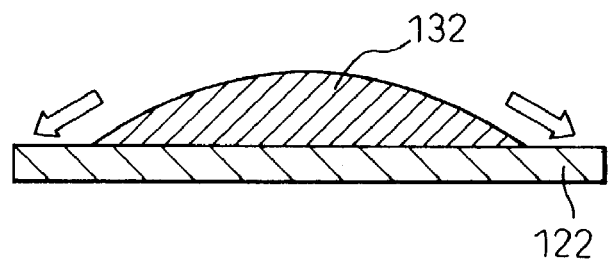
FIG. 15A is a diagram illustrating the structures before ashing.
Figure 15B:
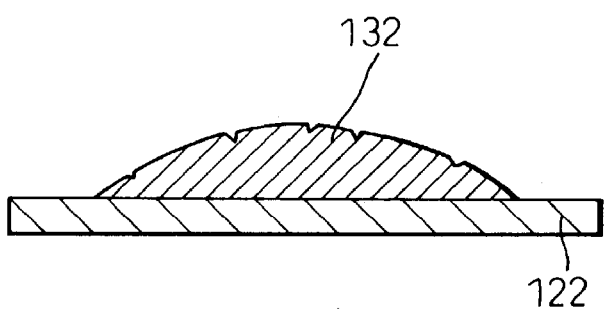
FIG. 15B is a diagram illustrating the structures after ashing.

FIGS. 15A and 15B are diagrams illustrating the structures 132 of before ashing and after ashing. FIG. 15A illustrates the structure 132 of before ashing and FIG. 15B illustrates the structure 132 of after ashing. The structure 132 after ashing has a rough surface and exhibits a surface tension which is larger than that of the structure 132 of before ashing. The structure 132 before ashing possesses the surface tension of 42 mN/m and 65 mN/m when saturated. Observation of orientation of the thus obtained liquid crystal cells revealed that the orientation of the twisted nematic (TN) mode had been formed when the surface tension was not larger than 50 mN/m, and the hybrid orientation had been formed when the surface tension was not smaller than 50 mN/m.

Figure 16:
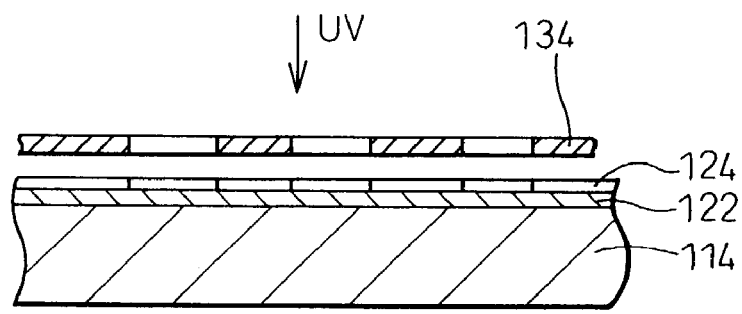
FIG. 16 is a sectional view schematically illustrating the second glass substrate in the liquid crystal display device according to the third embodiment of the present invention.

FIG. 16 is a sectional view schematically illustrating the second glass substrate 114 in the liquid crystal display device according to the third embodiment of the present invention. In this embodiment, the orientation film 124 was selectively irradiated with ultraviolet rays instead of forming the structures 132. The material of vertical orientation film JALS-2004 produced by JSR Co. was applied onto the pixel electrodes 122 on the second glass substrate 114 to form the orientation film 124. On the orientation film 124 was placed a mask 134 forming slit patterns of widths of 5 µm, 7.5 µm, 10 µm and 12.5 µm, followed by the irradiation with ultraviolet rays. In the regions irradiated with ultraviolet rays, the alkyl was cut and the vertical orientation was weakened. The material for horizontal orientation film AL-3046 produced by JSR Co. was applied onto the first glass substrate 112 to form the orientation film 120 which was, then, rubbed. The rubbing direction was selected to be 85 degrees with respect to the slit patterns in the mask 134. The two glass substrates 112 and 114 were stuck together, and positive-type liquid crystal (positive dielectric anisotropy) was injected therein to fabricate a liquid crystal cell.

Orientation of the liquid crystal cells was observed to reveal that the orientation of the twisted nematic (TN) mode had been formed like in the embodiment of FIG. 11.

Figure 17:
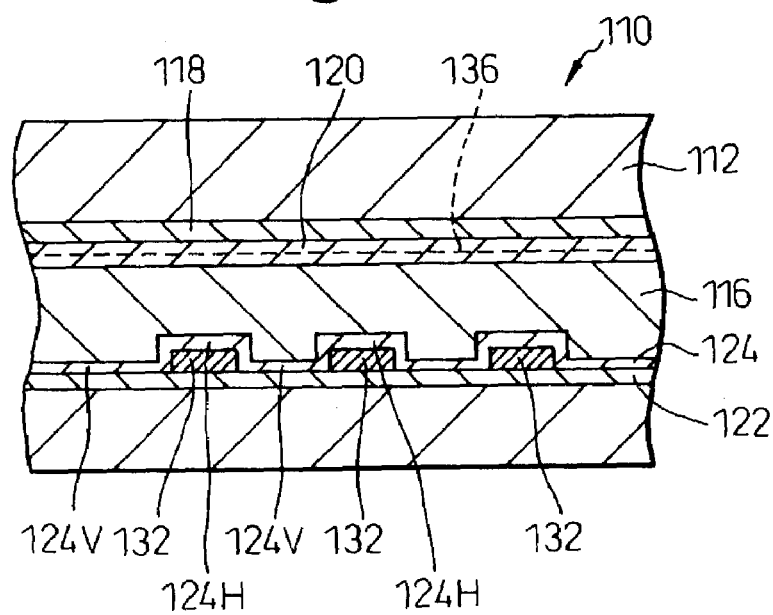
FIG. 17 is a sectional view schematically illustrating the liquid crystal display device according to the fourth embodiment of the present invention.

FIG. 17 is a sectional view schematically illustrating the liquid crystal display device according to the fourth embodiment of the invention. In this embodiment, as in the embodiment of FIG. 11, the structures 132 are arranged between the pixel electrodes 122 and the orientation film 124. Further, the structures 136 are arranged between the pixel electrodes 118 and the orientation film 120 on the first glass substrate 112. The structures 136 are formed having the same patterns as the structures 132, and are arranged at right angles with, or at an angle of 85 degrees with respect to, the structures 132. In this case, the first glass substrate 112 is not rubbed.

In producing the illustrated liquid crystal display device, structures 132 and 136 of a width of 5 µm were formed on the electrodes 118 and 122 of the first and second glass substrates 112 and 114 by using the Resist S1808 of Shipley Co. maintaining the same gap in a manner that the patterns thereof were stuck together with the lengthwise directions thereof at right angles with each other. Here, the structures 132 and 136 possessed a height of 0.7 µm. Then, the material for a vertical orientation film, JALS-2004 manufactured by JSR Co., was applied to cover the structures 132 and 136 to thereby form the orientation films 120 and 124. The two glass substrates 112 and 114 were stuck together, and between which was-injected chiral-containing positive liquid crystal to fabricate a liquid crystal cell.

Figure 18:
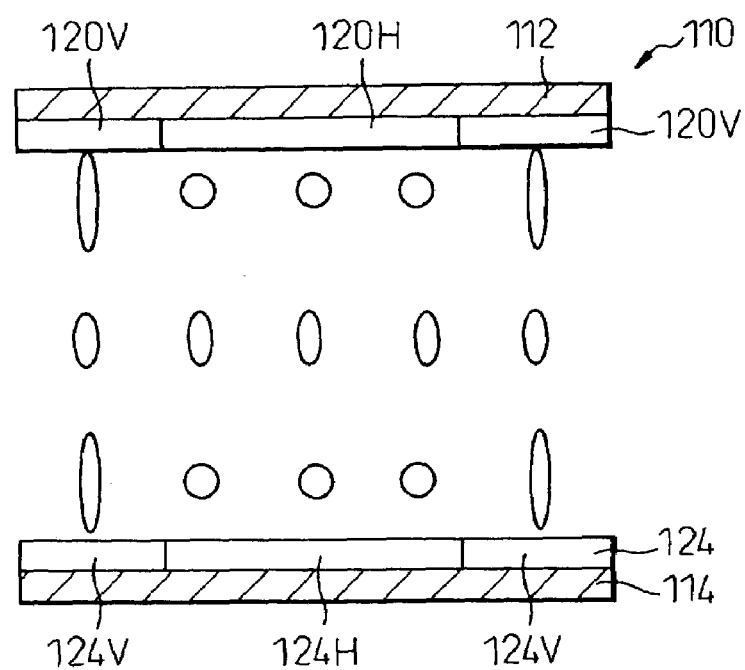
FIG. 18 is a sectional view schematically illustrating the operation of the liquid crystal display device of FIG. 17.

FIG. 18 is a sectional view schematically illustrating the operation of the liquid crystal display device 110 of FIG. 17. Orientation of the liquid crystal cell was observed to reveal that the orientation of the twisted nematic (TN) mode had been formed in the regions forming the structures (132, 136) (in the second orientation regions 124H). The vertical orientation (VA), on the other hand, had been formed in the gaps (first orientation regions 124V) between the structures 132 and 136.

Figure 19:
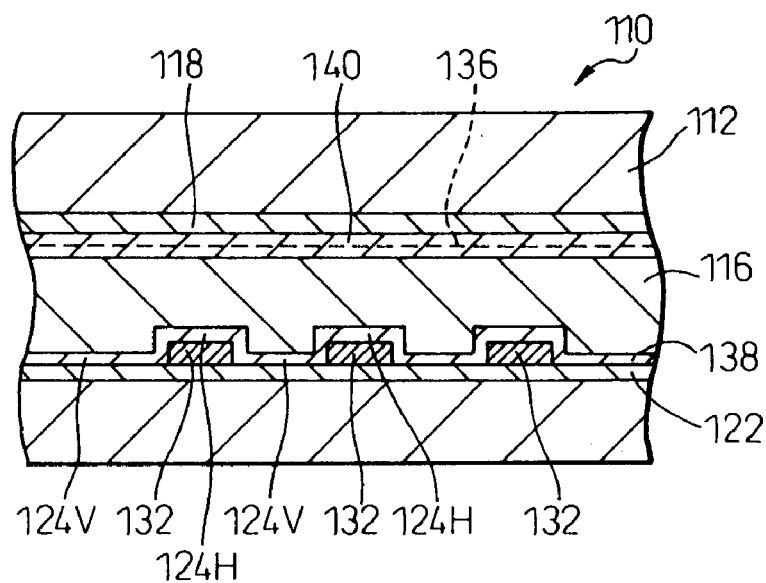
FIG. 19 is a sectional view schematically illustrating the liquid crystal display device according to the fifth embodiment of the present invention.

FIG. 19 is a view schematically illustrating the liquid crystal display device according to the fifth embodiment of the present invention. In FIG. 19, as in the embodiment of FIG. 17, structures 132 and 136 having a width of 5 µm were formed on the first and second glass substrates 112 and 114 using the Resist S1808 of Shipley Co., maintaining the same gap and in a manner that the lengthwise directions of the patterns were 85 degrees relative to each other. The structures 132 and 136 possessed a height of 0.7 µm. In this embodiment, the orientation films 120 and 124 were not applied but, instead, the first and second glass substrates 112 and 114 were stuck together. Then, liquid crystal to which an alkyl-containing compound was added was injected into the thus stuck cell followed by the irradiation with ultraviolet rays. The compounds added to the liquid crystals comprise the following acrylate monomers A and B at a ratio of 15:1.

Monomer A:

$CH_2{:}COO(CH_2)_{17}CH_3$

Monomer B:

$CH_2{:}CHCOO(CH_2)_9OCOH{:}CH_2$

The vertical orientation component in the compounds was adsorbed by the first and second glass substrates 112 and 114 to form orientation control layers 138 and 140. A compound having a straight-chain alkyl structure was used as the element for constituting the orientation control layers 138 and 140, and the second orientation regions 124H for nearly horizontally orienting the liquid crystal molecules possessed a straight-chain alkyl structure which was less dense than that in the first orientation regions 124V for nearly vertically orienting the liquid crystal molecules.

As described above, the liquid crystal to which the straight-chain alkyl-containing compound has been added is injected between the first and second glass substrates 112 and 114, so that the compound is adsorbed by the first and second glass substrates 112 and 114. The layers of the adsorbed compound serve as orientation control layers 138 and 140 exhibiting the vertical orientation action making it possible to omit a process for applying and forming the orientation films 120 and 124. From the standpoint of stability in this case, it is desired that the compound having a straight-chain alkyl possesses a photo reaction group. After the liquid crystals containing the compound having the straight-chain alkyl are injected, the compound may be selectively adsorbed by either the first orientation regions 124V or the second orientation regions 124H (or in larger amounts by the regions of either side). In this case, too, the structures 132 and 136 may be formed to form regions of dissimilar polarities on the substrates 112 and 114, or the selective irradiation with ultraviolet rays may be employed to change the polarities. The structures 132 and 136 adsorb the compound less to define the second orientation regions 124H. When the compound having a photo reaction group is used, the first orientation regions 124V and the second orientation regions 124H are formed depending upon the polarities of the substrates after the injection and after the irradiation with ultraviolet rays.

Observation of orientation of the thus obtained liquid crystal cell revealed that the orientation of the twisted nematic (TN) mode had been formed in the regions irradiated with ultraviolet rays (in the second orientation regions 124H). The vertical orientation (VA), on the other hand, had been formed in the gaps (first orientation regions 124V) among the regions irradiated with ultraviolet rays.

Effect of the Invention:

As will be understood from the foregoing, according to the present invention, a high pretilt angle is obtained in at least the substrate provided with an active matrix without effecting the rubbing. This realizes a liquid crystal display device having an excellent response speed. It is allowed to provide a liquid crystal display device of a high quality while improving the yield of production process and the throughput. It is further allowed to obtain a large pretilt angle by using a compound having an alkyl and, particularly, a material having an acrylate group without applying and forming an orientation film (in a rubbing less system, as a matter of course).

Third Aspect of the Present Invention

As in the first and second aspects described above, the liquid crystal display device according to the third aspect of the present invention may basically have the same structure as that of the customarily used various types of liquid crystal display devices. However, the liquid crystal display device of the third aspect is characterized in that the device has no orientation film or layer but, instead, has a cured resin layer formed by the irradiation with light after the liquid crystal has been injected. For example, the liquid crystal display device of the present invention may be any one of the transmission type, reflection type or projection type if classified depending upon the mode of display. For example, the liquid crystal display device of the transmission type is capable of displaying an image by modulating, in a liquid crystal display panel, the intensity of backlight at the back of the liquid crystal display panel.

Figure 20:
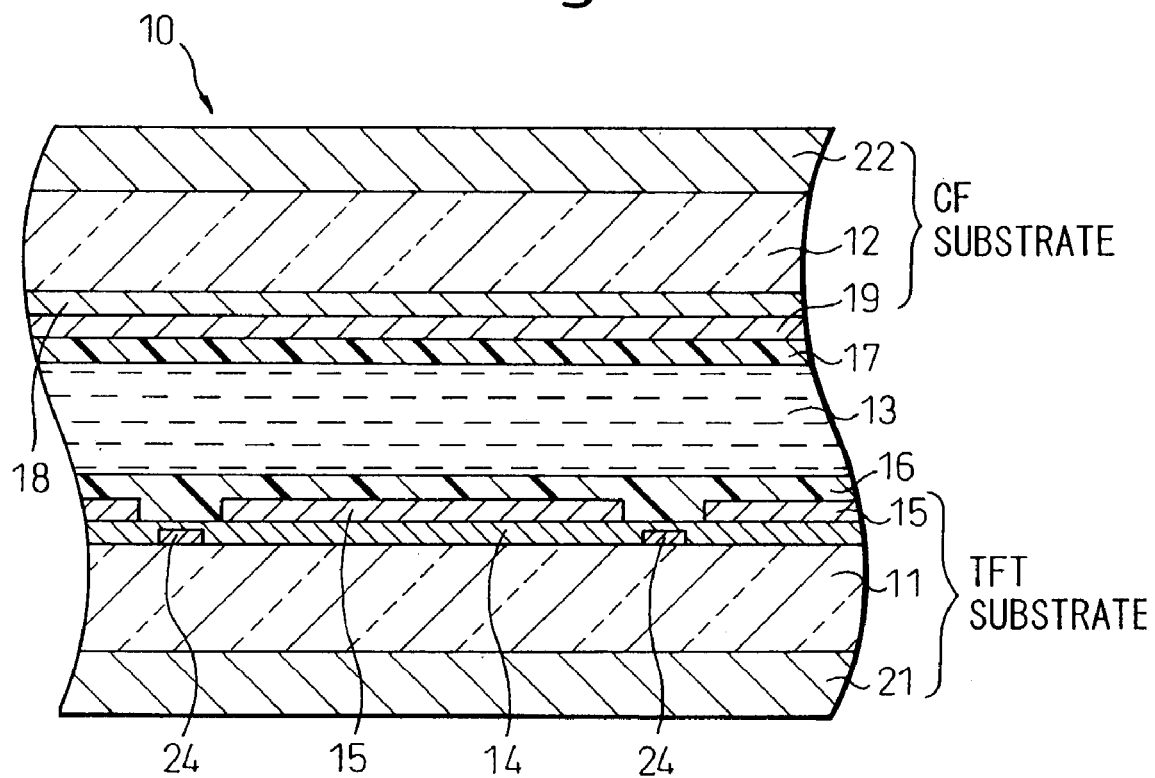
FIG. 20 is a sectional view illustrating the principal constitution of a full-color TFT liquid crystal display device according to the present invention.

FIG. 20 is a sectional view illustrating a main constitution of a full-color TFT (thin-film transistor) liquid crystal display device which is a transmission type liquid crystal display device according to the present invention. This liquid crystal display device comprises a liquid crystal display panel obtained by stacking a TFT substrate and a CF (color filter) substrate together.

A liquid crystal display device 10 comprises a pair of insulating substrates (transparent glass substrates are used in this instance) 11 and 12 facing each other while maintaining a predetermined gap, and a liquid crystal layer 13 held between these substrates. The liquid crystal material constituting the liquid crystal layer 13 may be any liquid crystal material best suited for putting the invention into practice, and can be selected out of many known liquid crystal materials. The liquid crystal material that can be used may be nematic liquid crystal, supertwisted nematic liquid crystal, chiral nematic crystal (cholesteric liquid crystal) or smectic liquid crystal.

A plurality of pixel electrodes 15 are formed, via an insulating layer 14, on one transparent glass substrate 11 that constitutes the TFT substrate, and a resin layer 16 specific to the present invention is so formed as to cover the pixel electrodes 15. The resin layer 16 may be impregnated with a liquid crystal. The insulating layer 14 can be formed of, for example, a silicon oxide film or the like, and the pixel electrodes 15 can be formed of, for example, an ITO (indium-tin oxide) film or the like.

A color filter 18, a common electrode 19 and a resin layer 17 according to the invention are successively laminated on the other transparent glass substrate 12 constituting the CF substrate. The resin layer 17 may be impregnated with the liquid crystal. The color filter 18 may be formed by, for example, printing a coloring material such as dye. Further, the common electrode 19 may be formed of, for example, the ITO film.

Polarizing plates 21 and 22 are mounted on the outer sides of the transparent glass substrates 11 and 12. The polarizing plates 21 and 22 may be polarizing filters or polarizing films. The pixel electrodes 15 are formed together with an active matrix. The illustrated embodiment shows data bus lines 24 of the active matrix. The electrodes may be formed on only one substrate (in the case of, for example, an IPS mode).

Though not illustrated here, a spacer material is interposed between the substrates to constantly maintain a gap between the substrates and to maintain a uniform space for injecting the liquid crystal. Further, a sealing material is provided surrounding the peripheral edges of the substrates to maintain the liquid crystal injected between the substrates sealed without leakage.

In the liquid display device of FIG. 20, the resin layer 16(17) is interposed between the liquid crystal layer 13 and the transparent substrate 11 which is a liquid crystal panel-constituting element. In the liquid crystal display device of the present invention, however, the liquid crystal panel-constituting element is not limited to the substrate only. That is, the liquid crystal panel-constituting elements include a sealing member for sealing the liquid crystals, a spacer material for maintaining the constant gap between the substrates, electrodes formed on the substrate or any other members, in addition to the substrate. The resin layer may be interposed in the interface between the liquid crystal and one of these members or may be interposed in the interfaces among the liquid crystal and two or more members. What is important in the present invention is that the resin layer included therein works in the same manner as the conventional orientation film. Besides, the work can be easily expressed without involving complex processing such as rubbing or optical orientation required by the orientation film. The orientation film used so far is not required for the practice of the present invention. In particular, since the present invention eliminates the need of forming the orientation film by the printing method and others, and thus many advantages such as making it possible to form a resin layer at a small thickness, prevent an organic solvent from being mixed in the resin layer and prevent formation of patterns such as mesh upon printing, can be obtained as will be concretely described below.

The resin layer is formed upon curing of a curable additive which comprises a monofunctional monomer and a polyfunctional monomer in combination after the liquid crystal has been injected into an intermediate product of the liquid crystal display panel, and has such features that it has a mesh or network structure, it is formed covering the surface of the liquid crystal panel-constituting elements, and vertical orientation-expressing functional groups of molecules constituting the curable resin are deriving from the surface of the resin layer being inclined at nearly a constant angle with respect to the surface of, for example, the substrate. Here, the "curable additive" means any compound, as an additive, that can be cured by the application of any kind of energy, such as a photo-curable, thermosetting or electron beam curable monomers, oligomers and other compounds. A photo-curable compound is particularly useful.

Figure 21:
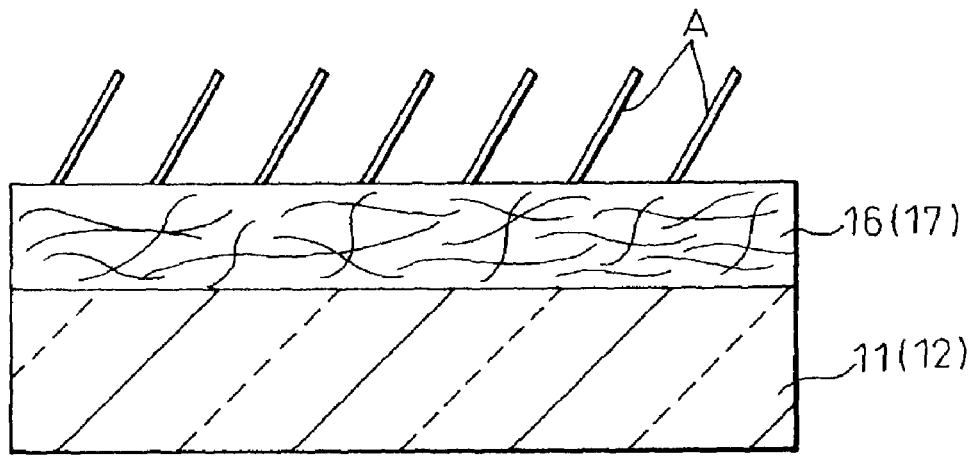
FIG. 21 is a sectional view schematically illustrating a state of a resin layer in the liquid crystal display device of FIG. 20.
Figure 22:
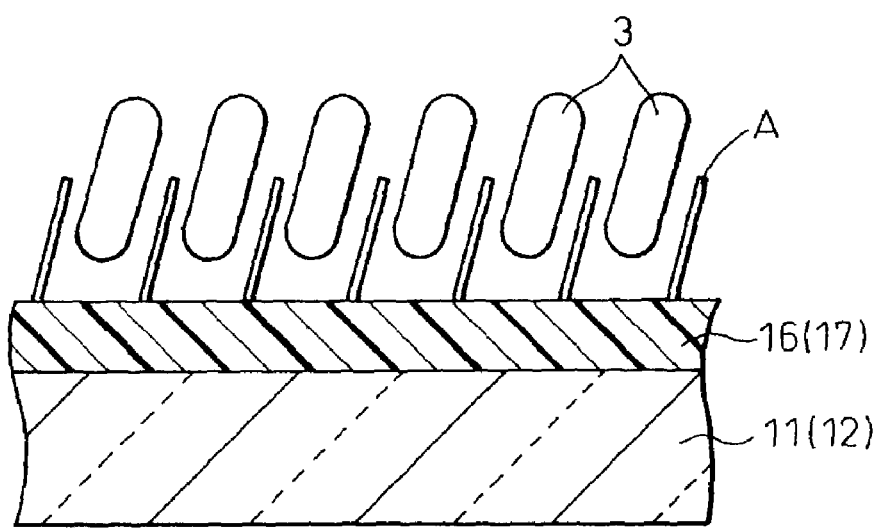
FIG. 22 is a sectional view schematically illustrating a state of orientation of liquid crystal molecules near the resin layer of FIG. 21.

The above features of the resin are schematically illustrated in FIG. 21. That is, the resin layer 16(17) having a mesh structure is formed on the substrate 11(12) to cover the surface thereof. The mesh structure of the resin layer 16(17) is mainly formed based on the crosslinking of the polyfunctional monomer used for the curable additive. Further, the presence of the mesh structure brings about the state of being impregnated with the liquid crystal. For simplicity, the drawing illustrates the resin layer that is directly in contact with the substrate. Usually, however, a liquid crystal panel-constituting element such as an insulating layer, a color filter or an electrode is interposed between the substrate and the resin layer. Besides, the vertical orientation-expressing functional groups A are protruded from the surface of the resin layer 16(17). The vertical orientation-expressing functional groups A are contained in the monomer molecules that are contained in the curable additive. Desirably, the vertical orientation-expressing functional groups A are contained in the monofunctional monomer as described below. In the illustrated embodiment, the vertical orientation-expressing functional groups A are deriving by being inclined at nearly a predetermined angle with respect to the surface of the substrate 11(12). Since the vertical orientation-expressing functional groups A exist in contact with the liquid crystal layer as described above, the liquid crystal display device of the present invention works to vertically orient the liquid crystal molecules 3 maintaining stability as schematically illustrated in FIG. 22. The vertical orientation-expressing functional groups A may be derived vertically to the surface of the substrate 11(12), or the inclined derivation and the vertical derivation may exist in a mixed manner.

In the practice of the present invention, the curable additive undergoes curing by heating depending upon the composition of the additive material, i.e., undergoes curing by the irradiation with various kinds of light such as an ultraviolet ray or by the irradiation with an electron beam, and the resin layer can be formed by any method. A suitable source of light for curing is an ultraviolet ray from the standpoint of easy practice. The present invention, therefore, is described below with particular reference to the ultraviolet-ray curable additive.

The monofunctional monomer and the polyfunctional monomer used as components of the curable additive can be various monomers generally used in the chemistry of polymerization. A monomer suited for the practice of the present invention is a carboxylic acid such as (meth)acrylic acid, olefins such as ethylene and propylene, and vinyl chloride, styrene, etc. Among them, the (meth)acrylic acid monomer is suited for the practice of the present invention in view of curability and controllability of curing.

Though there is no particular limitation, the (meth)acrylic acid monofunctional monomer useful for the practice of the present invention is preferably represented by the following general formula (I):

(I)

wherein $R_1$ is a hydrogen atom or a lower alkyl group such as methyl group or ethyl group, and A is a functional group and, particularly, a functional group (i.e., vertical orientation-expressing functional group referred to in the present invention) which is capable of expressing vertical orientation of liquid crystal molecules when used in a liquid crystal panel, or a unit (can also be called as a portion) containing such a functional group.

The functional group A is preferably represented by the formula $-OR_2$ wherein $R_2$ is an alkyl group and, preferably, a long-chain alkyl group, an alkoxyl group or a halogen atom and, preferably, a fluorine atom. The long-chain alkyl group is, preferably, expressed by the formula $-C_mH_{2m+1}$ wherein m is an integer of, usually, from about 8 to about 18 and, preferably, from about 10 to about 15. The monofunctional monomers may be used alone or in a combination of two or more monomers.

Upon irradiation with a predetermined amount of light such as ultraviolet rays, the (meth)acrylic acid monofunctional monomer of the general formula (I) changes into a poly(meth)acrylate represented by the following general formula (II):

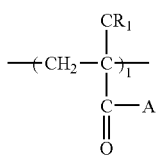

(II)

wherein $R_1$ and A are as defined above, and l is an integer which is, preferably, from about 20 to about 200. The curable additive has a vertical orientation-expressing functional group A on the side chain portions thereof, and is capable of orienting the liquid crystal molecules vertically to the substrate as described earlier with reference to FIG. 22.

The monofunctional monomer represented by the above general formula includes, for example, the following monomers.

MF-1:

$CH_2=CHCOO-C_{12}H_{25}$

MF-2:

$CH_2=CHCOO-F$

MF-3:

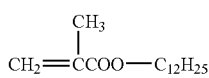

$CH_2=CCOO-C_{12}H_{25}$ (with $CH_3$ substituent)

MF-4:

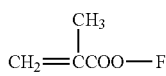

$CH_2=CCOO-F$ (with $CH_3$ substituent)

In the curable additive, there is used a polyfunctonal monomer in combination with the above-described monofunctional monomer. The principal object of using the polyfunctional monomer is that when cured in the curable additive, it forms the above-mentioned mesh structure on the substrate to strongly support the curable additive stemming from the monofunctional monomer, as well as to strongly and efficiently cover the surfaces of the substrate and of other liquid crystal panel-constituting elements. Therefore, the polyfunctional monomer needs not possess the vertical orientation-expressing functional group in the molecules thereof, but must have two or more functional groups that contribute to the curing, such as acryloyl groups or methacryloyl groups. Preferred polyfunctional monomers usually include a bifunctional monomer, a trifunctional monomer and a tetrafunctional monomer as will be described below. As with the above monofunctional monomers, the polyfunctional monomers may be used alone or in a combination of two or more monomers. When two or more polyfunctional monomers are used by being mixed together, there is no limitation on the ratio of mixing the monomers.

Though there is no particular limitation, the (meth)acrylic acid bifunctional monomer useful for the practice of the present invention is preferably those represented by the following general formula (III):

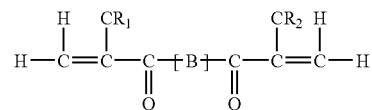

(III)

wherein $R_1$ and $R_2$ may be the same or different and are hydrogen atoms or lower alkyl groups such as methyl groups or ethyl groups, and B is a unit (or can be called as portion or a coupling group) capable of defining a skeleton thereof in the curable additive that is obtained, such as a substituted or unsubstituted straight-chain alkyl group. The bifunctional monomer exhibits a function that is separate from the function of the monofunctional monomer that is used in combination therewith. Therefore, the unit B constituting the molecules of the bifunctional monomer does not contain the vertical orientation-expressing functional group which is essential for the monofunctional monomer.

The bifunctional monomer of the general formula (III) can, preferably, be represented by the following general formula (III-1):

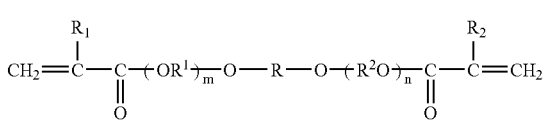

(III-1)

wherein $R_1$ and $R_2$ may be the same or different and are hydrogen atoms or lower alkyl groups such as methyl groups or ethyl groups, $R^1$ and $R^2$ may be the same or different and are lower alkylene groups such as ethylene groups, propylene groups or butylene groups, R is a straight-chain or branched-chain aliphatic hydrocarbon group, a substituted or unsubstituted aromatic hydrocarbon group or a substituted or unsubstituted alicyclic hydrocarbon group, and m and n are, independently from each other, integers of 0 to 4.

The bifunctional monomer represented by the above general formula (III-1) includes the following monomers.

PF-1:

$CH_2=CHCOO-(CH_2)_6-OCOCH=CH_2$

PF-2:

$CH_2=CHCOO-(CH_2)_{10}-OCOCH=CH_2$

PF-3:

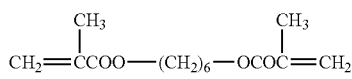

$CH_2=CCOO-(CH_2)_6-OCOC=CH_2$ (with $CH_3$ groups)

PF-4:

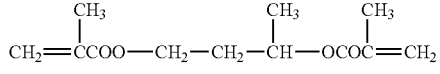

$CH_2=CCOO-CH_2-CH_2-CH-OCOC=CH_2$ (with $CH_3$ groups)

PF-5:

$$CH_2=CHCOO-\underset{F}{\underset{|}{C_6H_3}}-OCOCH=CH_2$$

PF-6:

$$CH_2=CHCOO-C_6H_4-C_6H_4-OCOCH=CH_2$$

PF-7:

$$CH_2=CHCOO-\text{(naphthalene)}-OCOCH=CH_2$$

PF-8:

$$CH_2=CHCOO-\text{(dicyclopentyl)}-OCOCH=CH_2$$

PF-9:

$$\begin{array}{c} CH_2O-(C_2H_4O)_2-COCH=CH_2 \\ | \\ CH_3CCH_3 \\ | \\ CH_2O-(C_2H_4O)_2-COCH=CH_2 \end{array}$$

PF-10:

$$\begin{array}{c} CH_2O-(C_3H_6O)_2-COCH=CH_2 \\ | \\ CH_3CCH_3 \\ | \\ CH_2O-(C_3H_6O)_2-COCH=CH_2 \end{array}$$

Further, the bifunctional monomer of the general formula (III) can, preferably, be represented by the following general formula (III-2), too.

$$CH_2=\underset{R_1}{\underset{|}{C}}-\underset{O}{\underset{\|}{C}}-O-(R^1O)_n-\underset{O}{\underset{\|}{C}}-\underset{R_2}{\underset{|}{C}}=CH_2 \quad (III-2)$$

wherein $R_1$ and $R_2$ may be the same or different and are hydrogen atoms or lower alkyl groups such as methyl groups or ethyl groups, $R^1$ is a lower alkylene group such as an ethylene group, a propylene group or a butylene group, and n is an integer of 0 to 12.

The bifunctional monomer represented by the above general formula (III-2) includes, for example, the following monomers.

PF-11:

$$CH_2=CHCOO-(C_2H_4O)_2-COCH=CH_2$$

PF-12:

$$CH_2=CHCOO-(C_2H_4O)_8-COCH=CH_2$$

PF-13:

$$CH_2=CHCOO-(C_3H_6O)_3-COCH=CH_2$$

PF-14:

$$CH_2=\underset{CH_3}{\underset{|}{C}}COO-(C_3H_6O)_3-CO\underset{CH_3}{\underset{|}{C}}=CH_2$$

Further, the bifunctional monomer of the general formula (III) can, preferably, be represented by the following general formula (III-3), too.

$$CH_2=\underset{R_1}{\underset{|}{C}}-\underset{O}{\underset{\|}{C}}-O-R-(OCO)_m-R'-(OCO)_n-R''-O-\underset{O}{\underset{\|}{C}}-\underset{R_2}{\underset{|}{C}}=CH_2 \quad (III-3)$$

wherein $R_1$ and $R_2$ may be the same or different and are hydrogen atoms or lower alkyl groups such as methyl groups or ethyl groups, R, R' and R" may be the same or different and are straight-chain or branched-chain aliphatic hydrocarbon groups, substituted or unsubstituted aromatic hydrocarbon groups or substituted or unsubstituted alicyclic hydrocarbon groups, and m and n are, independently from each other, 0 or 1.

The bifunctional monomer represented by the above general formula (III-3) includes the following monomers.

PF-15:

$$CH_2=CHCOOCH_2-\underset{CH_3}{\underset{|}{\overset{CH_3}{\overset{|}{C}}}}-CH_2OCO-(CH_2)_4-OCOCH_2-\underset{CH_3}{\underset{|}{\overset{CH_3}{\overset{|}{C}}}}-CH_2OCOCH=CH_2$$

PF-16:

$$CH_2=CHCOOCH_2-\underset{CH_3}{\underset{|}{\overset{CH_3}{\overset{|}{C}}}}-CH_2OCOCH=CH_2$$

PF-17:

Though there is no particular limitation, the (meth)acrylic acid trifunctional monomer useful for the practice of the present invention can, preferably be represented by the following general formula (IV):

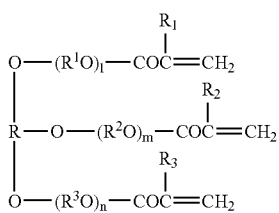

(IV)

wherein $R_1$, $R_2$ and $R_3$ may be the same or different and are hydrogen atoms or lower alkyl groups such as methyl groups or ethyl groups, $R^1$, $R^2$ and $R^3$ may be the same or different and are lower alkylene groups such as ethylene groups, propylene groups or butylene groups, R is a straight-chain or branched-chain aliphatic hydrocarbon group, a substituted or unsubstituted aromatic hydrocarbon group or a substituted or unsubstituted alicyclic hydrocarbon group, and l, m and n are, independently from each other, integers of 0 to 3.

The trifunctional monomer represented by the above general formula (IV) includes the following monomers.

PF-18:

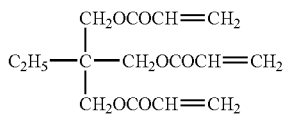

PF-19:

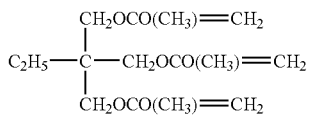

PF-20:

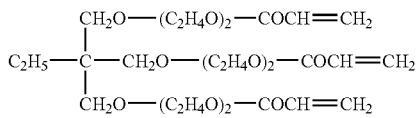

PF-21:

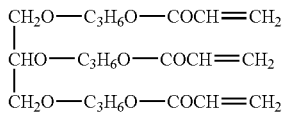

PF-22:

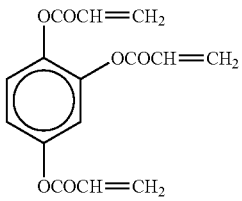

Though there is no particular limitation, the (meth)acrylic acid tetrafunctional monomer useful for the practice of the present invention can, preferably, be represented by the following general formula (V):

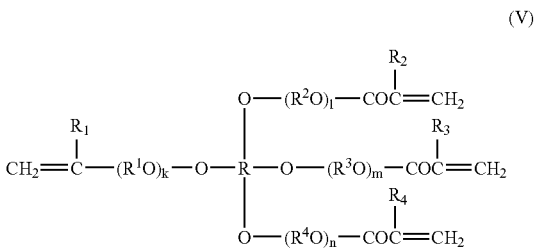

(V)

wherein $R_1$, $R_2$, $R_3$ and $R_4$ may be the same or different and are hydrogen atoms or lower alkyl groups such as methyl groups or ethyl groups, $R^1$, $R^2$, $R^3$ and $R^4$ may be the same or different and are lower alkylene groups such as ethylene groups, propylene groups or butylene groups, R is a straight-chain or branched-chain aliphatic hydrocarbon group, a substituted or unsubstituted aromatic hydrocarbon group or a substituted or unsubstituted alicyclic hydrocarbon group, and k, l, m and n are, independently from each other, integers of 0 to 2.

The tetrafunctional monomer represented by the above general formula (V) includes the following monomers.

PF-23:

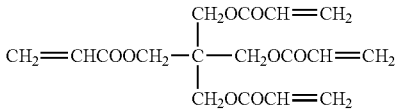

PF-24:

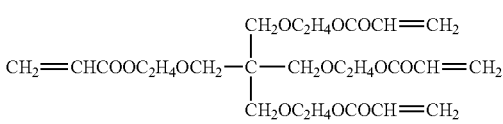

In the curable additive used for forming the resin layer, the monofunctional monomer and the polyfunctional monomer can be used by being mixed together at various ratios depending upon a desired distribution of the vertical orientation-expressing functional groups and upon a desired effect. It is desired that the monofunctional monomer is, usually, used in a molar amount nearly equal to, or larger than, the amount of the polyfunctional monomers. When the amount of the monofunctional monomer becomes smaller than the amount of the polyfunctional monomer or, in other words, when the amount of the polyfunctional monomer becomes greater than the amount of the monofunctional monomer, it becomes no longer possible to distribute the vertical orientation-expressing functional groups as desired and, hence, it becomes difficult to express the vertical orientation to a sufficient degree. It is desired that a molar mass ratio of the monofunctional monomer and the polyfunctional monomer is in a range of from about 1:1 to about 50:1 and, more preferably, from about 5:1 to about 50:1.

The resin layer is constituted solely by the cured resin originated from the above curable additive and may, as required, contain any other additional resin, such as photocured resin originated from a photo-curable material, a thermoset resin from a thermosetting material, or any other resin. A preferred additional resin may be, for example, a dipentaerythritol hexaacrylate (DPHA) or the like. When such a resin is added, there can be expected such effects as reinforced mesh structure, shortened reaction time, etc. Though there is no particular limitation, the amount of adding the additional resin is usually in a range of from about 1 to about 10% by weight on the basis of the whole amount of the cured resin.

Further, the resin layer is formed by curing the curable additive and, hence, has a thickness smaller than that of the conventional orientation film and, further, exhibits performance that is comparable to, or superior to, that of the conventional orientation film despite of its decreased thickness. In fact, the thickness of the orientation film is usually about 80 nm. On the other hand, the thickness of the resin layer of the present invention is usually one-half or not larger than one-half the above thickness, i.e., is in a range of from about 5 to about 40 nm and, preferably, is in a range of from about 10 to about 40 nm.

Furthermore, though the use of a solvent was essential for forming the conventional orientation film, the resin layer can now be formed under a solvent-free condition. Since no solvent is used, it is possible to preclude the problem of environmental pollution, to lower the cost, as well as to avoid undesired reaction between the liquid crystals and the solvent.

In addition, unlike the conventional orientation film, the resin layer is not formed on the surface of the substrate by printing. That is, without passing through the film-forming steps that results in an increase in the number of steps or in an increase in the scale of facilities, the resin layer can be formed through a simple method by using the existing facility. The resin layer is formed, preferably, by injecting a mixture of the liquid crystal and the curable resin into between the substrates and, then, applying energy, such as ultraviolet radiation, thereto.

When the mixture of the liquid crystal and the curable additive is to be injected into between the substrates, the ratio of the liquid crystal and the curable additive can be varied over a wide range depending upon the composition of the liquid crystal and the curable additive. The ratio of the liquid crystal and the curable additive is, usually, in a range of from about 10:1 to about 400:1 and, preferably, from about 20:1 to about 200:1. When the ratio of the liquid crystal is smaller than, or larger than, the above range, the obtained liquid crystal display panel fails to express a satisfactory display function.

Described below is a liquid crystal layer arranged between the substrates that are facing each other. There is no particular limitation on the liquid crystal material that constitutes the liquid crystal layer, and any one that is best suited for the drive system and the like of the liquid crystal display device may be selected out of many liquid crystal materials that have been well known in this field of technology. In particular, in the practice of the present invention, there can be advantageously used a liquid crystal material that exhibits a negative dielectric anisotropy and in which the long axes of the molecules of liquid crystal are oriented nearly perpendicularly to the substrate when no voltage is applied. What is important in the present invention is that the liquid crystal layer can be constituted solely by the liquid crystal material only without the need of using the conventionally employed high-molecular weight dispersion-type liquid crystals that drive up the cost. Namely, the present invention uses a high-molecular weight and non-dispersion-type liquid crystal.

In general, the liquid crystal materials suited for forming the liquid crystal layer include nematic liquid crystal, supertwisted nematic liquid crystal, chiral nematic liquid crystal (cholesteric liquid crystal), smectic liquid crystal, discotic liquid crystal and high-molecular liquid crystal. If stated as the compound names, these liquid crystal materials are the compounds of the ester type, biphenyl type, cyclohexane type, phenylpyrimidine type and dioxane type.

The above liquid crystal materials may be used alone or in combination of two or more kinds. If more detailed description is necessary concerning the liquid crystal materials that can be used in the practice of the present invention, reference should be made to, for example, Japanese Unexamined Patent Publications (Kokai) Nos. 6-211710 and 11-116512.

In addition to the liquid crystal display device having a panel structure comprising a pair of substrates arranged being opposed to each other and a liquid crystal sealed between these substrates, the present invention further resides in a method of producing the above liquid crystal display device. Namely, the method of producing the liquid crystal display device according to the present invention comprises:

a step of injecting a mixture of the liquid crystal and the curable additive comprising a monofunctional monomer and a polyfunctional monomer into between the substrates; and a step of applying energy from the external side to cure the curable resin, such as a step of irradiating a predetermined amount of light of a wavelength and for a period of time enough for curing the additive when it is, for example, a photo curable resin. When the curable additive is thus cured, the resin layer having a mesh structure can be selectively formed on the interface between the liquid crystal and the liquid crystal panel-constituting element in contact with the liquid crystal as described above with reference to FIG. 21. In this resin layer, as also shown in FIG. 21, further, the vertical orientation-expressing functional groups of molecules constituting the curable additive are derived from the surface of the resin layer being inclined at nearly a predetermined angle with respect to the surface of the substrate. As described earlier, further, the vertical orientation-expressing functional groups can also be derived from the surface of the resin layer vertically or in other directions.

Figure 23:
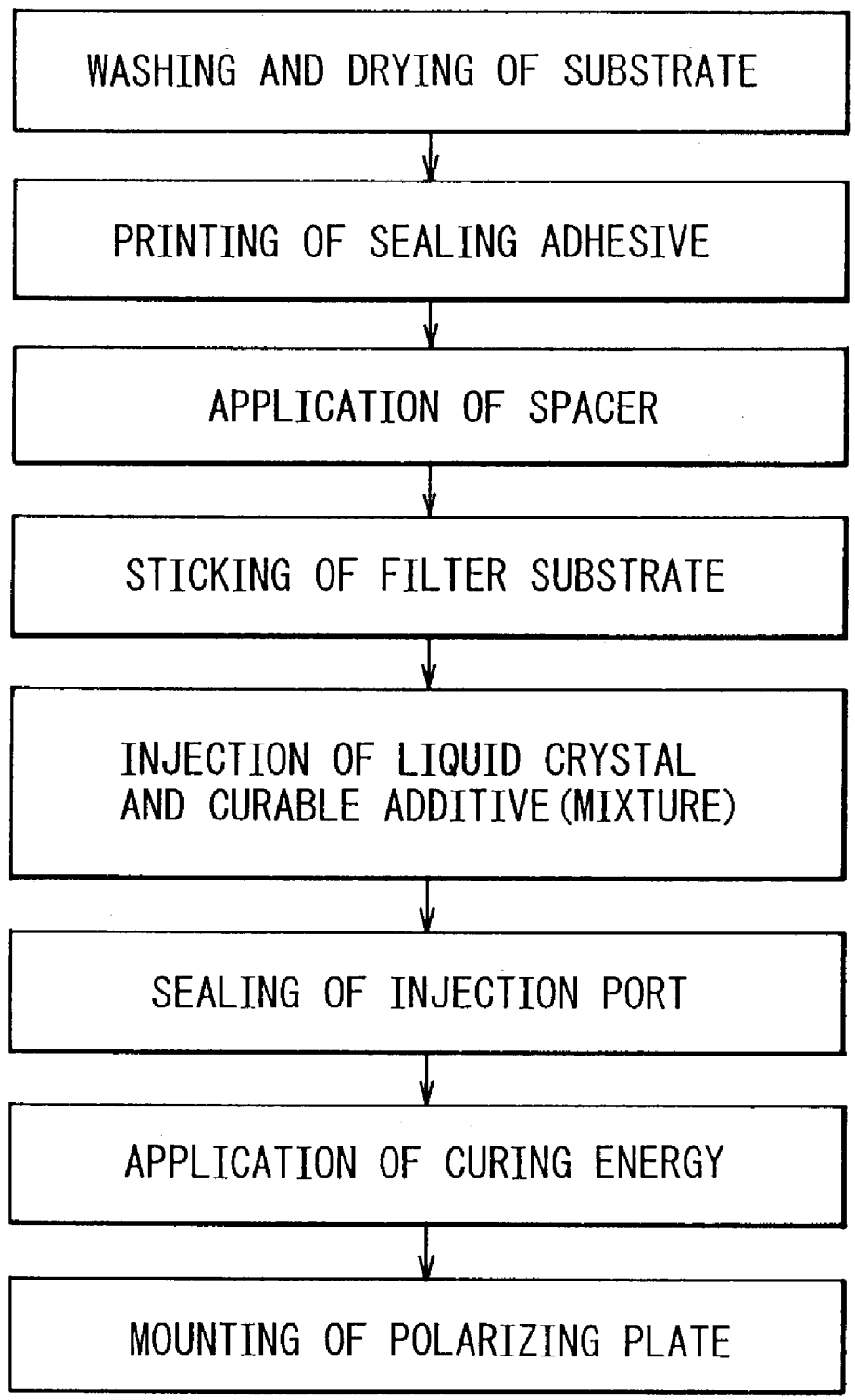
FIG. 23 is a flowchart illustrating the steps of producing a liquid crystal display panel according to the present invention.

The method of producing the liquid crystal display device according to the invention can be advantageously carried out, usually, according to a procedure shown in FIG. 23. Namely, the production method of the present invention is advantageously carried out through the following steps:
(1) Washing and drying the substrates;
(2) Printing the sealing material (seal adhesive);
(3) Applying the spacer material;
(4) Sticking a filter (CF) substrate;
(5) Injecting a mixture of the liquid crystal and the curable additive;
(6) Sealing the liquid crystal injection port;
(7) Applying energy for curing; and
(8) Attaching a polarizing plate.

After the liquid crystal display panel is completed by attaching the polarizing plate, predetermined circuits are fabricated to surround the liquid crystal display panel to complete a desired liquid crystal display device. Here, the liquid crystal display device referred to in the present invention includes a variety of display devices of the flat type. Though not limited to those listed below, representative examples include display devices of personal computers (desktop PCs and notebook PCs), liquid crystal TVs, car navigation systems, digital cameras, video cameras and cell phones.

In the practice of the present invention, first, a pair of substrates are prepared. Here, the substrates are desirably transparent insulating substrates. Suitable insulating substrates include, for example, glass substrates, silicon substrates and others. As required, plastic substrates may be used.

It is usually necessary that the substrates are washed and dried so that contaminating substances such as dust and dirt, skin fat and oil are removed. The washing step may be, for example, an ultrasonic washing using detergents and pure water, and immersion washing using an organic solvent such as isopropyl alcohol. The drying step may be conducted by the forced drying such as blowing the compressed dry air or gas.

Next, electrodes are formed on the substrates. The electrodes formed herein are, for example, common electrodes and pixel electrodes. In the category of electrodes are also included the contact electrodes and transfer electrodes that are for electrically connecting the electrodes together, such as electrically connecting the common electrode and the pixel electrodes together. These electrodes are usually formed by using ITO, indium oxide (IO) or tin oxide (NESA™) in a desired pattern maintaining a desired thickness. The films are formed by utilizing the sputtering method or the evaporation method.

Next, a sealing member is printed onto the peripheral edge portions except the liquid crystal injection port of the substrate as means for sealing the liquid crystal after injected in the liquid crystal panel. The sealing member used herein usually comprises an adhesive and can, hence, be called a sealing adhesive. The sealing adhesive usually comprises an epoxy resin. To print the sealing adhesive onto a predetermined region of the substrate, there is advantageously used a printing method such as screen printing. After the printing of the sealing adhesive has been completed, a spacer material is applied between the substrates through sprinkling to maintain a gap between the element substrate (e.g., TFT substrate) and the CF substrate. The spacer material may be, for example, a resin, a glass or silica. The spacer material can be used in various forms such as, usually, small beads or rods.

Next, the substrates are stacked one upon the other; e.g., the element substrate (such as TFT substrate) and the CF substrate are correctly positioned and stacked one upon the other, and are stuck together with the sealing adhesive that has been printed already. It is further desired to effect the heating in combination to strongly join the substrates together. Thus, there is competed a panel structure (so-called "precursor of the liquid crystal panel") into which the liquid crystal is to be injected.

Then, a mixture of the liquid crystal and the curable additive is injected into the thus obtained panel structure through the liquid crystal injection port. The liquid crystal/curable additive (mixture) used herein include mixtures of various kinds and compositions as described above. As an injection means, further, there can be used various devices. From the standpoint of correctly controlling the amount of injection, in particular, there can be advantageously used an injector of the dripping type. It is desired that the injection processing is executed in vacuum.

After the injection of the liquid crystal/curable additive (mixture) has been completed as described above, the liquid crystal injection port which is open in the panel structure is sealed. Suitable sealing means may be the sealing adhesive used above or any other adhesive, or other adhesive resins.

Figure 24A:
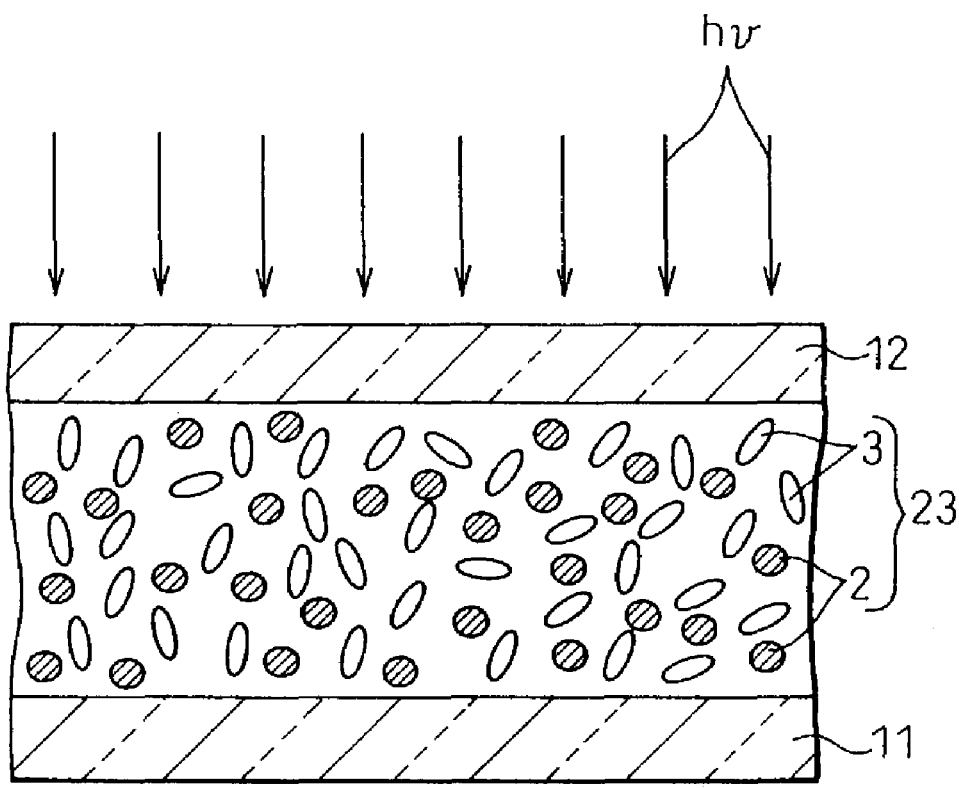
FIGS. 24A and 24B are sectional views successively illustrating the steps of forming the resin layer according to the present invention.

Then, energy for curing the additive is applied to the liquid crystal/curable additive (mixture) injected into between the substrates of the panel structure from the external side as shown in FIG. 24A. In the illustrated embodiment, the photo curable monomer is used for forming the resin layer and is irradiated with light energy hυ. As shown, the panel structure has two pieces of substrates 11 and 12 facing each other, and the liquid crystal/curable additive (mixture) 23 comprising the curable additive 2 and the liquid crystal 3 is arranged in between. In a stage prior to applying energy, the curable additive 2 and the liquid crystal 3 are dispersed in a random fashion.

Figure 24B:
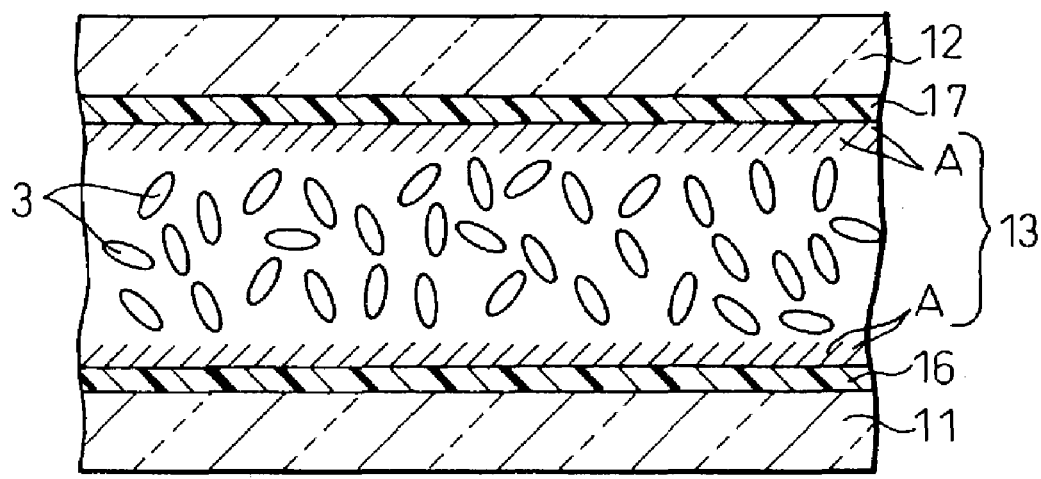

When energy is applied, the curable additive undergoes the curing reaction. Here, unexpectedly, the cured resin being formed migrates toward the interface of the substrates, though the detailed mechanism is not known, and, as shown in FIG. 24B, deposits on the substrates 11 and 12 as resin layers 16 and 17. These resin layers 16 and 17 are strongly bonded in the form of thin films to the respective substrates, and possess a mesh structure. Therefore, gap portions thereof are impregnated with the liquid crystal 3. Further, the resin layers 16 and 17 have vertical orientation-expressing groups A arranged on the surfaces thereof.

After the resin layer is formed as described above, polarizing elements such as a polarizing plate, a polarizing film and a polarizing filter are attached to the outer sides of the substrates of the panel structure.

Figure 25A:
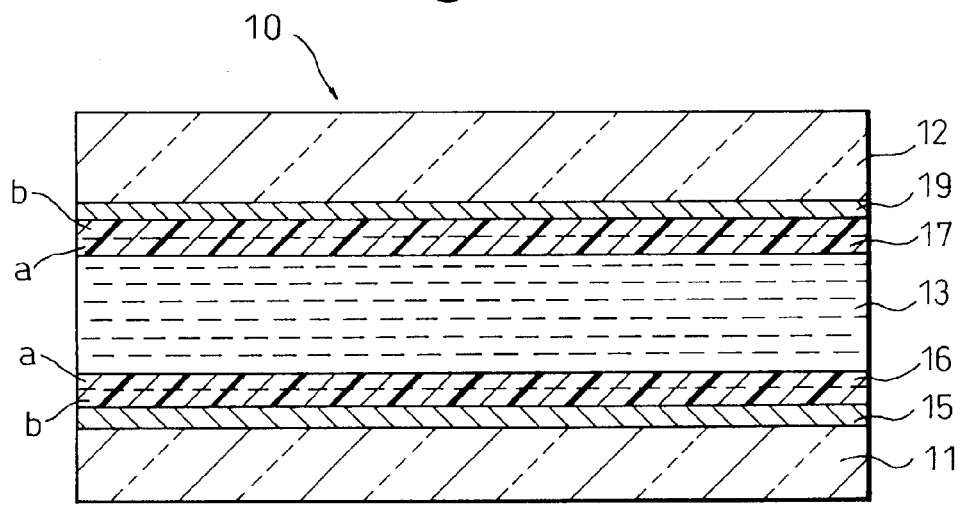
FIGS. 25A and 25B are sectional views illustrating other two embodiments of the liquid crystal display device according to the present invention.

In the liquid crystal display device of the present invention, the resin layer formed by curing the curable additive can assume various states within the scope of the present invention. The resin layer can assume the form of a single layer as described above with reference to FIG. 21. Even in the case of a single resin layer, the resin layer may be constituted in a form that the resin layer is substantially separated into two layers. Namely, as shown, for example, in FIG. 25A, the resin layer 16 may have a first resin "a" with vertical orientation-expressing functional groups predominantly distributed in the interfacial region relative to the liquid crystal layer 13, and may have a second resin "b" with a mesh structure predominantly distributed in the interfacial region relative to the substrate 11(12).

Figure 25B:
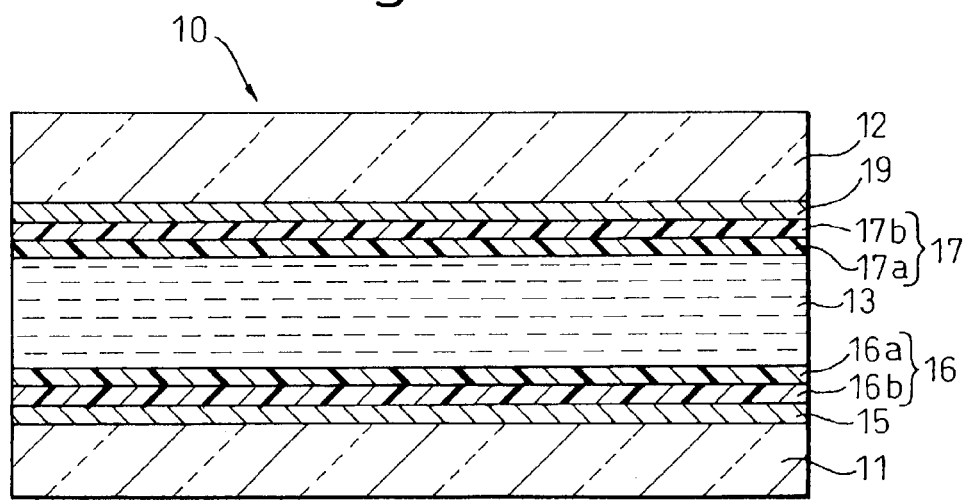

As shown in FIG. 25B, further, the resin layer 16 (or 17) may have a two-layer structure comprising a first resin layer 16a (or 17a) of a first resin formed in contact with the liquid crystal layer 13 and having vertical orientation-expressing functional groups, and a second resin layer 16b (or 17b) of a second resin formed in contact with the substrate 11 (or 12) and having a mesh structure.

The resin layer having the two-layer structure will be further described. It is desired that such a resin layer is formed of two or more kinds of curable additives and that one curable additive exhibits good wettability to the substrate such as a glass substrate and the other curable additive exhibits poor wettability to the substrate. It is further desired that the curable additive exhibiting favorable wettability to the substrate is a polyfunctional material, has a resin skeleton unit and a straight-chain alkyl group bonded thereto and/or a horizontally orienting property. Further, it is desired that the curable additive having poor wettability to the substrate has a liquid crystal orientation controllability for determining the orientation of liquid crystals and, preferably, has vertical orientation-expressing property. Such a curable additive, preferably, has an alkyl or alkoxyl side chain or a fluorine group as a vertical orientation-expressing unit. By using at least two kinds of such curable additives, it becomes possible to obtain a resin layer 16 (or 17) having a two-layer structure which is typically shown in FIG. 25B.

As described earlier, it is necessary that the resin layer has one surface that is in contact with the liquid crystal layer and has another surface that is in contact with one or more liquid crystal panel-constituting elements, such as a substrate, a sealing material for sealing the liquid crystal, a spacer material for constantly maintaining the gap between the substrates and electrodes formed on the substrates. Here, though not limited to those described below only, the liquid crystal panel capable of maintaining a favorable contact relationship between the resin layer and the liquid crystal panel-constituting elements, includes:

(1) a liquid crystal panel having a resin layer formed on the whole main surfaces of the substrates facing each other up and down;

(2) a liquid crystal panel having a resin layer formed on the whole inner wall surfaces of the liquid crystal panel;

(3) a liquid crystal panel having a resin layer formed on the side surface of the sealing material sealing the gap between the upper and lower substrates of the liquid crystal panel;

(4) a liquid crystal panel having a resin layer formed on the surfaces of the spacer material sprinkled to constantly maintain a gap between the upper and lower substrates of the liquid crystal panel; and (5) a liquid crystal panel having a resin layer formed on the surfaces of electrodes of the liquid crystal panel, such as a liquid crystal panel having a resin layer formed on the side surface of a connection pad electrode (so-called transfer electrode) formed for obtaining a common voltage of, for example, the opposing substrate, and for accomplishing an electric connection to the electrodes on the side of the element substrate.

Figure 26A:
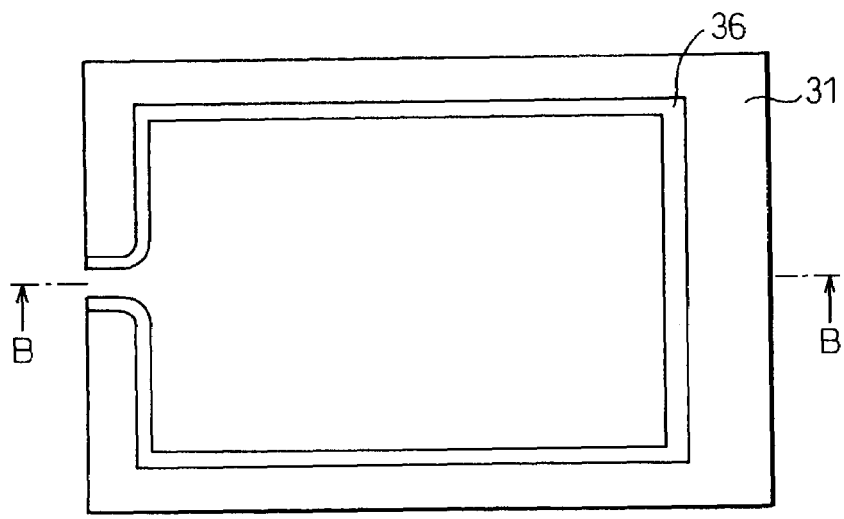
FIGS. 26A and 26B are a plan view and sectional view illustrating a further embodiment of the liquid crystal display device according to the present invention.
Figure 26B:
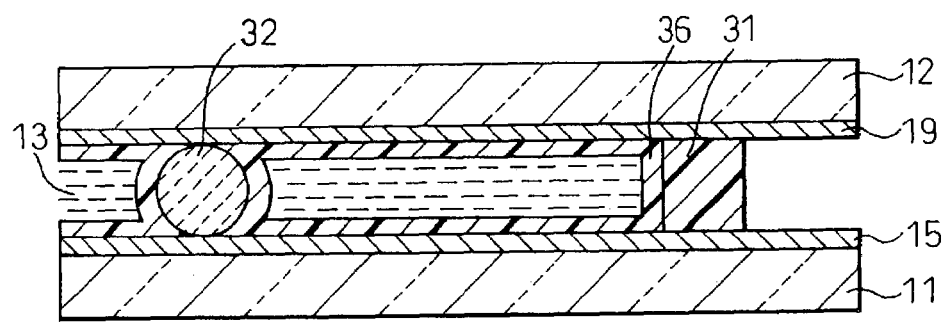

FIGS. 26A and 26B illustrate a preferred embodiment of the liquid crystal display device according to the invention, wherein FIG. 26A is a plan view of a sealing material of the liquid crystal display device, and FIG. 26B is a sectional view along the line B—B in FIG. 26A. It will be understood from FIG. 26A that in this liquid crystal display device, the sealing material 31 has a resin layer 36 applied on the whole side surface thereof. From FIG. 26B, it will be also understood that the resin layer 36 completely covers the whole inner walls defining the liquid crystal layer 13 in the liquid crystal panel, i.e., completely covers the surfaces of the substrates 11 and 12, side surfaces of the sealing material 31 and the surfaces of the spacer material 32.

In the illustrated liquid crystal panel, therefore, the resin layer is formed on the whole surface of the substrate and has no boundary that indicates its presence. In the case of the conventional orientation film, the material for forming the orientation film is applied by printing or application, whereby the end of the orientation film that is formed defines a stepped boundary on the substrate, creating a contrast to the present invention. The boundary on the step is very likely to adversely affect the display characteristics of the liquid crystal display device. In the case of the liquid crystal display device of the present invention, therefore, the orientation can be uniformly specified on the whole inner wall surface of the liquid crystal panel.

Figure 27:
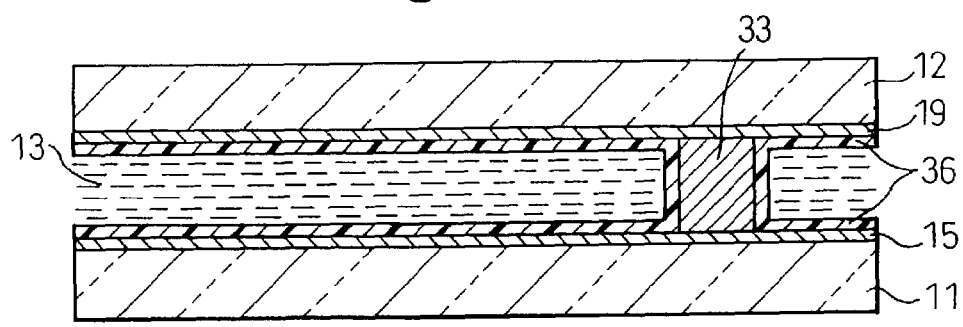
FIG. 27 is a sectional view illustrating a further embodiment of the liquid crystal display device according to the present invention.

FIG. 27 is a view illustrating another preferred embodiment of the liquid crystal display device of the present invention. This liquid crystal display device is provided with a pad electrode (so-called transfer electrode) 33 for electrically connecting the opposing electrode to the common electrode 15 on the element substrate 11, so that the voltage of the opposing electrode 19 of the TFT substrate 12 serves as a common voltage. The resin layer 36 covering the whole surfaces of the substrates 11 and 12, is further formed on the side surface of the pad electrode 33. The resin layer 36 that is thus formed on the whole surface makes it possible to uniformly specify the liquid crystal orientation over the whole inner wall surface of the liquid crystal panel and, hence, to avoid abnormal orientation that occurs conspicuously in the conventional devices. This is because, in the conventional liquid crystal display device equipped with the orientation film, though not illustrated, no orientation film is formed on the side surface of the pad electrode and no orientation film exists, either, on the base portion of the pad electrode (connection portion to the substrate), accounting for a cause of abnormal orientation inclusive of edge portion of the orientation film that is printed.

Further, though this can be applied to all the liquid crystal panels of the present invention, it becomes also possible to decrease the thickness of the resin layer to smaller than that of other regions or to decrease the amount of the resin relative to other portions on the inner surfaces of the black matrix or of the TFT bus. In other words, the probability of presence of the cured resin is relatively low at such portions.

It is further possible to add many improvements and modifications to the liquid crystal display device of the present invention within the scope of the present invention. In the liquid crystal display device of the present invention, for example, it is desired to form convex patterns (a so-called bank structure) or concave patterns (a so-called slit structure), alone or in combination, on the substrate. A pixel region is divided into two or more regions with the convex patterns or with the concave patterns to thereby form a plurality of regions in which the liquid crystal molecules are oriented differently to obtain a distinguished advantage as represented by the improved visual angle characteristics.

The bank structure can be formed on the substrate in the form of ridged protuberances having a triangular, corrugated or trapezoidal sectional shape or in any other protruded shape. The bank structure can be advantageously formed by applying a photosensitive material such as photoresist onto the substrate, exposing the photosensitive material to light by a photolithographic method, followed by developing and printing. The size of the bank structure can be varied over a wide range and, usually, has a width of about 5 to about 20 μm and a height of about 0.5 to 3 μm. Upon providing the above bank structure on the substrates, the convex patterns are reproduced on the surface of the resin layer on the substrates to accomplish a predetermined division of orientation.

In the above bank structure, the division of orientation is accomplished as described below. In the liquid crystal panel of the present invention, the resin layer is formed on the surfaces of the substrates making it possible to vertically orient the liquid crystal molecules of the liquid crystal layer held between the substrates with respect to the substrates. At a position where the bank structure is provided on the substrate, the liquid crystal molecules are vertically oriented relative to the bank structure and are oriented aslant relative to the substrate. The bank structure has inclined side surfaces on both sides thereof. Therefore, the direction of orientation of liquid crystal molecules oriented vertically to one side surface of the bank structure becomes opposite to the direction of orientation of liquid crystal molecules oriented vertically to the side surface on the opposite side of the same bank structure. It is thus allowed to accomplish the division of orientation in one pixel region.

The slit structure can be formed by forming grooves of a striped shape or of any other shape in the surface of the substrates. Contrary to the bank structure, the grooves are usually patterned in an inverse triangular shape or an inverse trapezoidal shape in cross section, or in a square shape in cross section from the standpoint of patterning the electrodes like slits. The slit structure is advantageously formed simultaneously with, or after, the patterning for forming electrodes on the substrates. The size of the slit structure can be varied over a wide range but, usually, has a width of about 5 to 20 µm and a depth of about 0.02 to about 3 µm. When such a slit structure is formed on the substrates, the slit patterns are reproduced on the surface of the resin layer impregnated with the liquid crystals on the substrates to accomplish a desired division of orientation. The mechanism of dividing the orientation is basically the same as that of the above-mentioned bank structure, or is due to the orientation by the transverse electric field formed from the electrodes toward the slits.

Figure 28:
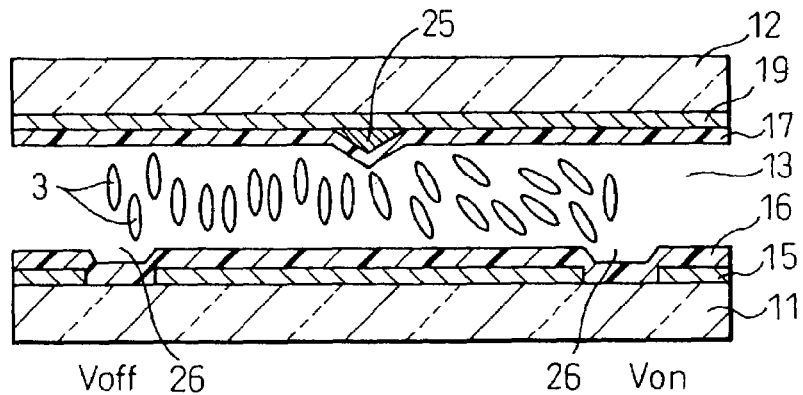
FIG. 28 is a sectional view illustrating a further embodiment of the liquid crystal display device according to the present invention.
Figure 29:
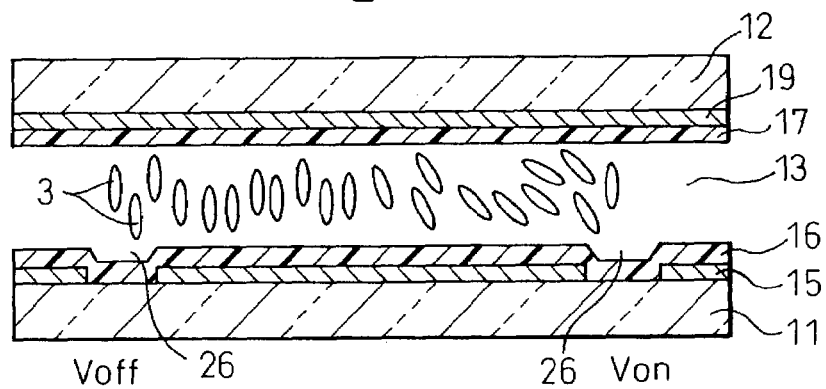
FIG. 29 is a sectional view illustrating a further embodiment of the liquid crystal display device according to the present invention.
Figure 30:
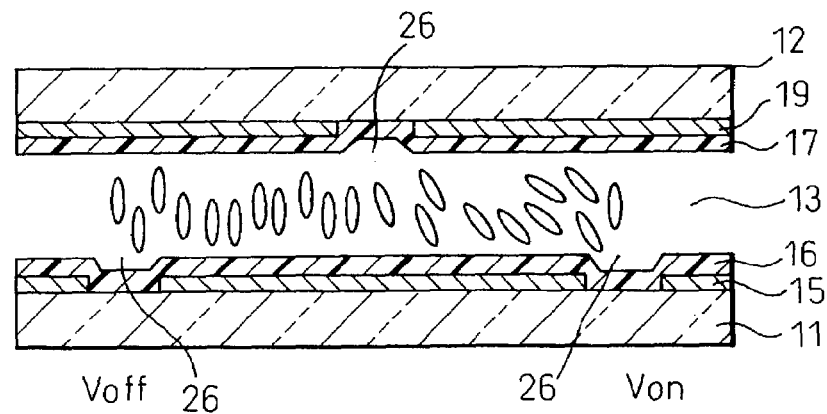
FIG. 30 is a sectional view illustrating a further embodiment of the liquid crystal display device according to the present invention.

FIGS. 28 to 30 illustrate preferred embodiments of the liquid crystal display device of the present invention improving the surface of the liquid crystal-impregnated resin layer for dividing the orientation according to the above-mentioned method.

In the liquid crystal panel of FIG. 28, slits 26 are formed on the side of the element substrate 11. The slits 26 stem from the striped grooves that have been formed in advance in the pixel electrode 15 on the element substrate 11. The resin layer 16 on the pixel electrode 15 reproduces the groove pattern and specifies the slits 26. A bank structure 25 having nearly a triangular shape in cross section is provided on the side of the CF substrate 12 facing the element substrate 11 at a position midway between the two slits 26. The bank structure 25 is usually provided at a position corresponding to the data bus line of the element substrate 11 in parallel therewith. The bank structure 25 is formed on the common electrode 19 on the CF substrate 12, and the liquid crystal-impregnated resin layer 17 on the common electrode reproduces the protruded pattern of a triangular shape.

In the liquid crystal panel of FIG. 29, slits 26 are formed on the side of the element substrate 11 like in the liquid crystal panel of FIG. 28. The slits 26 stem from the striped grooves that have been formed in advance in the pixel electrode 15 on the element substrate 11. The resin layer 16 on the pixel electrode 15 reproduces the groove pattern and specifies the slits 26. Neither the slits nor the bank structure are provided on the side of the CF substrate 12 facing the element substrate 11. That is, the common electrode 19 is formed on the CF substrate 12, and the resin layer 17 is formed on the common electrode 19.

In the liquid crystal panel of FIG. 30, slits 26 are formed on the side of the element substrate 11 as in the liquid crystal panel of FIGS. 28 and 29. The slits 26 stem from the striped grooves that have been formed in advance in the pixel electrode 15 on the element substrate 11. The resin layer 16 on the pixel electrode 15 reproduces the groove pattern and specifies the slits 26. A slit 26 is further formed on the side of the CF substrate 12 facing the element substrate 11. That is, the common electrode 19 is formed on the CF substrate 12, and the resin layer 17 is formed on the common electrode 19. This slit 26 is located at a position midway between the two slits 26 of the element substrate 11.

In the case of an ordinary liquid crystal panel, further, the CF substrate and the element substrate such as the TFT substrate are arranged opposed to each other, and it is allowable to incorporate a color filter on the side of the element substrate though the color filter has heretofore been incorporated on the side of the opposing substrate.

Figure 31:
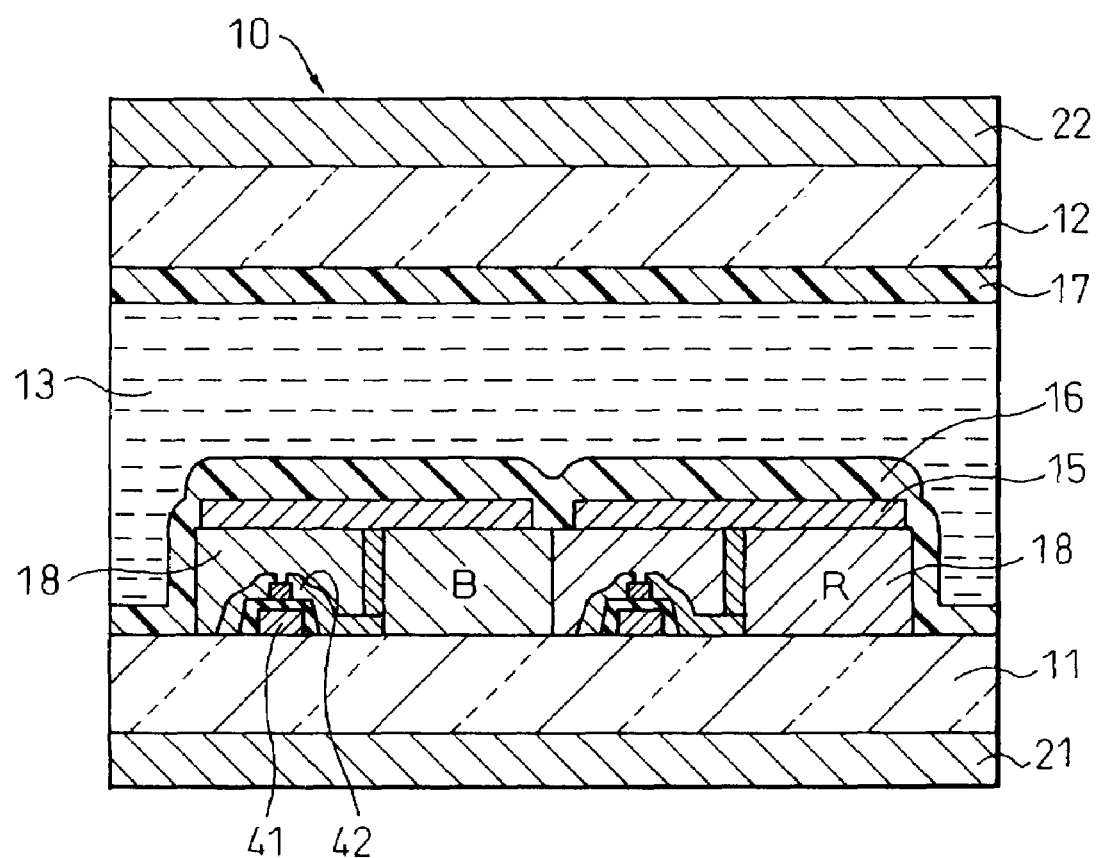
FIG. 31 is a sectional view illustrating a further embodiment of the liquid crystal display device according to the present invention.

FIG. 31 illustrates a typical example of such a liquid crystal display device. The liquid crystal display device 10 includes a pair of insulating substrates (transparent glass substrates) 11 and 12 facing each other while maintaining a predetermined gap, and a liquid crystal layer 13 held between these substrates. A color filter 18 and a pixel electrode 15 are successively formed on one transparent glass substrate 11 constituting the TFT substrate as shown, and the resin layer 16 of the present invention is formed so as to cover the pixel electrode 15.

In the case of this liquid crystal display device, there is no need of forming the CF or the black matrix (BM) on the opposing substrate. Therefore, the resin layer 17 of the present invention is simply formed on the other transparent glass substrate 12 on the side of the liquid crystal layer 13. When energy is applied, in the form of irradiation of light, to form the resin layers 16 and 17, therefore, light that has passed through the glass substrate 12 is guided to the region between the substrates 11 and 12 without being at all hindered; i.e., the resin layers 16 and 17 are formed more efficiently and homogeneously. When thus constituted, further, it is possible to avoid a phenomenon where light for display is shaded at the time of producing a liquid crystal display, and a more homogeneous display is realized.

Effects of the Invention:

As will be understood from the foregoing, according to the present invention, there is provided a liquid crystal display device of high performance without using an orientation film that was essential in the conventional liquid crystal display device and, hence, featuring many advantages stemming from the omission of the step of forming film, the step of orientation (rubbing, optical orientation, etc.) and the step of baking, i.e., featuring a great reduction in the number of steps of production and the time, a great decrease in the cost of production, and improvement in managing the steps and in yield.

Unlike the orientation film, further, the resin layer of the present invention is formed without relying upon the printing or the coating, and is not accompanied by the formation of undesired patterns on the surface thereof, such as mesh pattern (due to the screen that is used) avoiding adverse effect upon the characteristics thereof.

In the liquid crystal display device of the present invention, further, the vertical orientation stems from the resin layer, and remains uniform and stable without being disturbed.

EXAMPLES

The present invention will be further described with reference to examples. It should be noted that the invention is in no way limited to these examples. Though not used, to simplify the description, the curable resin in the following examples may, as required, be blended with polyimide and polyamic acid in suitable amounts, or they may be partly introduced into the structure of the curable resin.

Example 1

Two sheets of glass substrates (trade name "OA-2", manufactured by Nihon Denki Garasu Co.) were prepared, and the surfaces of the respective substrates were washed with IPA and were dried. One substrate was applied with a sealing material (trade name "XN-21F", manufactured by Mitsui Kagaku Co.) on the peripheral edge region on one surface thereof to form a seal pattern. Onto one surface of the other substrate was sprinkled a spherical silica spacer material having a diameter of 4 μm (manufactured by Sekisui Fine Chemical Co.) being wetted with ethanol. Then, the substrate with the sealing material and the substrate with the spacer material were stuck together in a manner that the sealing material and the spacer material were on the inside, packed together in a vacuum and were baked at 130° C. The baking was conducted for 90 minutes. There was obtained an empty panel with two pieces of glass substrates stuck together and having a space in between for injecting the liquid crystal.

A monofunctional monomer (trade name "SR-335", manufactured by Nihon Kayaku Co.) represented by the following formula:

$CH_2=CHCOO-C_{12}H_{25}$ and a bifunctional monomer, 1,6-hexanediol diacrylate (trade name, "HDDA", manufactured by Nihon Kayaku Co.) represented by the following formula:

$CH_2=CHCOO-(CH_2)_6-OCOCH=CH_2$ were mixed at a mixing ratio of 15:1. The obtained monomer mixture was mixed in an amount of 2% by weight into nematic liquid crystal (trade name "MLC2002", manufactured by Merck Co.) having a negative dielectric anisotropy. Further, a photo polymerization initiator (trade name "Irgacure 184", manufactured by Ciba Speciality Chemicals Co.) was mixed into a mixture of the liquid crystal and the monomer in an amount of 1% by weight with respect to the total amount of the liquid crystal and the monomer.

The obtained mixture was injected into the empty panel through an opening in the sealing material. The opening was sealed with an epoxy resin. Then, the panel containing the mixture of the liquid crystal and the monomer sealed therein was irradiated with 10 mw of an ultraviolet radiation (wavelengths: 300 to 450 nm) for 3 minutes. The irradiation with the ultraviolet radiation was conducted at room temperature.

Through the observation of the liquid crystal layer of the obtained liquid crystal display panel, it was confirmed that a resin layer in the form of a thin film (about 40 nm) had been formed by the polymerization of the above-mentioned two kinds of monomers. Through the observation of the molecular state of the liquid crystals in the liquid crystal layer, further, it was found that the monomer molecules had been dispersed in the liquid crystal molecules before the irradiation with ultraviolet radiation, and the individual liquid crystal molecules had been oriented nearly in parallel with the surface of the substrate. After the irradiation with ultraviolet radiation, however, the liquid crystal layer had been constituted exclusively by the liquid crystal molecules as a result of polymerization of the monomer, and the liquid crystal molecules had been oriented nearly vertically to the surface of the substrate. Further, the thus produced liquid crystal display panel exhibited excellent driving characteristics and visual angle characteristics, favorably displaying fine color images.

Example 2

The method described in Example 1 above was repeated. In this example, the mixing ratio of the monofunctional monomer and the bifunctional monomer was changed from 15:1 to 1:1.

The liquid crystal layer of the obtained liquid crystal display panel was observed in the same manner as in Example 1 to determine the formation of the resin layer in the form of a thin film (about 40 nm) in the interface between the respective substrates and the liquid crystal layer. It was further determined that, before the irradiation with the ultraviolet radiation, the individual liquid crystal molecules in the liquid crystal layer had been oriented nearly in parallel with the surface of the substrate. After the irradiation with the ultraviolet radiation, however, the liquid crystal molecules had been nearly vertically oriented with respect to the surface of the substrate. Further, the liquid crystal display panel exhibited excellent driving characteristics and visual angle characteristics, favorably displaying fine color images.

Example 3

The method described in Example 1 above was repeated. In this example, the mixing ratio of the monofunctional monomer and the bifunctional monomer was changed from 15:1 to 50:1.

The liquid crystal layer of the obtained liquid crystal display panel was observed in the same manner as in Example 1 to determine the formation of the resin layer in the form of a thin film (about 40 nm) in the interface between the respective substrates and the liquid crystal layer. It was further determined that, before the irradiation with the ultraviolet radiation, the individual liquid crystal molecules in the liquid crystal layer had been oriented nearly in parallel with the surface of the substrate. After the irradiation with the ultraviolet radiation, however, the liquid crystal molecules had been nearly vertically oriented with respect to the surface of the substrate. Further, the liquid crystal display panel exhibited excellent driving characteristics and visual angle characteristics, favorably displaying fine color images.

Comparative Example 1

The method described in Example 1 above was repeated. In this comparative example, the mixing ratio of the monofunctional monomer and the bifunctional monomer was changed from 15:1 to 1:2 for the purpose of comparison.

The liquid crystal layer of the obtained liquid crystal display panel was observed in the same manner as in Example 1 to determine the formation of the resin layer in the interface between the respective substrates and the liquid crystal layer, which, however, was not the distinct thin film that was formed in Example 1. It was further determined that, before the irradiation with the ultraviolet radiation, the individual liquid crystal molecules in the liquid crystal layer had been oriented nearly in parallel with the surface of the substrate. Even after the irradiation with the ultraviolet radiation, however, there was no change and the liquid crystal molecules remained horizontally oriented. As the liquid crystal molecules had not been vertically oriented, a desired image could not be displayed even by driving the liquid crystal display panel.

Comparative Example 2

The method described in Example 1 above was repeated. In this comparative example, the mixing ratio of the monofunctional monomer and the bifunctional monomer was changed from 15:1 to 60:1 for the purpose of comparison.

The liquid crystal layer of the obtained liquid crystal display panel was observed in the same manner as in Example 1 to determine the formation of the resin layer in the interface between the respective substrates and the liquid crystal layer, which, however, was not the distinct thin film that was formed in Example 1. It was further determined that, before the irradiation with the ultraviolet radiation, the individual liquid crystal molecules in the liquid crystal layer had been oriented nearly in parallel with the surface of the substrate. Even after the irradiation with the ultraviolet radiation, however, there was no change and the liquid crystal molecules remained horizontally oriented. As the liquid crystal molecules had not been vertically oriented, a desired image could not be displayed even by driving the liquid crystal display panel.

Example 4

The method described in Example 1 above was repeated. In this example, instead of the 1,6-hexanediol diacrylate, there was used a bifunctional monomer (trade name, "KAYARAD R-684", manufactured by Nihon Kayaku Co.) represented by the following formula:

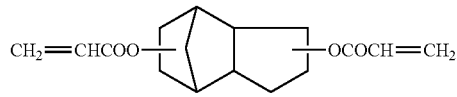

The mixing ratio of the monofunctional monomer and the bifunctional monomer remained to be 15:1.

The liquid crystal layer of the obtained liquid crystal display panel was observed in the same manner as in Example 1 to determine the formation of the resin layer in the form of a thin film (about 40 nm) in the interface between the respective substrates and the liquid crystal layer. It was further determined that, before the irradiation with the ultraviolet radiation, the individual liquid crystal molecules in the liquid crystal layer had been oriented nearly in parallel with the surface of the substrate but, after the irradiation with the ultraviolet radiation, the liquid crystal molecules had been nearly vertically oriented with respect to the surface of the substrate. Further, the liquid crystal display panel exhibited excellent driving characteristics and visual angle characteristics, favorably displaying fine color images.

Example 5

The method described in Example 1 above was repeated. In this example, instead of the 1,6-hexanediol diacrylate, there was used a bifunctional monomer (trade name, "KAYARAD R-268", manufactured by Nihon Kayaku Co.) represented by the following formula:

The mixing ratio of the monofunctional monomer and the bifunctional monomer remained to be 15:1.

The liquid crystal layer of the obtained liquid crystal display panel was observed in the same manner as in Example 1 to determine the formation of the resin layer in the form of a thin film (about 40 nm) in the interface between the respective substrates and the liquid crystal layer. It was further determined that, before the irradiation with the ultraviolet radiation, the individual liquid crystal molecules in the liquid crystal layer had been oriented nearly in parallel with the surface of the substrate but, after the irradiation with the ultraviolet radiation, the liquid crystal molecules had been nearly vertically oriented with respect to the surface of the substrate. Further, the liquid crystal display panel exhibited excellent driving characteristics and visual angle characteristics, favorably displaying fine color images.

Example 6

The method described in Example 1 above was repeated. In this example, instead of the 1,6-hexanediol diacrylate, there was used a bifunctional monomer (trade name, "KAYARAD R-526", manufactured by Nihon Kayaku Co.) represented by the following formula:

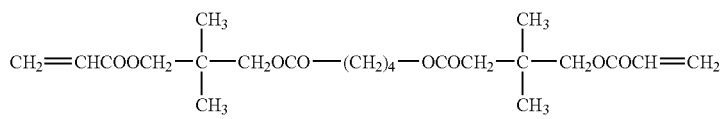

The mixing ratio of the monofunctional monomer and the bifunctional monomer remained to be 15:1.

The liquid crystal layer of the obtained liquid crystal display panel was observed in the same manner as in Example 1 to determine the formation of the resin layer in the form of a thin film (about 40 nm) in the interface between the respective substrates and the liquid crystal layer. It was further determined that, before the irradiation with the ultraviolet radiation, the individual liquid crystal molecules in the liquid crystal layer had been oriented nearly in parallel with the surface of the substrate but, after the irradiation with the ultraviolet radiation, the liquid crystal molecules had been nearly vertically oriented with respect to the surface of the substrate. Further, the liquid crystal display panel exhibited excellent driving characteristics and visual angle characteristics, favorably displaying fine color images.

Example 7

The method described in Example 1 above was repeated. In this example, instead of the bifunctional monomer (1,6-hexanediol diacrylate), there was used a trifunctional monomer (trade name, "KAYARAD SR-502", manufactured by Nihon Kayaku Co.) represented by the following formula as a polyfunctional monomer:

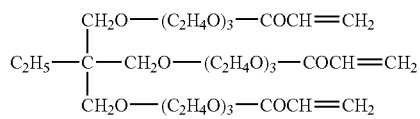

The mixing ratio of the monofunctional monomer and the trifunctional monomer remained to be 15:1.

The liquid crystal layer of the obtained liquid crystal display panel was observed in the same manner as in Example 1 to determine the formation of the resin layer in the form of a thin film (about 40 nm) in the interface between the respective substrates and the liquid crystal layer. It was further determined that, before the irradiation with the ultraviolet radiation, the individual liquid crystal molecules in the liquid crystal layer had been oriented nearly in parallel with the surface of the substrate but after the irradiation with the ultraviolet radiation, the liquid crystal molecules had been nearly vertically oriented with respect to the surface of the substrate. Further, the liquid crystal display panel exhibited excellent driving characteristics and visual angle characteristics, favorably displaying fine color images.

Example 8

The method described in Example 1 above was repeated. In this example, instead of the bifunctional monomer (1,6-hexanediol diacrylate), there was used a tetrafunctional monomer (trade name, "KAYARAD SR-295", manufactured by Nihon Kayaku Co.) represented by the following formula as a polyfunctional monomer.

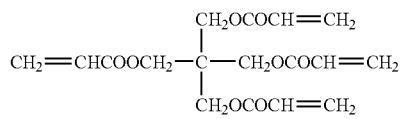

The mixing ratio of the monofunctional monomer and the tetrafunctional monomer remained to be 15:1.

The liquid crystal layer of the obtained liquid crystal display panel was observed in the same manner as in Example 1 to determine the formation of the resin layer in the form of a thin film (about 40 nm) in the interface between the respective substrates and the liquid crystal layer. It was further determined that, before the irradiation with the ultraviolet radiation, the individual liquid crystal molecules in the liquid crystal layer had been oriented nearly in parallel with the surface of the substrate but, after the irradiation with the ultraviolet radiation, the liquid crystal molecules had been nearly vertically oriented with respect to the surface of the substrate. Further, the liquid crystal display panel exhibited excellent driving characteristics and visual angle characteristics, favorably displaying fine color images.

Example 9

The method described in Example 1 above was repeated. In this example, instead of using the bifunctional monomer (1,6-hexanediol diacrylate) alone as the polyfunctional monomer, there was used a mixture of the above bifunctional monomer and the trifunctional monomer (trade name, "KAYARAD SR-502") described in the above Example 7 at a ratio of 1:1. The mixing ratio of the monofunctional monomer and the polyfunctional monomer (mixture of the bifunctional and trifunctional monomers) remained to be 15:1.

The liquid crystal layer of the obtained liquid crystal display panel was observed in the same manner as in Example 1 to determine the formation of the resin layer in the form of a thin film (about 40 nm) in the interface between the respective substrates and the liquid crystal layer. It was further determined that, before the irradiation with the ultraviolet radiation, the individual liquid crystal molecules in the liquid crystal layer had been oriented nearly in parallel with the surface of the substrate, but after the irradiation with the ultraviolet radiation, the liquid crystal molecules had been nearly vertically oriented with respect to the surface of the substrate. Further, the liquid crystal display panel exhibited excellent driving characteristics and visual angle characteristics, favorably displaying fine color images.

Example 10

In this example, a liquid crystal display panel as schematically illustrated in FIGS. 26A and 26B was produced according to the method described in Example 1 above.

A glass substrate 11 with an ITO electrode 15 was prepared, a sealing material (trade name "XN-21F", manufactured by Mitsui Kagaku Co.) was applied onto the peripheral edge region on one surface thereof to form a seal pattern 31. Onto one surface of another piece of the glass substrate 12 with an ITO electrode 19 was sprinkled a spherical silica spacer material having a diameter of 4 μm (manufactured by Sekisui Fine Chemical Co.) being wetted with ethanol. Then, the substrate 11 with the sealing material and the substrate 12 with the spacer material were stuck together in a manner that the sealing material and the spacer material were on the inside, packed together in vacuum and were baked at 130° C. The baking was conducted for 90 minutes. There was obtained an empty panel with two pieces of glass substrates 11 and 12 being stuck together and having a space in between for injecting the liquid crystals.

A monofunctional monomer (SR-335) and a bifunctional monomer (HDDA) were mixed at a mixing ratio of 15:1. The obtained monomer mixture was mixed in an amount of 3% by weight into a nematic liquid crystal (MLC2002) having a negative dielectric anisotropy. Further, a photo polymerization initiator (Irgacure 184) was mixed into a mixture of the liquid crystal and the monomer in an amount of 1% by weight with respect to the total amount of the monomer.

The obtained mixture was injected into the empty panel through an opening in the sealing material. The opening was sealed with an epoxy resin. Then, the panel containing the mixture of the liquid crystal and the monomer sealed therein was irradiated with 10 mw of an ultraviolet radiation (wavelengths: 300 to 450 nm) for 3 minutes. The irradiation with the ultraviolet radiation was conducted at room temperature.

Through the observation of the liquid crystal layer 13 of the obtained liquid crystal display panel, it was confirmed that a resin layer 36 in the form of a thin film (about 30 nm)

had been formed as shown in FIG. 26B by the polymerization of the above-mentioned two kinds of monomers in the interface between the respective substrates 11 (12) and the liquid crystal layer 13, in the interface between the sealing material 31 and the liquid crystal layer 13, and in the interface between the spacer material 32 and the liquid crystal layer 13.

As described above, it is now possible to form the resin layer 36 on the side surface of the sealing material 31 that had so far been in direct contact with the liquid crystal layer and, hence, to stabilize the orientation of the liquid crystal molecules near the sealing material 31. It is therefore possible to decrease the gap between the sealing material 31 and the display pixel (not shown) to be smaller than 0.5 mm. It is further possible to form the resin layer 36 on the side surfaces of the spacer material 32 in addition to the side surface of the sealing material 31 making it possible to control the orientation of the liquid crystal molecules, too, on the surfaces of the spacer material 32.

Besides, in the liquid crystal display panel of this example, though the same applies to other liquid crystal display panels of the present invention, there are obtained many advantages, that draw attention, stemming from the omission of the step of forming an orientation film (e.g., polyimide orientation film) by the printing method (e.g., lithoprinting or relief printing), that was required by the conventional liquid crystal display panels.

First, as no printing method is employed, the surfaces of the resin layer are free of patterns that accompany the printing, such as a mesh that adversely affect the orientation of the liquid crystal.

Further, as no printing method is employed, no step was produced at the end or boundary of the pattern printed on the surface of the substrate. Thus, abnormal orientation due to the formation of steps could be prevented, and the liquid crystal molecules was favorably oriented on the whole screen.

Further, as no printing method is employed, no cumbersome operation is required for dissolving the where material of the orientation film in an organic solvent adjusting the viscosity of the obtained solution was difficult. Further, the use of no organic solvent is advantageous from the standpoint of protecting the environment and avoids defects that may result when the organic solvent remains in the resin layer.

With the conventional printing method, further, it was technically difficult to decrease the thickness of the orientation film. Contrary to this, according to the present invention, since it employs an innovative method of migrating the monomer in the liquid crystal layer toward the substrate side to form a resin layer, by polymerization, it becomes possible to form the resin layer maintaining a very small thickness. In particular, the present invention makes it possible to easily and homogeneously form the film maintaining a thickness of not larger than 40 nm and, particularly, not larger than 30 nm, that could not be realized with the conventional printing method. As the resin layer is formed maintaining such a small thickness, it is possible to apply a highly increased voltage to the liquid crystal layer and, hence, to drive the liquid crystal display panel with a low threshold voltage. Concretely speaking, the threshold voltage to change the state of orientation of the liquid crystal can be lowered by about 0.5 V.

Example 11

In this example, a liquid crystal display panel as schematically illustrated in FIG. 27 was produced according to the method described in Examples 1 and 10 above. In this liquid crystal panel, too, the sealing material and the spacer material were arranged at predetermined positions according to the method described in Example 10 above, but are not diagramed for simplifying the description.

A glass substrate (TFT substrate.) 11 with an ITO electrode (common electrode) 15 was prepared, and a sealing material (trade name "XN-21F", manufactured by Mitsui Kagaku Co.) was applied onto the peripheral edge region on one surface thereof to form a seal pattern. Onto one surface of another piece of the glass substrate (CF substrate) 12 with an ITO electrode (opposing electrode) 19 was sprinkled a spherical silica spacer material having a diameter of 4 μm (manufactured by Sekisui Fine Chemical Co.) being wetted with ethanol. Further, a transfer electrode 33 was formed on a predetermined position of the TFT substrate 11 to electrically connect the common electrode 15 to the opposing electrode 19 of the CF substrate 12 and, hence, to apply a predetermined voltage to the opposing electrode 19. The transfer electrode 33 was formed by depositing a silver paste to a predetermined thickness followed by patterning.

Then, the substrate 11 with the sealing material and the transfer electrode, and the CF substrate 12 with the spacer material were stuck together in a manner that the sealing material and the spacer material were on the inside, packed together in vacuum and were baked at 130° C. The baking was conducted for 90 minutes. There was obtained an empty panel with two pieces of substrates 11 and 12 being stuck together and having a space in between for injecting the liquid crystals.

A monofunctional monomer (SR-335) and a bifunctional monomer (HDDA) were mixed at a mixing ratio of 15:1. The obtained monomer mixture was mixed in an amount of 3% by weight into a nematic liquid crystal (MLC2002) having a negative dielectric anisotropy. Further, a photo polymerization initiator (Irgacure 184) was mixed into a mixture of the liquid crystal and the monomer in an amount of 1% by weight with respect to the total amount of the monomer.

The obtained mixture was injected into the empty panel through an opening in the sealing material. The opening was sealed with an epoxy resin. Then, the panel containing the mixture of the liquid crystals and the monomer sealed therein was irradiated with 10 mW of an ultraviolet radiation (wavelengths: 300 to 450 nm) for 3 minutes. The irradiation with the ultraviolet radiation was conducted at room temperature.

Through the observation of the liquid crystal layer 13 of the obtained liquid crystal display panel, it was confirmed that a resin layer 36 in the form of a thin film (about 30 nm) had been formed as shown in FIG. 27 by the polymerization of the above-mentioned two kinds of monomers in the interface between the respective substrates 11 (12) and the liquid crystal layer 13, and in the interface between the transfer electrode 33 and the liquid crystal layer 13. Further, though not illustrated, it was confirmed that a similar resin layer had been formed as a thin film having a uniform thickness in the interface between the sealing material and the liquid crystal layer, and in the interface between the spacer material and the liquid crystal layer.

As described above, it is possible to form the resin layer 36 on the base portion and side surface of the transfer electrode 33 that had so far been in direct contact with the liquid crystal layer and, hence, to stabilize the orientation of the liquid crystal molecules near the transfer electrode 33. The conventional method required a cumbersome operation of forming an orientation film on the substrate, selectively removing part of it, and forming a transfer electrode on the exposed electrode. This example, however, does not require such a step and contributes greatly to simplifying the steps of production and decreasing the cost of production. According to the conventional method of selectively removing the orientation film, further, the occurrence of defective orientation could not be avoided. This example, however, is free from the above problem of defective orientation.

In addition to the above advantages, this example further offers the advantage obtained in the above Example 10, i.e., the advantage stemming from the formation of the resin layer in the interface between the sealing material and the liquid crystal layer and in the interface between the spacer material and the liquid crystal layer, as well as the advantage stemming from not using the printing method.

Further, the liquid crystal display panel of this example exhibited excellent driving characteristics and visual angle characteristics, favorably displaying fine color images.

Examples 12 to 14

In these examples, liquid crystal display panels provided with bank structures and/or slit structures as schematically illustrated in FIGS. 28 to 30 were produced according to the method described in Examples 1 and 10 above. In these liquid crystal panels, too, the sealing material and the spacer material were arranged at predetermined positions according to the method described in Example 10 above to obtain similar advantages, but are not illustrated to simplify the description.

Further, in any one of these liquid crystal display panels, though not illustrated, the resin layer can be formed in a two-layer structure as described earlier with reference to FIG. 25B. The resin layer of the two-layer structure includes, for example:

Resin 1 . . . a resin constituting a first resin layer on the side of the liquid crystal layer and in which, for example, a side-chain alkyl is bonded to a straight-chain alkyl, such as a (meth)acrylate resin; and Resin 2 . . . a resin constituting a second resin layer on the side of the substrate and in which a straight-chain alkyl is bonded or a skeleton is formed, such as a (meth)acrylate resin;

which were described already in the foregoing.

These resins are mixed together to obtain a resin mixture. Then, for example, the liquid crystals (e.g., nematic liquid crystals exhibiting a negative dielectric anisotropy) and the resin mixture are mixed together at a ratio (weight ratio) of 98:2, and a polymerization initiator is added thereto in an amount of 5% by weight of the resin. Here, the ratio of mixing the resin 1 and the resin 2 suited for obtaining the vertical orientation is, usually, in a range of from 1:1 to 30:1, which may be further extended up to 50:1.

In Example 12 shown in FIG. 28, the liquid crystal layer 13 is sealed between the TFT substrate 11 with the ITO electrode 15 and the CF substrate 12 with the ITO electrode 19. On the TFT substrate 11 is further laminated a resin layer 16 having a slit structure formed due to a step in the ITO electrode 15. The resin layer 16 is formed by the polymerization of the monomer dispersed in the liquid crystal. On the other hand, the ITO electrode 19 and the resin layer 17 are successively formed on the CF substrate 12. On the surface of the resin layer 17 is formed a convex pattern stemming from the bank structure 25 that has been formed in advance on the ITO electrode 19.

In the liquid crystal display panel of the above structure, the liquid crystal molecules 3 in the liquid crystal layer 13 are vertically oriented in a state where no voltage is applied. This is because the resin layer 16(17) in contact with the liquid crystal layer 13 takes part in the orientation of the liquid crystal. Then, when a voltage is applied to the liquid crystal display panel and the electric field is applied aslant, whereby the liquid crystal molecules 3 are tilted in two directions leading to the division of orientation. The division of orientation contributes greatly to improving the speed of response.

In Example 13 shown in FIG. 29, too, the liquid crystal layer 13 is sealed between the TFT substrate 11 with the ITO electrode 15 and the CF substrate 12 with the ITO electrode 19. On the TFT substrate 11 are further laminated the ITO electrode 15 and a resin layer 16 having a slit structure 26. As described above, the resin layer 16 is formed by the polymerization of the monomer dispersed in the liquid crystal. On the other hand, the ITO electrode 19 and the resin layer 17 are successively formed on the CF substrate 12. On the surface of the resin layer 17, however, there is formed no convex pattern stemming from the bank structure unlike the case of the liquid crystal display panel (Example 12) of FIG. 28.

If briefly described for reference, the illustrated liquid crystal display panel can be fabricated in the manner described below when there is used a mixture of the liquid crystal and the resin for forming the resin layer of the above-mentioned two-layer structure.

The TFT substrate 11 and the CF substrate 12 are washed, and are stuck together after a seal is printed onto the peripheries of these substrates. Then, the mixture of the liquid crystal and the resin is injected in vacuum through a portion (injection port) where the sealing is broken. After the mixture is injected, the injection port is sealed with a resin of the type that cures with visible rays. Next, the whole liquid crystal panel is irradiated with ultraviolet radiation. A high-pressure mercury lamp is used as a source of irradiation. As the irradiation with the ultraviolet radiation is through the glass, ultraviolet radiation of shorter wavelength is cut off. Therefore, the absorption edge of the polymerization initiator is so set as to react to light that enters through the glass substrate. Concretely speaking, the absorption edge of the polymerization initiator is set on the side of wavelengths longer than 300 nm. Those which were horizontally oriented or randomly oriented immediately after the injection are now vertically oriented on the whole surface after the irradiation with ultraviolet rays.

In the liquid crystal display panel of the above structure, the liquid crystal molecules 3 in the liquid crystal layer 13 are vertically oriented in a state where no voltage is applied. This is because the resin layer 16(17) in contact with the liquid crystal layer 13 is taking part in the orientation of the liquid crystals. Then, when a voltage is applied to the liquid crystal display panel, the electric field is applied aslant, whereby the liquid crystal molecules 3 are tilted in two directions leading to the division of orientation. The division of orientation contributes greatly to improving the speed of response.

In Example 14 shown in FIG. 30, too, the liquid crystal layer 13 is sealed between the TFT substrate 11 with the ITO electrode 15 and the CF substrate 12 with the ITO electrode 19. On the TFT substrate 11 are further laminated the ITO electrode 15 and a resin layer 16 having a slit structure 26.

As described above, the resin layer 16 is formed by the polymerization of the monomer dispersed in the liquid crystals. On the other hand, the ITO electrode 19 and the resin layer 17 are successively formed on the CF substrate 12. In the surface of the resin layer 17, further, there exists a slit structure 26 stemming from a step in the ITO electrode 19.

In the liquid crystal display panel of the above structure, the liquid crystal molecules 3 in the liquid crystal layer 13 are vertically oriented in a state where no voltage is applied. This is because the resin layer 16(17) in contact with the liquid crystal layer 13 takes part in the orientation of the liquid crystals. Then, when a voltage is applied to the liquid crystal display panel, the electric field is applied aslant, whereby the liquid crystal molecules 3 are tilted in two directions leading to the division of orientation. The division of orientation contributes greatly to improving the speed of response.

Though not illustrated here, it is recommended that the liquid crystal display panel of the present invention inclusive of the one of this example is sandwiched by a pair of circular polarizing plates (or circular polarizing films). This makes it possible to greatly improve the brightness. According to knowledge by the present inventors, the brightness can be enhanced by about 40% as compared to the liquid crystal display panel of a structure that is simply sandwiched by cross nicols.

Example 15

In this example, a liquid crystal display device as schematically illustrated in FIG. 31 was produced according to the method described in Examples 1 and 10 above. In this liquid crystal panel, too, the sealing material and the spacer material were arranged at predetermined positions according to the method described in Example 10, which, however, are not illustrated to simplify the description. The illustrated liquid crystal display device 10 is distinguished from the liquid crystal display device of the invention described above with reference to FIG. 20, in regard to a color filter 18 arranged on the TFT substrate 11.

If further described, the liquid crystal display device 10 is constituted by a pair of glass substrates, i.e., the TFT substrate 11 and the opposing substrate 12, and the liquid crystal layer 13 held between these substrates. The liquid crystal constituting the liquid crystal layer 13 is a nematic liquid crystal.

On the TFT substrate 11, there is fabricated a TFT element constituted by a gate electrode 41 and a source electrode 42 as shown. The TFT element is any one that has heretofore been generally used on the TFT substrate. A color filter 18 is also formed on the TFT substrate 11. On the color filter 18 is further formed a pixel electrode 15. A resin layer 16 specific to the present invention is so formed as to cover the pixel electrode 15. A resin layer 17 according to the present invention is laminated on the opposing substrate 12. Polarizing plates 21 and 22 are attached to the outer sides of the TFT substrate 11 and of the opposing substrate 12.

This example employs a constitution in which neither the color filter (CF) nor the black matrix (BM) is formed on the side of the opposing substrate 12 which is arranged facing the TFT substrate 11. Therefore, the whole surface of the TFT substrate 11 can be uniformly irradiated with the ultraviolet radiation. The irradiated ultraviolet radiation does not fall on CF or BM; i.e., no shadow is formed, and a homogeneous image is displayed. The CF, BM and bus lines on the CF substrate are thick enough to shut off ultraviolet radiation. In other words, therefore, this example avoids inconveniences caused by the shut-off of ultraviolet radiation near the bus lines or near CF and BM on the TFT substrate.

The invention claimed is:

1. A liquid crystal display device in which a liquid crystal layer is supported by a liquid crystal substrate, comprising:
an orientation-controlling layer formed on and chemically bonded to a surface of the liquid crystal substrate to regulate an orientation of liquid crystal molecules in the liquid crystal layer in a predetermined direction, said orientation-controlling layer being formed by an incorporated additive added to the liquid crystal.

2. A liquid crystal display device according to claim 1, wherein said additive has a property of being chemically bonded to the surface of said liquid crystal substrate.

3. A liquid crystal display device according to claim 1, wherein said additive has a property of being chemically bonded to the surface of said liquid crystal substrate after having been physically adsorbed to said surface.

4. A liquid crystal display device according to claim 1, wherein said additive has a property of being chemically bonded between said additives after having been physically adsorbed to the surface of said liquid crystal substrate.

5. A liquid crystal display device according to claim 1, wherein said additive is a non-ionic surfactant having a property of being physically adsorbed to the surface of said liquid crystal substrate.

6. A liquid crystal display device according to claim 1, wherein said additive comprises a monomer material, and forms a polymer structure as said orientation-controlling layer after having been physically adsorbed to the surface of said liquid crystal substrate.

7. A liquid crystal display device according to any one of claims 1 to 6, wherein said additive comprises two or more kinds of materials, at least one of the materials having a vertically orienting property.

8. A liquid crystal display device according to claim 6, wherein said additive has two or more functional groups having different degrees of reactivity.

9. A liquid crystal display device according to any one of claims 1 to 6 wherein, when the surface of said liquid crystal substrate is denoted by a surface A, the liquid crystal in said liquid crystal layer by a liquid crystal B, and said incorporated additive by an additive C, respectively, the following relationship:

$$(v_{AB} - v_{AC})/v_{BC} > -1$$

wherein $v_{AB}$ is the amount of change in the surface energy of the surface A when the surface A is wet with the liquid crystal B, $v_{AC}$ is the amount of change in the surface energy of the surface A when the surface A is wet with the additive C, and $v_{BC}$ is the amount of change in the surface energy of the liquid crystal B when the liquid crystal B come in contact with the additive C, is satisfied.

10. A liquid crystal display device according to any one of claims 1 to 6, wherein, when the surface of said liquid crystal substrate is denoted by a surface A, the liquid crystal in said liquid crystal layer by a liquid crystal B, and said incorporated additive by an additive C, respectively, the following relationship:

$$(v_{AB} - v_{AC})/v_{BC} 1$$

wherein $v_{AB}$ is the amount of change in the surface energy of the surface A when the surface A is wet with the liquid crystal B, $v_{AC}$ is the amount of change in the surface energy of the surface A when the surface A is wet with the additive C, and $v_{BC}$ is the amount of change in the surface energy of the liquid crystal B when the liquid crystal B come in contact with the additive C, is satisfied.

11. A liquid crystal display device according to any one of claims 1 to 6, wherein an orientation structure is further provided on the surface of said liquid crystal substrate to regulate the orientation of liquid crystal molecules in said liquid crystal layer.

12. A liquid crystal display device according to any one of claims 1 to 6, wherein said liquid crystal layer comprises negative-type liquid crystals, and the liquid crystal molecules are vertically oriented when no voltage is applied.

13. A method of producing a liquid crystal display device in which a liquid crystal layer is supported by liquid crystal substrates, comprising:
   injecting, between liquid crystal substrates, a liquid crystal having added thereto an additive having a property of controlling an orientation of liquid crystal molecules in a predetermined direction, thereby to form a liquid crystal layer on a surface layer of said liquid crystal substrates, said liquid crystal layer having orientation-controlling layers consisting of said additive chemically bonded to a surface of said liquid crystal substrates.

14. A method of producing a liquid crystal display device according to claim 13, wherein said additive has a property of being chemically bonded to the surface of said liquid crystal substrate.

15. A method of producing a liquid crystal display device according to claims 13, wherein said additive has a property of being chemically bonded to the surface of said liquid crystal substrate after having been physically adsorbed to said surface.

16. A method of producing a liquid crystal display device according to claim 13, wherein said additive has a property of being chemically bonded between said additives after having been physically adsorbed to the surface of said liquid crystal substrate.

17. A method of producing a liquid crystal display device according to claim 13, wherein said additive is a non-ionic surfactant having a property of being physically adsorbed to the surface of said liquid crystal substrate.

18. A method of producing a liquid crystal display device according to claim 13, wherein said additive comprises a monomer material, and forms a polymer structure as said orientation-controlling layer after having been physically adsorbed to the surface of said liquid crystal substrate.

19. A method of producing a liquid crystal display device of any one of claims 13 to 18 wherein, when the surface of said liquid crystal substrate is denoted by a surface A, the liquid crystal in said liquid crystal layer by a liquid crystal B, and said incorporated additive by an additive C, respectively, the following relationship:

$$(v_{AB}-v_{AC})/v_{BC} > -1$$

wherein $v_{AB}$ is the amount of change in the surface energy of the surface A when the surface A is wet with the liquid crystal B, $v_{AC}$ is the amount of change in the surface energy of the surface A when the surface A is wet with the additive C, and $v_{BC}$ is the amount of change in the surface energy of the liquid crystal B when the liquid crystal B come in contact with the additive C is satisfied.

20. A method of producing a liquid crystal display device of any one of claims 13 to 18 wherein, when the surface of said liquid crystal substrate is denoted by a surface A, the liquid crystal in said liquid crystal layer by a liquid crystal B, and said incorporated additive by an additive C, respectively, the following relationship:

$$(v_{AB}-v_{AC})/v_{BC} > -1$$

wherein $v_{AB}$ is the amount of change in the surface energy of the surface A when the surface A is wet with the liquid crystal B, $v_{AC}$ is the amount of change in the surface energy of the surface A when the surface A is wet with the additive C, and $v_{BC}$ is the amount of change in the surface energy of the liquid crystal B when the liquid crystal B come in contact with the additive C, is satisfied.

21. A liquid crystal display device having a panel structure, comprising:
   a pair of substrates arranged opposed to each other; and liquid crystals sealed between these substrates;
   wherein a resin layer is interposed in the interface between said liquid crystals and a liquid crystal panel-constituting element in contact with said liquid crystals, said resin layer being formed by curing a curable additive that comprises a monofunctional monomer and a polyfunctional monomer, and vertical orientation-expressing functional groups of the monomer contained in said curable additive are derived from the surface of said resin layer.

22. A liquid crystal display device according to claim 21, wherein said vertical orientation-expressing group is an alkyl or alkoxyl group and/or a halogen atom.

23. A liquid crystal display device according to claim 21 or 22, wherein said liquid crystal panel-constituting element is at least one member selected from the group consisting of said substrate, a sealing material for sealing said liquid crystals, a spacer material for maintaining a constant gap between said substrates and an electrode formed on said substrate.

24. A liquid crystal display device according to claim 21 or 22, wherein said curable additive contains said monofunctional monomer in a molar amount nearly equal to, or greater than, the amount of said polyfunctional monomer.

25. A liquid crystal display device according to claim 21 or 22, wherein a molar mass ratio of said monofunctional monomer and said polyfunctional monomer in said curable resin is in a range of from 1:1 to 50:1.

26. A liquid crystal display device according to claim 21 or 22, wherein said monofunctional monomer and/or said polyfunctional monomer are (meth)acrylic acid monofunctional monomers, bifunctional monomers, trifunctional monomers or tetrafunctional monomers.

27. A liquid crystal display device according to claim 26, wherein said (meth)acrylic acid monofunctional monomer is represented by the following general formula (I):

wherein $R_1$ is a hydrogen atom or a lower alkyl group, and A is a functional group capable of producing vertical orientation of liquid crystal molecules when used in a liquid crystal panel, or a unit containing such a functional group.

28. A liquid crystal display device according to claim 26, wherein said (meth)acrylic acid bifunctional monomer is represented by the following general formula (III):

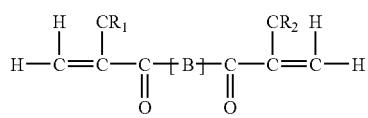

(III)

wherein $R_1$ and $R_2$ may be the same or different and are hydrogen atoms or lower alkyl groups, and B is a unit capable of defining a skeleton thereof in the curable resin that is obtained.

29. A liquid crystal display device according to claim 26, wherein said (meth)acrylic acid bifunctional monomer is represented by the following general formula (III-1):

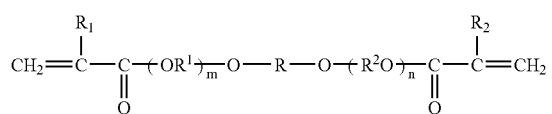

(III-1)

wherein $R_1$ and $R_2$ may be the same or different and are hydrogen atoms or lower alkyl groups, $R^1$ and $R^2$ may be the same or different and are lower alkylene groups, R is a straight-chain or branched-chain aliphatic hydrocarbon group, a substituted or unsubstituted aromatic hydrocarbon group or a substituted or unsubstituted alicyclic hydrocarbon group, and m and n are, independently from each other, integers of 0 to 4.

30. A liquid crystal display device according to claim 26, wherein said (meth)acrylic acid bifunctional monomer is represented by the following general formula (III-2):

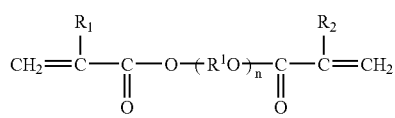

(III-2)

wherein $R_1$ and $R_2$ may be the same or different and are hydrogen atoms or lower alkyl groups, $R^1$ is a lower alkylene group, and n is an integer of 0 to 12.

31. A liquid crystal display device according to claim 26, wherein said (meth)acrylic acid bifunctional monomer is represented by the following general formula (III-3):

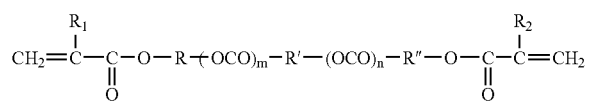

(III-3)

wherein $R_1$ and $R_2$ may be the same or different and are hydrogen atoms or lower alkyl groups, R, R' and R" may be the same or different and are straight-chain or branched-chain aliphatic hydrocarbon groups, substituted or unsubstituted aromatic hydrocarbon groups or substituted or unsubstituted alicyclic hydrocarbon groups, and m and n are, independently from each other, 0 or 1.

32. A liquid crystal display device according to claim 26, wherein said (meth)acrylic acid trifunctional monomer is represented by the following general formula (IV):

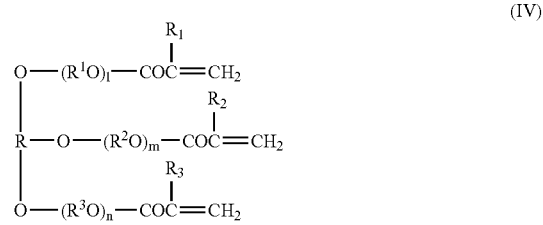

(IV)

wherein $R_1$, $R_2$ and $R_3$ may be the same or different and are hydrogen atoms or lower alkyl groups, $R^1$, $R^2$ and $R^3$ may be the same or different and are lower alkylene groups, R is a straight-chain or branched-chain aliphatic hydrocarbon group, a substituted or unsubstituted aromatic hydrocarbon group or a substituted or unsubstituted alicyclic hydrocarbon group, and l, m and n are, independently from each other, integers of 0 to 3.

33. A liquid crystal display device as according to claim 26, wherein said (meth)acrylic acid tetrafunctional monomer is represented by the following general formula (V):

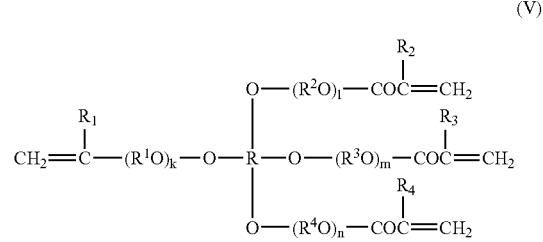

(V)

wherein $R_1$, $R_2$, $R_3$ and $R_4$ may be the same or different and are hydrogen atoms or lower alkyl groups, $R^1$, $R^2$, $R^3$ and $R^4$ may be the same or different and are lower alkylene groups, R is a straight-chain or branched-chain aliphatic hydrocarbon group, a substituted or unsubstituted aromatic hydrocarbon group or a substituted or unsubstituted alicyclic hydrocarbon group, and k, l, m and n are, independently from each other, integers of 0 to 2.

34. A liquid crystal display device according to claim 21, wherein the thickness of said resin layer is in a range of from 5 to 40 nm.

35. A liquid crystal display device according to claim 21, wherein said resin layer is formed by injecting a mixture of said liquid crystals and said curable additive between said substrates, followed by the application of energy.

36. A liquid crystal display device according to claim 35, wherein the ratio of said liquid crystals and said curable additive is in a range of from 10:1 to 400:1.

37. A liquid crystal display device according to claim 21, wherein said liquid crystals exhibit a negative dielectric anisotropy and are so oriented that the long axes of molecules of said liquid crystals are nearly vertical to said substrates when no voltage is applied.

38. A liquid crystal display device according to claim 21, wherein said resin layer is substantially separated into two layers, the resin with the vertical orientation-expressing functional groups being predominantly distributed in the interfacial region relative to said liquid crystal layer, and the resin with the mesh structure being predominantly distributed in the interfacial region relative to said substrate.

39. A liquid crystal display device according to claim 21, wherein said resin layer is constituted by a first resin layer of a first resin formed in contact with said liquid crystal layer and having said vertical orientation-expressing functional groups, and a second resin layer of a resin formed in contact with said substrate and having the mesh structure.

40. A liquid crystal display device according to claim 21, wherein a bank structure and/or a slit structure is formed on the substrates.

41. A method of producing a liquid crystal display device having a panel structure comprising a pair of substrates arranged being opposed to each other and liquid crystals sealed between these substrates, which method comprises the steps of:
    injecting a mixture of said liquid crystals and a curable additive comprising a monofunctional monomer and a polyfunctional monomer into between said substrates; and
    applying energy for curing said curable additive to thereby selectively form a resin layer in the interface between said liquid crystals and a liquid crystal panel-constituting element in contact with said liquid crystals and to derive, from a surface of said resin layer, vertical orientation-expressing functional groups of the monomer contained in said curable additive.

42. A method of producing a liquid crystal display device according to claim 41, wherein the monomer contained in said curable resin has an alkyl or alkoxyl group and/or a halogen atom as said vertical orientation-expressing group.

43. A method of producing a liquid crystal display device according to claim 41 or 42, wherein said liquid crystal panel-constituting element is at least one member selected from the group consisting of said substrate, a sealing material for sealing said liquid crystals, a spacer material for maintaining a constant gap between said substrates, and an electrodes formed on said substrate.

44. A method of producing a liquid crystal display device according to claim 41 or 42, wherein said curable additive contains said monofunctional monomer in a molar amount nearly equal to, or greater than, the amount of said polyfunctional monomer.

45. A method of producing a liquid crystal display device according to claim 41 or 42, wherein a molar mass ratio of said monofunctional monomer and said polyfunctional monomer in said curable resin is in a range of from 1:1 to 50:1.

46. A method of producing a liquid crystal display device according to claim 41 or 42, wherein said monofunctional monomer and/or said polyfunctional monomer are (meth)acrylic acid monofunctional monomers, bifunctional monomers, trifunctional monomers or tetrafunctional monomers.

47. A method of producing a liquid crystal display device according to claim 46, wherein said (meth)acrylic acid monofunctional monomer is represented by the following general formula (I):

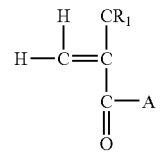

wherein $R_1$ is a hydrogen atom or a lower alkyl group, and A is a functional group capable of expressing vertical orientation of liquid crystal molecules when used in a liquid crystal panel, or a unit containing such a functional group.

48. A method of producing a liquid crystal display device according to claim 46, wherein said (meth)acrylic acid bifunctional monomer is represented by the following general formula (III):

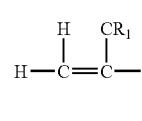

wherein $R_1$ and $R_2$ may be the same or different and are hydrogen atoms or lower alkyl groups, and B is a unit capable of defining a skeleton thereof in the curable resin that is obtained.

49. A method of producing a liquid crystal display device according to claim 46, wherein said (meth)acrylic acid bifunctional monomer is represented by the following general formula (III-1):

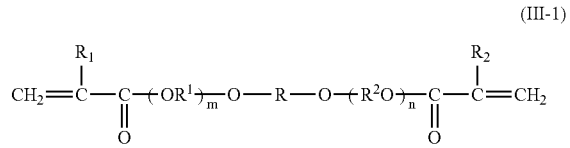

wherein $R_1$ and $R_2$ may be the same or different and are hydrogen atoms or lower alkyl groups, $R^1$ and $R^2$ may be the same or different and are lower alkylene groups, R is a straight-chain or branched-chain aliphatic hydrocarbon group, a substituted or unsubstituted aromatic hydrocarbon group or a substituted or unsubstituted alicyclic hydrocarbon group, and m and n are, independently from each other, integers of 0 to 4.

50. A method of producing a liquid crystal display device according to claim 46, wherein said (meth)acrylic acid bifunctional monomer is represented by the following general formula (III-2):

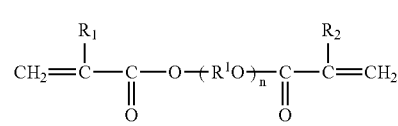

wherein $R_1$ and $R_2$ may be the same or different and are hydrogen atoms or lower alkyl groups, $R^1$ is a lower alkylene group, and n is an integer of 0 to 12.

51. A method of producing a liquid crystal display device according to claim 46, wherein said (meth)acrylic acid bifunctional monomer is represented by the following general formula (III-3):

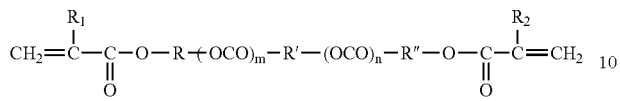
(III-3)

wherein $R_1$ and $R_2$ may be the same or different and are hydrogen atoms or lower alkyl groups, R, R' and R" may be the same or different and are straight-chain or branched-chain aliphatic hydrocarbon groups, substituted or unsubstituted aromatic hydrocarbon groups or substituted or unsubstituted alicyclic hydrocarbon groups, and m and n are, independently from each other, 0 or 1.

52. A method of producing a liquid crystal display device according to claim 46, wherein said (meth)acrylic acid trifunctional monomer is represented by the following general formula (IV):

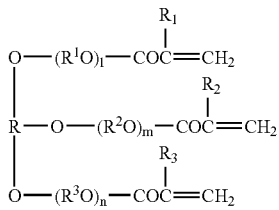
(IV)

wherein $R_1$, $R_2$ and $R_3$ may be the same or different and are hydrogen atoms or lower alkyl groups, $R^1$, $R^2$ and $R^3$ may be the same or different and are lower alkylene groups, R is a straight-chain or branched-chain aliphatic hydrocarbon group, a substituted or unsubstituted aromatic hydrocarbon group or a substituted or unsubstituted alicyclic hydrocarbon group, and l, m and n are, independently from each other, integers of 0 to 3.

53. A liquid crystal display device according to claim 46, wherein said (meth)acrylic acid tetrafunctional monomer is represented by the following general formula (V):

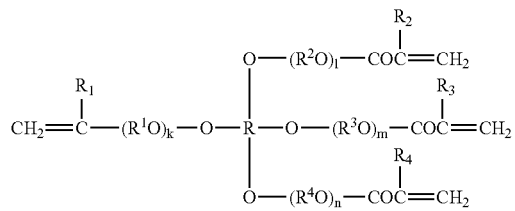
(V)

wherein $R_1$, $R_2$, $R_3$ and $R_4$ may be the same or different and are hydrogen atoms or lower alkyl groups, $R^1$, $R^2$, $R^3$ and $R^4$ may be the same or different and are lower alkylene groups, R is a straight-chain or branched-chain aliphatic hydrocarbon group, a substituted or unsubstituted aromatic hydrocarbon group or a substituted or unsubstituted alicyclic hydrocarbon group, and k, l, m and n are, independently from each other, integers of 0 to 2.

54. A method of producing a liquid crystal display device according to claim 41, wherein the thickness of said resin layer is in a range of from 5 to 40 nm.

55. A method of producing a liquid crystal display device according to claim 41, wherein said liquid crystals and said curable additive are mixed together at a ratio of from 10:1 to 400:1.

56. A method of producing a liquid crystal display device according to claim 41, wherein said liquid crystals exhibit a negative dielectric anisotropy and are so oriented that the long axes of molecules of said liquid crystals are nearly vertical to said substrates when no voltage is applied.

* * * * *

UNITED STATES PATENT AND TRADEMARK OFFICE
CERTIFICATE OF CORRECTION

PATENT NO.        : 7,248,318 B2
APPLICATION NO.   : 10/449654
DATED             : July 24, 2007
INVENTOR(S)       : Nakamura et al.

It is certified that error appears in the above-identified patent and that said Letters Patent is hereby corrected as shown below:

In the Claims:

Claim 10, Column 48, Line 4, delete "$(v_{AB} - v_{AC})/v_{BC}$ 1" and insert

-- ("$(v_{AB} - v_{AC})/v_{BC} > 1$ --.

Claim 20, Column 50, Line 10, delete "$(v_{AB} - v_{AC})/v_{BC} >- 1$" and insert -- $(v_{AB} - v_{AC})/v_{BC} > 1$ --.

Signed and Sealed this

Eighteenth Day of March, 2008

JON W. DUDAS
*Director of the United States Patent and Trademark Office*